(12) United States Patent
Groß et al.

(10) Patent No.: US 12,307,824 B2
(45) Date of Patent: May 20, 2025

(54) SYSTEM FOR CAPTURING THE MOVEMENT PATTERN OF A PERSON

(71) Applicants: MetraLabs GmbH Neue Technologien und Systeme, Ilmenau (DE); Technische Universität Ilmenau, Ilmenau (DE)

(72) Inventors: Horst-Michael Groß, Ilmenau (DE); Andrea Scheidig, Ilmenau (DE); Thanh Quang Trinh, Ilmenau (DE); Benjamin Schütz, Ilmenau (DE); Alexander Vorndran, Ilmenau (DE); Andreas Bley, Niestetal (DE); Anke Mayfarth, Ilmenau (DE); Robert Arenknecht, Ilmenau (DE); Johannes Trabert, Ilmenau (DE); Christian Martin, Ilmenau (DE); Christian Sternitzke, Ilmenau (DE)

(73) Assignee: TEDIRO Healthcare Robotics GmbH, Ilmenau (DE)

( * ) Notice: Subject to any disclaimer, the term of this patent is extended or adjusted under 35 U.S.C. 154(b) by 560 days.

(21) Appl. No.: 17/421,098

(22) PCT Filed: Jan. 7, 2020

(86) PCT No.: PCT/EP2020/050200
§ 371 (c)(1),
(2) Date: Jul. 7, 2021

(87) PCT Pub. No.: WO2020/144175
PCT Pub. Date: Jul. 16, 2020

(65) Prior Publication Data
US 2022/0108561 A1  Apr. 7, 2022

(30) Foreign Application Priority Data

Jan. 7, 2019  (DE) .................. 10 2019 100 228.1
Jun. 21, 2019 (DE) .................. 10 2019 116 848.1

(51) Int. Cl.
*H04W 4/029* (2018.01)
*G06V 10/75* (2022.01)
*G06V 40/20* (2022.01)

(52) U.S. Cl.
CPC ............ *G06V 40/25* (2022.01); *G06V 10/751* (2022.01)

(58) Field of Classification Search
CPC ....... G06V 40/25; G06V 10/751; G06V 20/10
See application file for complete search history.

(56) References Cited

U.S. PATENT DOCUMENTS 7,450,024 B2   11/2008 Fleck et al.
8,279,060 B2   10/2012 Liu et al.
2008/0045804 A1* 2/2008 Williams .............. A61B 5/165
                                              600/300

(Continued)

FOREIGN PATENT DOCUMENTS

CN   101862245 A   10/2010
CN   203338133 U   12/2013

(Continued)

OTHER PUBLICATIONS

Naoaki Tsuda, et al., "Measurement and evaluation of crutch walk motion by Kinect sensor", Mechanical Engineering Journal, vol. 3, No. 6, , Dec. 5, 2016, pp. 15-00472.

(Continued)

*Primary Examiner* — Christopher M Brandt
(74) *Attorney, Agent, or Firm* — 24IP Law Group USA, PLLC; Timothy R. DeWitt

(57) ABSTRACT

A system and a method for capturing a movement pattern of a person. The method comprises capturing a plurality of images of the person executing a movement pattern by means of a non-contact sensor, the plurality of images representing the movements of the body elements of the person, generating at least one skeleton model having limb positions for at least some of the plurality of images, and (Continued)

calculating the movement pattern from the movements of the body elements of the person by comparing changes in the limb positions in the at least one skeleton model generated.

15 Claims, 20 Drawing Sheets

(56) References Cited

U.S. PATENT DOCUMENTS

| | | | | |
|---|---|---|---|---|
| 2011/0152726 | A1* | 6/2011 | Cuddihy | G06V 40/25 600/595 |
| 2015/0310629 | A1* | 10/2015 | Utsunomiya | G06V 10/34 382/107 |
| 2016/0066820 | A1* | 3/2016 | Sales | G09B 5/00 600/595 |
| 2016/0125626 | A1* | 5/2016 | Wang | G06T 11/005 348/47 |

FOREIGN PATENT DOCUMENTS

| | | |
|---|---|---|
| CN | 203527474 U | 4/2014 |
| CN | 104889994 A | 9/2015 |
| CN | 105078445 B | 11/2015 |
| CN | 105078450 B | 11/2015 |
| CN | 105082149 B | 11/2015 |
| CN | 204772554 U | 11/2015 |
| CN | 106407715 A | 2/2017 |
| CN | 205950753 U | 2/2017 |
| CN | 106671105 A | 5/2017 |
| CN | 106709254 B | 5/2017 |
| CN | 107518989 A | 12/2017 |
| CN | 107544266 A | 1/2018 |
| CN | 107598943 A | 1/2018 |
| CN | 206833244 U | 1/2018 |
| CN | 108039193 A | 5/2018 |
| CN | 108053889 A | 5/2018 |
| CN | 108073104 A | 5/2018 |
| CN | 105078449 B | 7/2018 |
| CN | 108422427 A | 8/2018 |

OTHER PUBLICATIONS

Jaeschke, B., Vorndran, A., Trinh,T.Q., Scheidig, A., Gross, H.-M., Sander, K., Layher, F. "Making Gait Training Mobile—A Feasibility Analysis" in: IEEE Int. Conf. on Biomedical Robotics and Biomechatronics (Biorob), Enschede, The Netherlands, pp. . . . , IEEE 2018.

Trinh, T.Q., Wengefeld, T., Mueller, St., Vorndran, A., Volkhardt, M., Scheidig, A., Gross, H.-M. "Take a seat, please": Approaching and Recognition of Seated Persons by a Mobile Robot. in: Int. Symposium on Robotics (ISR), Munich, Germany, pp. 240-247, VDE Verlag 2018.

Vorndran, A., Trinh, T.Q., Mueller, St., M., Scheidig, A., Gross, H.-M., "How to Always Keep an Eye on the User with a Mobile Robot?" in: Int. Symposium on Robotics (ISR), Munich, Germany, pp. 219-225, VDE Verlag 2018.

Götz-Neumann, "Gehen verstehen", Thieme-Verlag, 2016, Chapter 2.

Smolenski et al, "Janda, Manuelle Muskelfunktionsdiagnostik" (Elsevier-Verlag, 2016), Chapter 6.

Borchani et al, "A survey on multi-output regression", WIREs Data Mining Knowl Discov Jul. 15, 2015, DOI: 10.1002/widm.1157.

Zhe Cao, Tomas Simon, Shih-En Wei, Yaser Sheikh. OpenPose: "Realtime Multi-Person 2D Pose Estimation using Part Affinity Fields"; The IEEE Conference on Computer Vision and Pattern Recognition (CVPR), 2017, pp. 7291-7299.

G. Guidi, S. Gonizzi, L. Mico, 3D Capturing Performances of Low-Cost Range Sensors for Mass-Market Applications, The International Archives of the Photogrammetry, Remote Sensing and Spatial Information Sciences, vol. XLI-B5, 2016 XXIII ISPRS Congress, Jul. 12-19, 2016, Prague, Czech Republic.

Fox, W. Burgard and S. Thrun, "The dynamic window approach to collision avoidance," in IEEE Robotics & Automation Magazine, vol. 4, No. 1, pp. 23-33, Mar. 1997.

Müller S., Trinh T.Q., Gross HM. (2017) Local Real-Time Motion Planning Using Evolutionary Optimization. In: Gao Y., Fallah S., Jin Y., Lekakou C. (eds) Towards Autonomous Robotic Systems. TAROS 2017. Lecture Notes in Computer Science, vol. 10454. Springer, Cham.

R. Philippsen and R. Siegwart, "An Interpolated Dynamic Navigation Function," Proceedings of the 2005 IEEE International Conference on Robotics and Automation, Barcelona, Spain, 2005, pp. 3782-3789.

Borchani, H. , Varando, G. , Bielza, C. and Larrañaga, P. (2015), A survey on multi-output regression. WIREs Data Mining and Knowledge Discovery, 5: 216-233. DOI: 10.1002/widm.1157.

* cited by examiner

Fig. 4

| Days after surgery | Physiotherapist | Training with service robot |
|---|---|---|
| day 1 | 1) introduction into robot usage<br>2) use of forearm crutches:<br>• determine and adjust crutch height<br>• use of crutches when sitting down and getting up<br>• turning on the spot<br>• get into bed/get up<br>• first introduction into three-point-gait and exercising three point gait<br><br>Time effort for therapist 20 min<br>• setting up the patient in therapy management system | None |
| day 2 | physiotherapy (20 min) | robot training in three-point-gait:<br>1x 5-10 min<br>-20-200m |
| day 3 | • physiotherapy (20 min)<br>• eventually reading and evaluating the training data from the service robot | consolidation of robot training in three-point-gait<br>2x daily<br>each 10 min<br>-50-250m<br>robot training in stairclimbing |
| day 4 | • physiotherapy (20 min)<br>• eventually reading and evaluating the training data from the service robot | robot training in two-point-gait<br>2x daily.<br>each 10-15 min<br>-75-300m |
| Since day 5 | • physiotherapy (20 min)<br>• eventually reading and evaluating the training data from the service robot | robot training in two-point-gait<br>2x daily<br>each 10-15 min<br>-150-450m<br>robot training in stairclimbing<br>rodest increase in training regarding duration, distance, and frequency |

Fig. 5

| Patient - ID: | [No.] | | | | |
|---|---|---|---|---|---|
| Operation date: | [Date] | | | | |
| Operation side: | Right | Left | | | |
| Releasing training on forearm crutches on: | [date] | Three-point-gait? Yes/No | | Two-point-gait? Yes/No | |
| Releasing "stairs" on: | [date] | | | | |
| Dosing: | | | | | |
| Frequency per day | 1x daily | 2x daily | 3x daily | | |
| Duration per training | 5 min | 10 min | 15 min | 20 min | 25 min |
| Maximum distance/day | 100 m | 300 m | 500 m | 700 m | 1000 m |

Fig. 9

| Correction options (output as text or audio) | Detected errors/deviations from movement pattern | | | | |
|---|---|---|---|---|---|
| | error 1: step length of operated leg too short | error 2: step length of operated leg too short | error 3: crutch too short | error 4: crutch too far ahead | ... |
| Place the healthy leg past the operated leg, forward over the imaginary line connecting the supports." | x | | x | | |
| Do not place the supports so far forward, but at the level of the operated leg. | x | x | | x | |
| correction 3 | | x | x | | |
| correction 4 | | | x | x | |
| ... | | | | | |

Fig. 11

|  | Day 1 | Day 2 | Progress (Day 2 /Day 1) | Day 3 | Progress (Day 3 /Day 2) | Day 4 | Progress (Day 4 /Day 3) | Discharge | Progress (discharge/ Day 1) |
|---|---|---|---|---|---|---|---|---|---|
| Training 1 | | | | | | | | | |
| Duration (in min) | 5 | 10 | 5 | 10 | 0 | ... | ... | ... | |
| Distance (in m) | 60 | 120 | 60 | 150 | 30 | ... | | ... | |
| Speed (in m/s) | 0.20 | 0.20 | 0 | 0.25 | 0.05 | ... | | ... | |
| Frequency of discovered deviations in training 1: | | | | | | | | | |
| Process forearm crutches | 10 | 8 | * | 0 | *** | ... | | ... | |
| Stand duration | 100 | 55 | ** | 40 | * | ... | | ... | |
| Free leg phase | 25 | 15 | ** | 15 | * | ... | | ... | |
| Trunk/view | 30 | 10 | *** | 5 | *** | ... | | ... | |
| Step length | 100 | 60 | ** | 40 | * | ... | | ... | |
| Step width | NC | NC | *** | NC | *** | ... | | ... | |

|  | Day 1 | Day 2 | Progress (Training 2 /Training 1) | Day 3 | Progress (Training 3 /Training 2) | Day 4 | Progress (Training 4 /Training 3) | Discharge | Progress (discharge/ Day 1) |
|---|---|---|---|---|---|---|---|---|---|
| Training 2 | | | | | | | | | |
| Duration (in min) | | 10 | 10 | 10 | 0 | ... | ... | ... | |
| Distance (in m) | | 130 | 10 | 200 | 50 | ... | | ... | |
| Speed (in m/s) | | 0.22 | 0.02 | 0.33 | 0.08 | ... | | ... | |
| Frequency of discovered deviations in training 2: | | | | | | | | | |
| Process forearm crutches | | 5 | ** | 0 | *** | ... | | ... | |
| Stand duration | | 50 | ** | 30 | * | ... | | ... | |
| Free leg phase | | 15 | ** | 15 | * | ... | | ... | |
| Trunk/view | | 10 | *** | 2 | *** | ... | | ... | |
| Step length | | 50 | ** | 35 | * | ... | | ... | |
| Step width | | NC | *** | NC | *** | ... | | ... | |

| Legend | Description |
|---|---|
| * | Address this error in physiotherapy |
| ** | Check during the process |
| *** | Optimal training course |
| NC | No correction, since no deviation was found |

Fig. 15
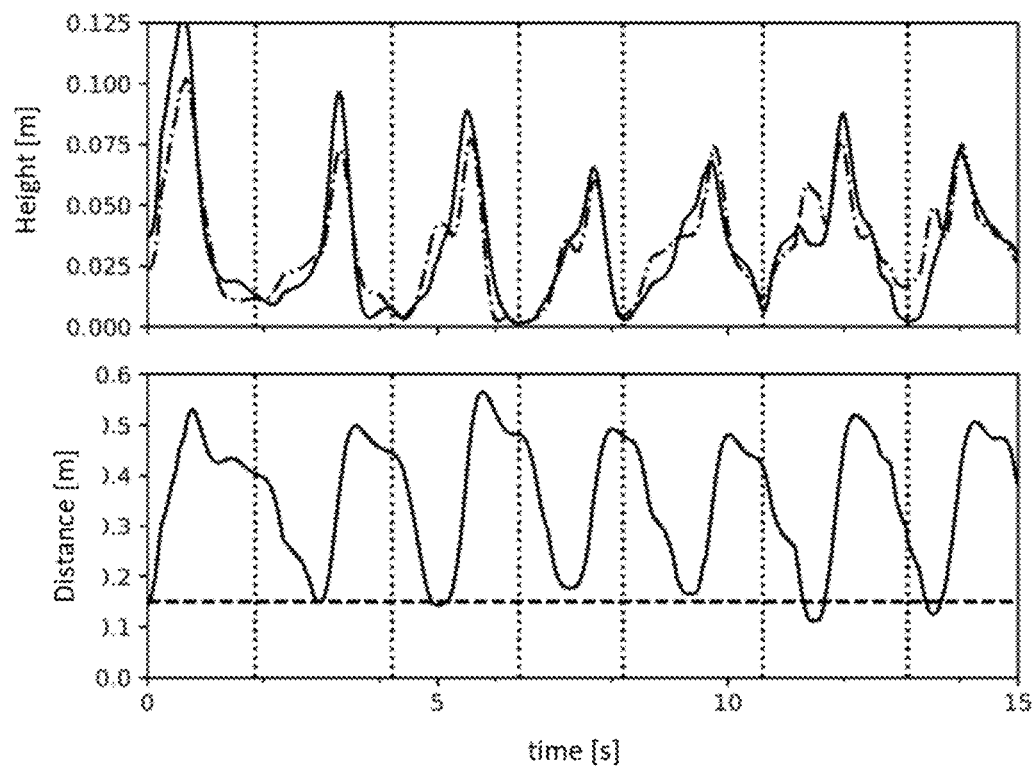
Fig. 16: Sequence of standing times of a patient with a prosthesis in the right hip
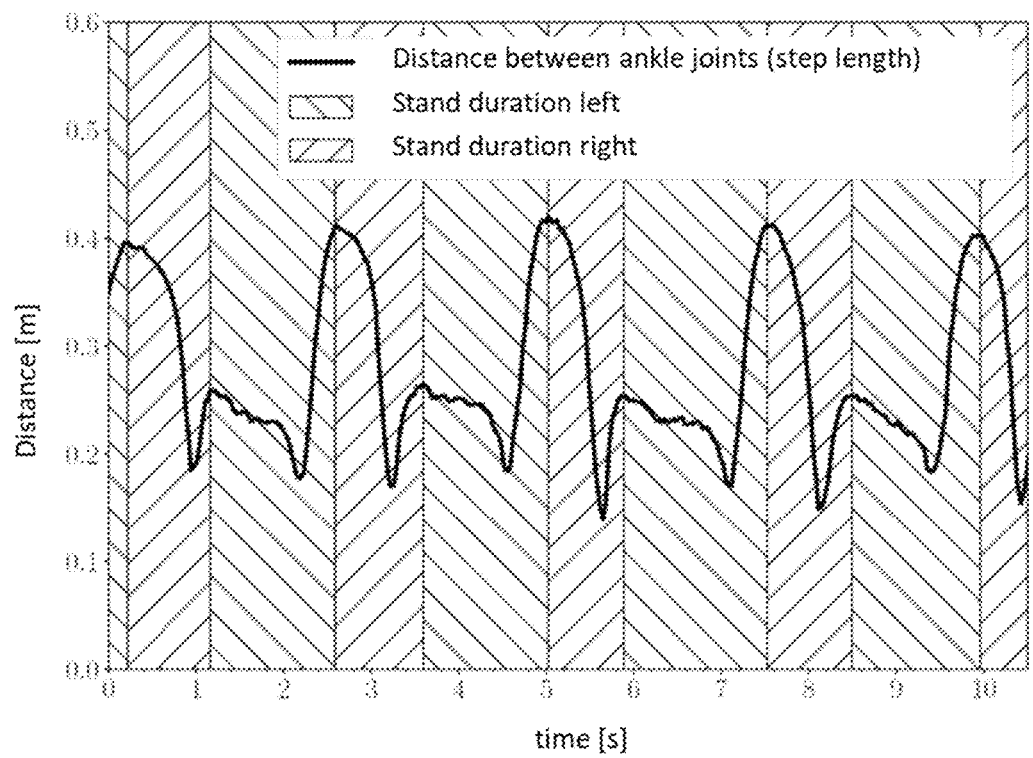

SYSTEM FOR CAPTURING THE MOVEMENT PATTERN OF A PERSON

BACKGROUND OF THE INVENTION

Field of the Invention

The invention comprises a system for capturing the movement pattern of a person.

Brief Description of the Related Art

The health system is currently suffering from a major shortage of skilled workers. An increasingly frequent problem resulting from this is that only an inadequate degree of therapy and care can be provided, with considerable effects on health care costs and on the added value of the national economy. For patients, this may also mean prolonged suffering or even secondary illnesses, which can arise, for example, from postural deformities occurring during rehabilitation among patients who are insufficiently instructed in this. These effects are accompanied by an increasing need to document the patient's condition as a recourse to defend against claims for damages that can be attributed to inadequate therapy from the point of view of hospitals. In some cases, this can bring about a self-reinforcing effect.

The system described in this document addresses this problem by providing a solution for the primary monitoring of rehabilitation measures, especially in the form of posture and gait devices for a pattern of movement, e.g. by means of a service robot. This service robot is also capable of accurately documenting the completed exercises, which enables the healthcare facility in question to meet its compliance obligations in this respect without having to separately assign staff for the purpose. An additional effect is that the use of such a system standardizes the assessment of therapeutic success, as currently the assessment of whether an exercise is completed correctly entails the assessment of a therapist, who differs from other therapists in terms of individual experience. Therefore, where therapists may make varying assessments for a single exercise, a uniform assessment is achieved when using the system or the service robot.

Furthermore, the use of the service robot offers significant relief for the therapeutic staff, for example in the areas of gait and stair training: in neurological, geriatric, and internal medical facilities, service robots can perform the task of accompanying patients with orientation difficulties as well as training the movement of patients whose participation in life would be significantly improved through the frequent training of their walking. In orthopedic facilities, for example, gait training with and without forearm crutches, underarm crutches or other aids and stair climbing following surgical procedures on the lower extremities or spine represent an increased time factor for understaffed therapeutic personnel. This time can be reduced by utilizing a mobile service robot, e.g. for patients suitable for gait and stair training.

Service robots help to maintain the surgical result as well as to avoid incorrect patterns of movement. Therapeutic training after an operation is an attempt to retrain or break the habit of an incorrect movement, e.g. an incorrect gait pattern which a patient has become accustomed to due to pain or restrictions of movement prior to the operation (e.g. relieving postures and/or evasive movements). This is more successful the more frequently the correct movement pattern is trained (repetitive training). If therapists have less time for therapeutic training during rehabilitation, service robots are a good alternative for the timely detection and correction of errors in movement.

Experts are familiar with various systems in healthcare and geriatrics, including service robots. CN108422427, for example, describes a rehabilitation robot capable of serving food on trays. In a similar vein, CN206833244 features a service robot that distributes materials in a hospital. Chinese patent applications CN107518989 and CN101862245 are also based on a hospital setting. These both refer to a service robot that transports patients in a way similar to a wheelchair. CN205950753 describes a service robot that recognizes patients using sensors and guides them through a hospital. CN203338133 details a service robot designed to assist nursing staff by helping patients in their daily tasks in a hospital. In contrast, CN203527474 refers to a service robot that uses its arm to assist elderly people.

CN108073104 describes a care robot that provides care to infected patients by providing or administering medication to the patients, massaging them, serving them food, communicating with them, etc. Here, the care robot reduces the risk of infection for medical staff by reducing the number of patient contacts. A service robot for accompanying elderly people can be found in CN107598943. This service robot has some monitoring functions, but in particular a floor cleaning function.

CN106671105 is a mobile service robot for the care of elderly people. The service robot uses sensor technology to monitor physical parameters such as temperature, but also facial expressions. It also detects whether the person has fallen and can alert help accordingly via a network.

Similarly, CN104889994 and CN204772554 feature a service robot from the medical field that detects patients' heart rate and supplies them with oxygen, and also includes voice recognition and a multimedia module for entertainment purposes. Blood oxygen detection is also included in the scope of CN105082149. CN105078445 refers to a service robot that allows the recording of an electrocardiogram and the measurement of blood oxygen content, particularly for elderly people. CN105078450 includes an electroencephalogram measurement and therefore follows a similar direction.

Some of the health robots explicitly relate to the performance of exercises with patients or also assessments. In relatively abstract terms, CN108053889 describes a system that performs exercises with a patient based on stored information, while CN108039193 outlines a system for the automatic generation of health reports for use in a service robot. The capturing of movements/fitness exercises by means of a service robot, the recording and storage of data of thereby derived for purposes of analysis, and the transmission of this data to external systems are described in CN107544266. At the same time, this service robot is capable of monitoring the intake of medication by means of various sensors.

CN106709254 describes a service robot employed for the medical diagnosis of a patient which can simultaneously use the diagnosis to generate a treatment plan. For this purpose, the service robot evaluates speech and image information and compares it with information stored in its memory. A neural network is used for this purpose.

CN106407715 describes a service robot that uses speech processing and image recognition to record a patient's medical history. In addition to querying via speech input and output devices employing a touchpad, the service robot also features a camera which takes a photo of the tongue for further documentation of the patient's medical history.

CN105078449 presents a service robot with a tablet computer as a communication unit used, among other functions, for cognitive function training or cognitive/psychological assessment for the detection of Alzheimer's disease in patients. For this purpose, the tablet records a telephone conversation between the patient and a child that following a specific procedure, on the basis of which it deduces whether the patient is suffering from Alzheimer's disease.

Jaeschke et al. 2018 validates whether gait analysis using Microsoft Kinect can provide valid results on a service robot when compared to established stationary gait analysis systems (the gold standard) in terms of determining the position of the joints and limbs, i.e. whether the parameters relevant for evaluating gait training can be acquired in this way. Steps per minute, step speed, step length, and time on one or both feet are mentioned as relevant parameters, as well as extension and flexion of the ankles, knees, and hips, the tilt of the pelvis, and the forward or backward leaning of the trunk. In an evaluation of the static comparison between the two systems, it was found that the acquisition of the relevant parameters for clinical use was sufficient using the Kinect and does not deviate significantly from that of the (stationary) gold standard.

Trinh et al. 2018 outline how a seated person can be detected by a service robot and how a service robot can interact with this person. The study further relates that persons with walking aids can be identified via a 2D laser scanner.

Vorndran et al. 2018 illustrate how a user performing gait training is tracked by a service robot moving in front of the user. For this purpose, a camera with controllable orientation is also used, which enables improved user tracking. Person tracking is achieved by means of LIDAR and RGB camera. Furthermore, the service robot uses both a laser scanner and an RGB-D camera (3D camera) to determine the (future) users. This prediction of user behavior is used both to control the service robot and to track the RGB camera using a PID controller.

SUMMARY OF INVENTION

The invention comprises a method and a system, e.g. a service robot, for supporting a patient's therapy, in particular movement therapy. The service robot has sensor equipment for detecting the movements of the body elements when the patient carries out a movement pattern, as well as for comparing the detected movements with movements that are stored in a memory unit in the service robot or in a cloud. Based on possible deviations in these movements, the service robot can provide the patient with information on how to improve his or her movement patterns. The completed exercises and the data stored in the process can be later evaluated by a therapist.

This document describes one aspect of a computer-implemented method for capturing a movement pattern of a person, with the movement pattern comprising movements of the individual body elements of the person. The method consists of employing a non-contact sensor to capture a plurality of images of the person carrying out a movement (e.g. a gait pattern), with the plurality of images representing the movements of the body elements of the person, creating at least one skeleton model with limb positions for at least some of the plurality of images, and computing the movement pattern from the movements of the body elements of the person by comparing changes in the limb positions in at least one skeleton model created. As discussed above, the method may also include comparing the calculated movement pattern to a predetermined movement pattern stored in a memory unit.

Calculating the movement pattern comprises evaluating movements of the body elements over at least one complete gait cycle in order to provide the system with a complete picture of the movement pattern.

A further aspect of the method consists in the detection of at least one walking aid in the plurality of images by means of comparison to walking aid models. The method may perform a coherent evaluation of at least one walking aid and at least one foot skeleton point obtained from the skeleton model, the evaluation involving the determination of the difference of the at least one foot skeleton point to a ground-level end point and at least one walking aid. This difference is determined, for example, in the sagittal plane and the evaluation is performed at a landing time point on the ground, for example.

The method may further include a message in case of deviation of the movements in the detected movement pattern from the movements in the predetermined movement pattern, which is issued in order to notify the person about incorrect movements in the movement pattern. The number of messages issued depends on the number and type of detected deviations of the movements.

The system for detecting a movement pattern of a person comprises at least one sensor for the non-contact capture of a plurality of images of the person carrying out a movement (e.g. a gait pattern), the plurality of images representing the movements of the body elements of the person, and an evaluation unit for creating skeleton models with positions of the body elements for at least some of the plurality of images and for calculating movements of the body elements of the person by comparing the created skeleton models. The evaluation unit may have a memory with predetermined values about the positions of the body elements during an intended movement pattern, and when operated compares the predetermined values with the movements of the body elements.

When in operation, the evaluation unit evaluates the positions of the body elements with the help of walking aids over at least one gait cycle and/or a symmetry in the movement of the body elements.

The system also has an output unit for outputting messages upon determining deviations between the movements of body elements and the predetermined movement pattern.

A further aspect of the system comprises a segmentation unit for detecting objects e.g. walking aids or other objects in the plurality of images.

BRIEF DESCRIPTION OF THE DRAWINGS

The following will describe the invention with the aid of the drawings. The figures show the following:

FIG. 4: Example training plan.
FIG. 5: GUI configuration of training plan.
FIG. 9: Decision matrix based on movement classifications for issuing instructions or feedback to patients.

FIG. 11: Evaluation matrix for the movement data of the patient for the therapist.

FIG. 15: Crutch use over time.

FIG. 16: Sequence of standing times of a patient with a prosthesis in the right hip.

DETAILED DESCRIPTION OF THE INVENTION

Figure 3:
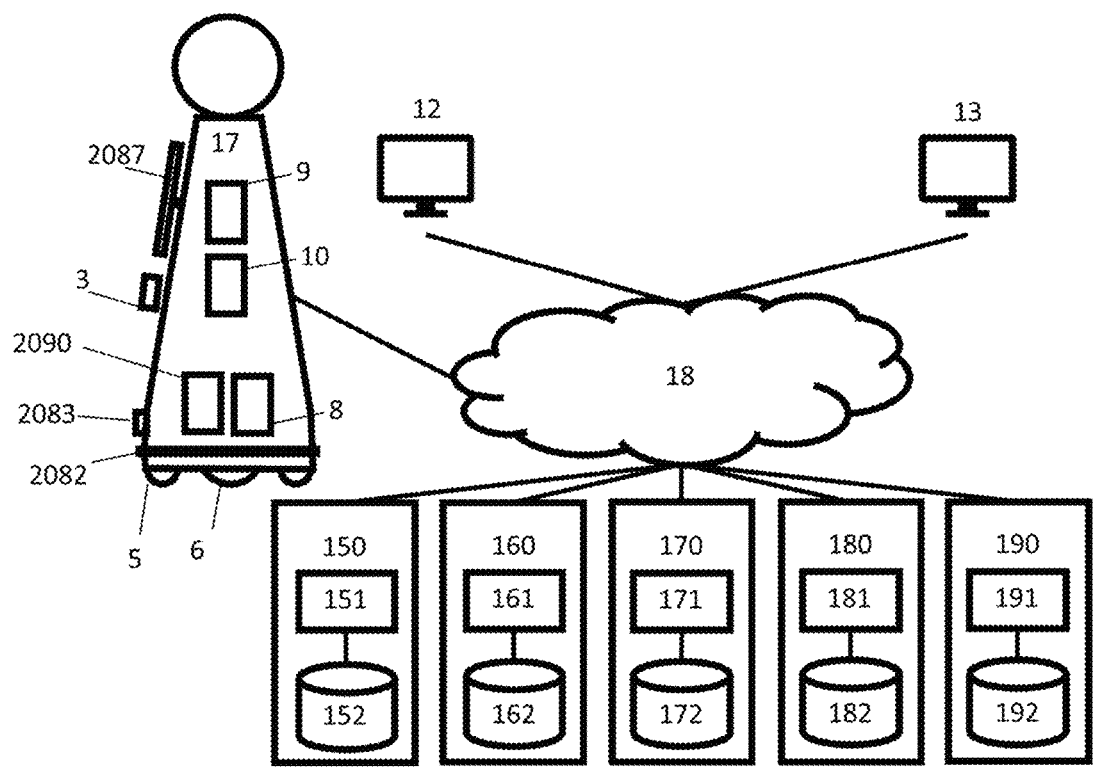
FIG. 3: Management system of the service robot.

A service robot 17 is shown in FIG. 3 and may be designed in various hardware-software configurations that comprise different components and/or modules. This service robot 17 is an example of a system for capturing the movement pattern of a person, e.g. a patient, and is not limiting to the invention.

Figure 1:
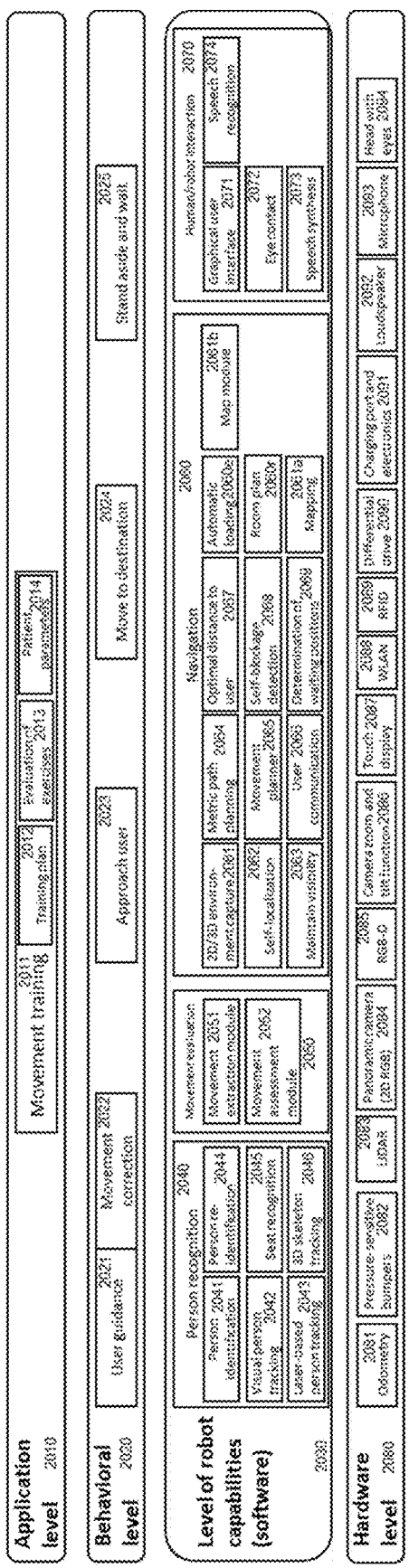
FIG. 1: Example system architecture.

An example system architecture is shown in FIG. 1. As described by way of example elsewhere in this document, alternative aspects are also possible in which individual components and/or modules are added and/or omitted. In principle, a service robot 17 includes at least one processor (with PC or ARM architecture) and at least one memory connected to the processor.

In the aspect shown in FIG. 1, the system architecture includes four levels, including three software levels (an application level 2010, a behavioral level 2020, and a service robot skills level 2030) and a hardware level 2080. Levels 2010, 2020, and 2030 primarily map modules, which is not explicitly shown as such in FIG. 1 for the sake of clarity and does not have to be shown explicitly at all places in the text to follow. The service robot skills are mapped on level 2030. These in turn form the basis for the behavioral level 2020, which maps the behavior of the service robot 17, while the application level 2010 covers the application. In this application level 2010 there is, for example, a gait training application in a movement training module 2011, which is used to store instructions for a patient. However, the training module can also contain other training instructions that are not necessarily movement-related, e.g. instructions for memory training, etc. In addition, there is a training plan or instructions such as speech and/or display outputs for the implementation of the training plan 2012, the evaluation of the exercises 2013 in the training plan, and finally (optional) patient data, such as age, comorbidities, patient room numbers, etc. 2014.

Each of the four levels builds on each other. For example, the movement training application requires certain robot skills, which in turn require certain hardware components.

The behavioral level 2020 includes a module for user guidance 2021 as well as a movement correction in the movement correction module 2022. Furthermore, there is a module that maps how the service robot 17 approaches the patient 2023, i.e. also how the service robot 17 communicates with the patient. Another behavior mapped at this behavioral level 2020 is moving towards a destination 2024 and assuming a waiting position 2025.

At the service robot skills level 2030, there are several modules that include different important submodules. First, there is a person recognition module 2040 for person recognition. The person recognition module 2040 includes a person identification module 2041 for person identification, a first person tracking module 2042 for visual person tracking primarily via 2D camera, and a second person tracking module for LIDAR-based person tracking 2043. In addition, there is a submodule used as a re-identification module 2044 for person re-identification, which is used when a person (patient) has left a tracking area, a submodule used as a seat recognition module 2045 for seat recognition 2045, which is used to recognize persons (patients) sitting on a chair, and a submodule used as a skeleton recognition module 2046 for 3D skeleton recognition. This can be implemented with a 2D or 3D camera.

Another module at the service robot skills level 2030 is a movement evaluation module 2050 comprising a submodule used as a movement extraction module 2051 for feature extraction of the movement pattern and a submodule used as a movement assessment module 2052 for the acquisition and assessment of the patient's movement pattern.

In the navigation module 2060, there is a 2D/3D acquisition submodule 2061, a mapping module 2061a for mapping its environment, a map module 2061b with a map of the environment in which the service robot 17 moves. Furthermore, the navigation module 2060 features a submodule for self-localization 2062, for example within a mapped environment. Furthermore, the navigation module 2060 has a submodule for keeping the service robot 17 within visual range of the persons to be tracked at all times 2063. A path planning module 2064 for metric path planning ensures that the service robot 17 can efficiently calculate its own distance to be covered. A movement planning module 2065 for movement planning, in one aspect using evolutionary algorithms, uses, among other things, the metric path planning results from the path planning module 2064 and calculates an optimal path for the service robot 17 in consideration of various target functions, including determining the expected path of the patient. The user communication submodule 2066 stores rules for how the service robot 17 navigates to talk to a person, e.g. the patient. In contrast, submodule 2067 ensures that a distance is maintained to the user (e.g. a patient, therapist, nurse, or other person) that reflects both safety requirements and the personal, culturally-influenced, interpersonal distance that the service robot 17 adopts when interacting with humans. To prevent the service robot 17 from navigating itself stuck, i.e. from assuming positions in the room from which the service robot 17 cannot free itself using conventional control algorithms, the service robot 17 has a mechanism that detects this self-blockage 2068 and can also unblock it. A module for determining waiting positions 2069 ensures that the service robot 17 assumes waiting positions where it does not disturb anyone. A submodule 2060e for energy supply ensures that the service robot 17 automatically visits a charging station when the energy level is low, docks there, and recharges its battery.

The service robot skills layer 2030 also has a module dedicated to human/service robot interaction 2070. Here, one submodule covers the graphical user interface (GUI) 2071, another submodule establishes eye contact between the patient and the service robot 17 2072 (if the service robot 17 has a head with eyes 2094), and two other submodules utilize speech synthesis 2073 and speech recognition 2074.

Various components are implemented at the hardware level 2080. Among them is an odometry module 2081, i.e. a measurement and control unit for the odometry function, which is connected to the navigation module 2060 via an interface. Pressure-sensitive bumpers 2082 are located at a distance of several centimeters above the ground and allow collision detection. If a collision is detected in the navigation module 2060, an immediate stop of the differential drive 2090 is triggered. This differential drive 2090 otherwise ensures the general locomotion of the service robot 17. A charging port with associated charging electronics 2091 enables the integrated battery to be recharged and supplied with appropriate energy from an external charging device. Alternative energy sources, such as a fuel cell, which includes a direct methanol fuel cell or a solid oxide fuel cell, are also possible for supplying power to the service robot 17.

The service robot 17 includes a LIDAR 2083 and a panoramic camera (2D, RGB) 2084. There is also an RGB-D camera (3D) 2085 on the service robot 17, which has a zoom function and can be tracked 2086. Two wireless interfaces, one for a WLAN module 2088 and one for an RFID transponder 2089, allow the electronic exchange of data.

The service robot 17 has a touch display 2087. At least one loudspeaker 2092 enables, for example, the output of speech synthesis 2073, at least one microphone 2093 enables the recording of speech signals, e.g. to allow speech recognition 2074 by means of natural language processing. Finally, a head with controllable eyes 2094 (with 6 degrees of freedom) provides improved human/machine communication on an emotional level. The components 2087, 2092-2094 are mainly used for human/service robot interaction.

The display 2087 can be used in the scope of user guidance 2021 for the following purposes, among others:
  Identifying the patient/therapist via a password
  Conducting a dialog with the patient/therapist, e.g. requesting/entering information
  Conveying instructions to the patient, e.g. as feedback on completed exercises and/or prompting the patient to follow the service robot 17
  Simulation of exercises to be completed by the patient. For this purpose, a stored avatar can be used, or a video that provides a model for an exercise.
  Playback of recordings of the completed exercises
  Display of the evaluation of the exercises, e.g. for a therapist In one aspect, the service robot 17 may also have light elements to provide instructions to the patient, for example, to signal that the patient should turn into a particular corridor. Such light elements are located, for example, in the upper portion of the service robot 17 and include LEDs, for example.

Figure 2:
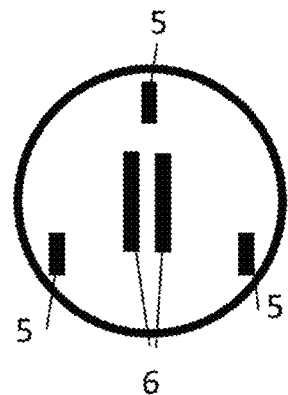
FIG. 2: Top view of the wheels of the service robot.

In one aspect, the service robot 17 has two drive wheels 6 that are centered and arranged parallel to each other (see FIG. 2). Around them, e.g. on a circular path, are two or more support wheels 5. This arrangement of the support wheels 5 allows the service robot 17 to rotate on the spot by driving the drive wheels 6 in opposite directions. For this purpose, the horizontal axis of the support wheels 5 is mounted in such a way that the axis can rotate 360 degrees about the vertical axis. When using two support wheels 5, the distance between the drive wheels 6 is greater than shown in FIG. 2, which prevents the service robot 17 from tipping too easily.

FIG. 3 illustrates that the service robot 17 is connected to the cloud 18 via a wireless network connection such as the WLAN module 2088. This cloud 18 may be a public cloud or a private cloud ("on premise"). A therapist has the ability use a terminal 13 to access a patient administration module processing unit 161 stored in the cloud 18, which is in turn connected to a patient administration module memory 162. The patient administration module processing unit 161 and the patient administration module memory 162 are collectively referred to as the patient administration module 160. The therapist may store patient data in the patient administration module memory 162 or, in one aspect, may import such patient data via an interface from at least one other patient data management system 170, which in turn has a patient data management system processing unit 171 and a patient data management system memory 172. Such other systems include hospital management systems, hospital information systems (HIS), and/or patient data management systems as commonly used in hospitals or rehabilitation facilities. Furthermore, the therapist can use the patient administration module 160 to assign the training plan to the patient, modify the schedule of the training plan, for example, and view the evaluations of the exercises in the training plan that the patient performed with the service robot 17 and which were transferred from the service robot 17 to the patient administration module memory 162 via an interface. The patient administration module 160 documents the progress of the patient's treatment by providing the patient administration module 160 with evaluations performed by the service robot 17 and can transmit the treatment progress to external patient data management systems 170, such as hospital management systems. In addition, a navigation system 180 is located in the cloud 18, which contains navigation information and has a navigation system processing unit 181 and a navigation system memory 182. This navigation information is connected via an interface with the navigation module 2060 of the service robot 17, in particular with a room plan module 2060r. In this room plan module 2060r, the coordinates of the rooms in which the service robot 17 moves and which have also been mapped by the service robot 17, e.g. assigned room numbers stored in the navigation system 180 and/or in the room plan module 2060r.

The cloud 18 is connected to a rule set 150, which has a rule set processing unit 151 and a rule set memory 152. This is used as a central storage above all for algorithms that can be used primarily at the application level 2010, behavior level 2020, and service robot skills level 2030 of the service robot 17 in FIG. 1, but also for those that are used in the patient administration module 160. As examples, algorithms will be named in the following that are used to evaluate the movement pattern in the movement assessment module 2052. This also means that, depending on the aspect, individual modules from FIG. 1 can be merely kept in the cloud 18, provided that the service robot 17 has an online connection to the cloud 18, also and especially if they are those used for navigation. Other algorithms located in the rule set 150 may provide suggestions to therapists for adjusting the training plan.

Moreover, there is a learning module 190 in the cloud 18 having at least one learning module processing unit 191 and at least one learning module memory 192. This is used to store historical data that the service robot 17 has recorded, that the therapist has generated, e.g. by creating a training plan in the patient administration module 160, and/or that originates from an external patient data management system 170 and has been previously transferred, for example, to the patient administration module 160 and/or directly from the service robot 17. To the extent that this historical data refers to the patient, this historical data is available in anonymized form. This historical data is accessible via a terminal 12 (see FIG. 3) which can be used to label the data, for example. As will be described in more detail below, this historical data is used to improve the algorithms in the rule set 150.

The rule set 150 is configured such that algorithms installed locally on the service robot 17 can be updated, for example, via a wireless interface such as the WLAN module 2088, in which case algorithms are transferred from the memory of the rule set 152. In addition, algorithms in the patient administration module memory 162 can also be updated via the cloud 18.

The service robot 17 shown as an example itself has a computer 9 and a memory 10, at least one sensor 3, at least one support wheel 5, at least one drive wheel 6, and an energy source 8.

Sensors

The service robot 17 may have alternative and/or additional sensors. These include ultrasonic sensors and/or radar sensors that replace the pressure-sensitive bumper 2082. Furthermore, the service robot 17 may have one or more magnetic sensors arranged in such a way that they detect magnets on the ground for the purpose of implementing spatial limitations on the action radius, e.g. in front of staircases for safety reasons. Alternatively and/or additionally, the service robot 17 may also have infrared sensors, ultrasonic sensors and/or radar sensors directed at the ground and configured in one aspect so that the infrared sensors, ultrasonic sensors and/or radar sensors recognize steps, for example. The information from these infrared sensors, ultrasonic sensors, and/or radar sensors may, for example, be taken into account in the mapping module 2061 in the generated maps.

The at least one 3D camera (either designed as RGB-D or as a pure depth camera) can be used not only for functions of the person recognition module 2040, but also for three-dimensional mapping in the mapping module 2061. The at least one 2D RGB camera can also be used for 3D person tracking 2042 with the help of corresponding frameworks such as Open Pose (Cao et al. 2017), for which the corresponding framework is used in the case of a Kinect, while NUITrack is used, for example, in the case of an Astra Orbbec. In one aspect, this can be used to replace the 3D camera.

For 3D cameras, Time-of-Flight (ToF) technology can be used, such as in Microsoft Kinect, or a speckle sensor, such as in the Astra Orbbec. For both technologies, there are corresponding evaluation algorithms in the state of the art. Depending on the aspect, one or more 3D cameras can also be used to replace LIDAR 2083.

Person recognition in the person recognition module 2040 is based on at least one optical sensor such as LIDAR 2083, a 2D camera 2084, and/or a 3D camera (either configured as an RGB 3D camera 2085 or as a pure depth camera). LIDAR 2083 is also not used alone, especially in the case of 2D LIDAR, but rather in combination with at least one 2D camera 2084 and/or a 3D camera. In this case, the distance of the patient to the service robot 17 is determined via LIDAR 2083 and their movements and poses are captured via the 2D camera 2084 or the 3D camera, with the latter additionally capable of determining the data for the patient/service robot 17 distance determination. Alternatively, a 2D RGB camera and a separate 3D depth camera can be used, although this involves additional effort in terms of signal processing, in particular synchronization, compared to a (3D) RGB-D camera. The term "pose" is understood to mean the orientation of a person in space including his limbs/body parts (body elements) as well as the orientation of the service robot 17 in space.

Determining the Training Plans

The starting point, e.g. for therapeutic gait training, is the training plan, the aim of which is to gradually improve the patient's physical abilities over time and thus his or her movement pattern. The service robot 17 is configured so as to allow support for therapeutic gait training by means of the sensor technology described above. For example, after the implantation of a total hip endoprosthesis (hip TEP), the patient must now, on the one hand, take care to relieve the operated area on the basis of a defined procedure with the aid of forearm crutches and, on the other hand, try to come as close as possible to the normal/physiological movement pattern. This movement pattern is clearly defined and outlined in great detail, for example, in Chapter 2 of Götz-Neumann, "Gehen verstehen", Thieme-Verlag, 2016 and in Chapter 6 of Smolenski et al, "Janda, Manuelle Muskelfunktionsdiagnostik" (Elsevier-Verlag, 2016). As a response to pain, the patient has "trained" a gait pattern (i.e. movement pattern) by the time of surgery, which the patient should now unlearn to the greatest extent possible after surgery to ensure good surgical and rehabilitation results. This trained gait pattern is also referred to in the following as a "abnormal gait pattern" or "abnormal movement pattern"; corresponding characteristics of the movement pattern, such as a step length influenced by pain and thus different from the physiological movement pattern, are referred to as a abnormal step length. This is achieved, for example, by means of targeted gait training (initially with the additional aid of forearm crutches/walking aids), whereby special attention must be paid to the interaction of a large number of other body parts/elements. This concerns, starting above, the posture of the head, but also the lean of the trunk, the position of the upper and lower arms, the pelvis, and the legs/feet.

In the scope of the use of forearm crutches, two gaits have emerged that are used in rehabilitation: the three-point gait and the two-point gait. In the three-point gait, the load on the operated/affected leg is reduced by simultaneously placing both forearm crutches forward with this (operated/affected) leg. The foot of the operated leg is in contact with the ground. Then the healthy leg is moved forward. This type of supported walking (three-point gait) allows greater weight unloading for the operated leg, as the forearm crutches provides some of the support. The two-point gait is a more advanced form of gait employed during the healing process. The two-point gait allows some weight to be removed from one or both legs is achieved. In this case, crutch and contralateral leg are moved forward simultaneously or in close succession, followed by the respective opposite side (right forearm crutch/left leg, left forearm crutch/right leg; this corresponds to a reciprocal movement pattern). As soon as the patient no longer needs this relief either, the forearm crutches can be dispensed with in consultation with the physician and therapists. The transition from three-point gait to two-point gait occurs when the patient exhibits fluidity of movement, characterized by the stance duration, free leg phase, step length, and/or increasing symmetry between the two legs, as well as an increase in walking speed. The criteria for the transition to the two-point gait or dispensing with the forearm crutches are met when the corrections of the patient made by the service robot 17 fall below the defined threshold value and when the walking speed determined by the service robot 17 goes above a defined threshold value, which in turn may depend on various influencing parameters, e.g. the walking speed initially determined (during initial training), comorbidities, etc.

The transition can also be made if previously determined exercise parameters and the training progress determined on the basis of these parameters exhibit a high level of correspondence with interventions in the training plan made by a therapist and the therapist approves the two-point gait for the patient. The progress of training is determined as the difference between the movement parameters in the movement pattern, such as speed, stance duration, free leg phases, step lengths, etc., as well as symmetry values in the movement pattern. The transition from three-point to two-point gait can be made by the service robot 17 either independently in the training plan or suggested to the therapist, as illustrated for example in FIG. 10 (explained in more detail later) with respect to a variety of other parameters.

FIG. 4 illustrates such a model training plan to be completed by the patient. The rows indicate the days, and the third column shows which exercises the patient performs with the service robot 17. In this example, this is no exercise on the first day; on the second day, for example, the three-point gait is practiced for 5-10 min, with the patient walking approximately −20-200 m. The second column contains the tasks for the physiotherapist. On the second day, these tasks comprise 20 min of physiotherapy and the evaluation of the training data from the service robot 17. The tasks and procedures to be completed on the other days are indicated in the table.

With regard to the service robot 17, such training plans are created in the patient administration module 160. For this purpose, the therapist can, for example, access a graphical user interface (GUI) (FIG. 5), e.g. to configure the training plans for each day that the patient spends in the clinic or rehabilitation facility. These training plans contain, among other things, a patient ID and, for example, the date of the operation, the side of the operation (in the case of knee and/or hip surgery), a possible approval of certain gaits, such as the two- and/or three-point gait as of a certain date, a possible training approval for exercises on a staircase, and the dosage of the exercise (frequency, duration, and distance per day or exercise). For this purpose, clinic/facility-specific training plans can be stored in the service robot 17 to meet the requirements of the respective surgeons. After an operation on the hip/knee/join, for example, the aim is to re-learn the correct procedure for the forearm crutches, which is contingent on the respective burden on the patent, the healing process, and the different movement patterns in the joints. These training plans can be adapted to the scheme defined by or agreed with the surgeons. However, they can be actively modified or adapted by the therapist, as explained below. If, for example, too many deviations in the procedure for the forearm crutches are indicated to the therapist by the evaluation module (possibly because the patient has difficulties in implementing the two-point gait, which is to be learned starting on a certain day according to the training plan), the therapist can "reset" the gait to three-point gait in the training plan and have the patient learn the two-point gait pattern at a later time. In addition, in one aspect, and as described in more detail elsewhere, the therapist can see, e.g. in the GUI, what adjustments should be made to the training plan based on the analysis of past data. This data should be primarily allowed for a dynamic assessment, for example, on day three after surgery based on the training success of the previous days. As described elsewhere in this document, automatic corrections to the training plans are also possible.

Transmission of the Training Plans to the Service Robot

Figure 6:
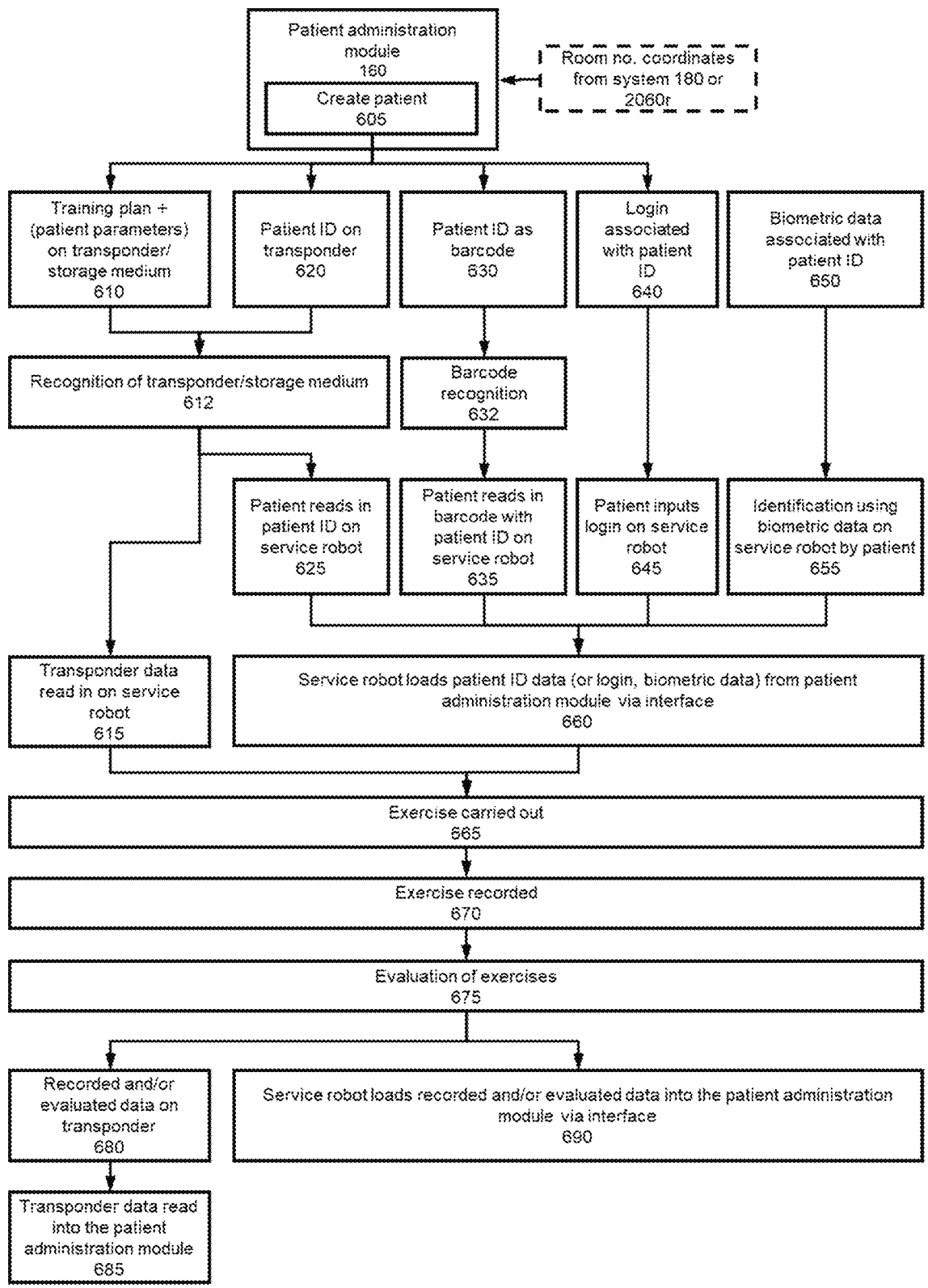
FIG. 6: Data exchange between patient administration module, navigation module, transponder, and service robot.

After the training plan has been created or adjusted, this training plan or the associated instructions are transmitted to the service robot 17. There are different approaches for this, depending on the respective aspects:

FIG. 6 describes the data exchange between patient administration module 160, the navigation system 180, which contains room information (as an alternative to the room plan module 2060r, which also contains this room information—optional), a storage medium (e.g. transponder) and the service robot 17. In the first step 605, patient data for a patient is created in the patient administration module 160. This patient data includes the name, an ID, the diagnosis (hip surgery, if applicable), comorbidities, patient age, etc., a room number (where the patient can be found— optional), and the training plan. The patient data can also be obtained via an interface, for example, from an external system, such as the hospital information system. Based on the room number, the coordinates of the room may be transmitted from the room plan module 2060r in the navigation module 2060 of the service robot 17, or alternatively from an additional module in the memory of the cloud-based navigation module 160 via an interface in step 610, which in one aspect of the method may be used to fetch patients in their rooms. Alternatively and/or additionally, this enables the definition of the area where the service robot 17 meets the patient.

There are various ways to transmit the data relevant to the performance of the training from the patient administration module 160 to the service robot 17. In one variation, the training plan (and patient data, if applicable) is transmitted to a transponder or storage medium (such as a USB flash drive) 610. This is handed over to the patient. The patient transfers the data to the service robot 17 by holding the transponder against an RFID reading (and possibly writing) device 2089 of the service robot 17. The service robot 17 recognizes this transponder 612 and reads it in accordingly 615. Instead of a contactless RFID reader and/or writer 2089, a contact-based interface such as a USB port can be used for the USB memory if a memory unit (e.g. a USB memory card) is employed.

In another variation, only a patient ID from the patient administration module 160 is transmitted 620 to the transponder. Alternatively and/or additionally, an ID of the transponder in the patient administration module 160 is associated with the patient, thereby becoming the patient ID (at least for data transfer via transponder or possibly also the memory). The transponder (possibly also the memory) is recognized 612 at the reading and/or (writing) device 2089 on the service robot 17, which is used to read the patient ID 625, which is also achieved by the patient's handling of the transponder/memory. Subsequently, the service robot 17 uses an interface to download, from the patient administration module 160 located in the cloud 18, the data necessary to perform the exercise 660 such as, for example, the training plan, using the obtained patient ID to identify the relevant data set in the memory 162 of the patient administration module 160. As an alternative to using a transponder and/or memory, a barcode containing the patient ID 630 may be generated and handed over to the patient. This is recognized 632 by the service robot 17 when the barcode is held in front of at least one of the 2D cameras 2084 or 3D cameras. The barcode or the patient ID is read 635. Based on this, the service robot 17 uses an interface to download the data necessary for performing the exercise 660, such as the training plan, from the patient administration module 160 located in the cloud 18. The obtained patient ID 630 is used to identify the relevant record in the database 162 of the patient administration module 160. As an alternative to the methods of identification on the service robot 17 mentioned above, the patient may also receive a login associated with a patient ID in the patient administration module 160 640. If the login is entered on the service robot 17 in step 645, the service robot 17 downloads the data associated with this login (and thus the patient ID) and relevant for performing the exercise from the patient administration module 160 in step 660. As an alternative to a login, biometric data of the patient may be used, such as an iris scan, a fingerprint, or a scan of the face in step 650. This data is associated with the patient in the patient administration module 160. The patient can then identify him- or herself accordingly on the service robot 17, although in the case of an iris scan or a fingerprint scan, an appropriate reading device must be installed. For a scan of the face, the 3D camera of the service robot 17 may also be configured accordingly, e.g. the RGB-D camera 2085. After these steps 645 and 655, the service robot 17 downloads the data associated with the patient ID for performing the exercises.

Next, the service robot 17 performs the exercises in step 665, records the results of the exercises in step 670, and analyzes the results with respect to the training plan 675. These three steps 665, 670, and 675 are described in more detail elsewhere. Once the exercises have been completed, the data recorded by the service robot 17, in particular the evaluations of the service robot 17, if applicable also video recordings of the exercises, and raw data of the skeleton recognition (which will be described in more detail below) are transmitted back to the patient administration module 160. This can be done in the first case described (steps 610-612-615) by transmitting this data to the transponder/memory in step 680 and transferring this transponder/memory from the patient to the therapist, who then reads the transponder/memory at a terminal into the patient administration module 160 in step 685. In the other described methods (steps 620, 630, 640, and 650), an interface can be used to complete a data transfer from the service robot 17 to the patient administration module 160 in the cloud 18 in step 690, upon which the data is stored there according to the patient ID. Such a transmission can occur when the exercises have been completed or while they are still being performed, in real time or at intervals.

One aspect of the data transmission relies on anonymity in the data exchange. Therefore, no data is transmitted to the service robot 17 that would allow the identification of the patient (i.e. personal ID remains unassociated with a name, for example), and no data is stored on the service robot 17 that would allow the identification of the patient. If the service robot 17 makes video recordings of the patient, these video recordings are anonymized, as will be described elsewhere.

Basic Training Procedure

Figure 7:
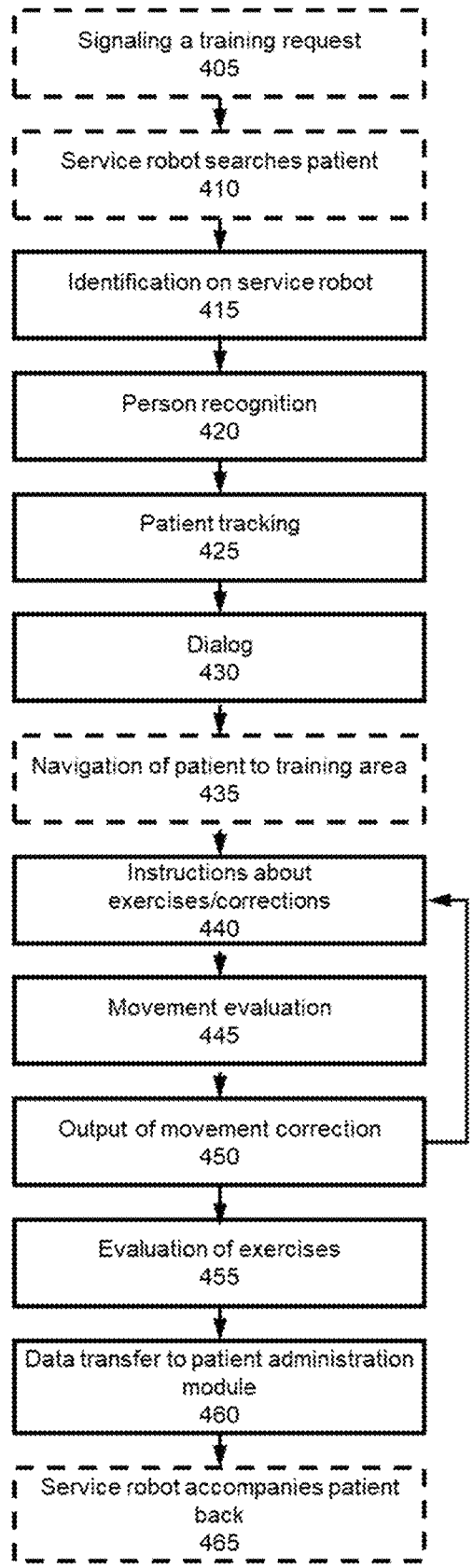
FIG. 7: Training sequence.

FIG. 7 illustrates the basic training procedure. In one aspect, the service robot 17 is configured to fetch a patient at a location, accompany the patient to a training area, complete the exercises there, and return the patient if necessary. In FIG. 7, these steps are shown in dashed boxes because these steps are optional, as the service robot 17 can also wait for the patient at a location.

In optional step 405, the patient signals to the service robot 17 that he or she wishes to train. Alternatively, the patient may have a scheduled exercise (e.g. date and time defined in the training plan) and/or a complementary schedule. As a next step 410 (optional), the service robot 17 seeks the patient, in the process of which information about rooms (such as the patient's room number) is obtained from the navigation system 180 or the room plan module 2060*r*, stored in the patient administration module 160, and transmitted to the service robot 17 along with the training plan, as described in FIG. 6. The service robot 17 can use the room plan module 2060*r* and the map created in the mapping module 2061 to locate the room and navigate to it, for which the service robot 17 uses its destination guidance module 2024 (Example 7 will discuss the mapping procedure in more detail). When the service robot 17 reaches the patient, the patient may identify him- or herself at the service robot 17 in step 415, as already explained in detail in FIG. 6. Alternatively, the patient may go to a location where the service robot 17 is waiting. Based on this identification completed in step 415, the service robot 17 uses its sensor technology, comprising a LIDAR 2083, the 2D camera 2084, and/or the 3D camera (either in the form of an RGB-D camera 2085 or a pure depth camera), to recognize the patient in step 420, which is achieved by means of the person recognition module 2040. Person identification first takes place in the person identification module 2041. Subsequently, patient tracking takes place in step 425, which may be achieved by means of the first person tracking module 2042 and/or the second person tracking module 2043. If there is an interference in person tracking that causes the service robot 17 to "lose sight" of the patient, the patient is re-identified by means of the re-identification module. Example 4 represents a possible embodiment in more detail.

Via a dialog in step 430, the patient can provide the service robot 17 with instructions for training, e.g. his or her own training request. Alternatively or additionally, the patient can also independently select exercises that he or she wants to complete, as opposed to the training plan that comprises predefined exercises. In one aspect, if a training request is selected by the patient, the service robot 17 checks whether it meets the therapist's specifications. Since gait training typically corresponds to a path of progress (e.g. three-point gait before two-point gait), the patient can freely skip non-essential therapy sections. However, as an alternative to the therapist's specification, automated training plan adjustments and/or approvals can be taken into account, e.g. automated determination of the transition from three-point to two-point gait based on historical data and/or based on the corrections made to the movement pattern that concern other aspects of gait training, such as the distance to be covered, etc. As far as a patient is concerned, this means that patients can select training plan configurations based on automated approvals for specific exercises. Alternatively and/or additionally, the number and/or type of corrections made in the movement pattern can also be used for automated approval.

The service robot 17 may also query information and/or simulate exercises to be completed in the dialog in step 430. The dialog can be performed via a graphical user interface 2071 using a screen (e.g. a touch display or touch-sensitive display 2087) and/or a speech input and output using a speaker 2092 and speech synthesis 2073 or microphone 2093 and speech recognition 2074. For this purpose, depending on the aspect, the service robot 17 may maintain an optimal distance 2067 to the user. Subsequently, the service robot 17 (optionally) navigates to the training area 435 with the aid of algorithms from the destination guidance module 2024 to "move to the destination".

For this purpose, the service robot 17 prompts the patient to follow it by means of the described output units, LEDs, etc., or provides instructions as to where the patient should move. Then the patient can move in front of the service robot 17 or follow the service robot 17, both during navigation to the training area and during training itself. The service robot 17 also moves primarily at a constant distance to the patient, which allows for the improved sensory acquisition of the exercises to be completed.

The service robot 17 calculates a route that the patient and the service robot 17 should or must complete. For this purpose, the mapping module 2061 may be used in conjunction with the metric path planning of the path planning module 2064 and the movement planning module 2065, in one aspect through the use of evolutionary algorithms. Once the training area is reached, training begins. For this purpose, the service robot 17 provides instructions for exercises/corrections in step 440 based on the movement correction module 2022. In the further course of training, with the aid of the movement evaluation module 2050, the execution of the exercises is captured (in the movement extraction module 2051) and evaluated in the movement assessment module 2052. If deviations are detected (step 445 movement evaluation) or the recommended corrections (step 450, movement correction output) have not yet been implemented correctly, step 440 may be generated again. The instructions for the correction of the movement pattern, which are generated, for example, in the form of speech output by means of speech synthesis (and/or are also output via a display), may include instructions for positioning the forearm crutches, straightening the trunk, etc. They may also include not only instructions for direct correction, but also praise.

Steps 440-450 form an iterative process, as multiple corrections may be completed over the course of training, and multiple sub-elements of an exercise may be completed. At the end of the process, the exercises are evaluated in step 455 and data is transferred to the patient administration module in step 460, as already described elsewhere (see FIG. 6). In an optional aspect, the service robot 17 can also accompany the patient (back) to a location in step 465, for example his or her room. Naturally, the patient is continuously tracked during navigation as a general rule. If tracking is interrupted during this time, re-identification must take place.

Data Acquisition and Evaluation, Especially During Training

Figure 8:
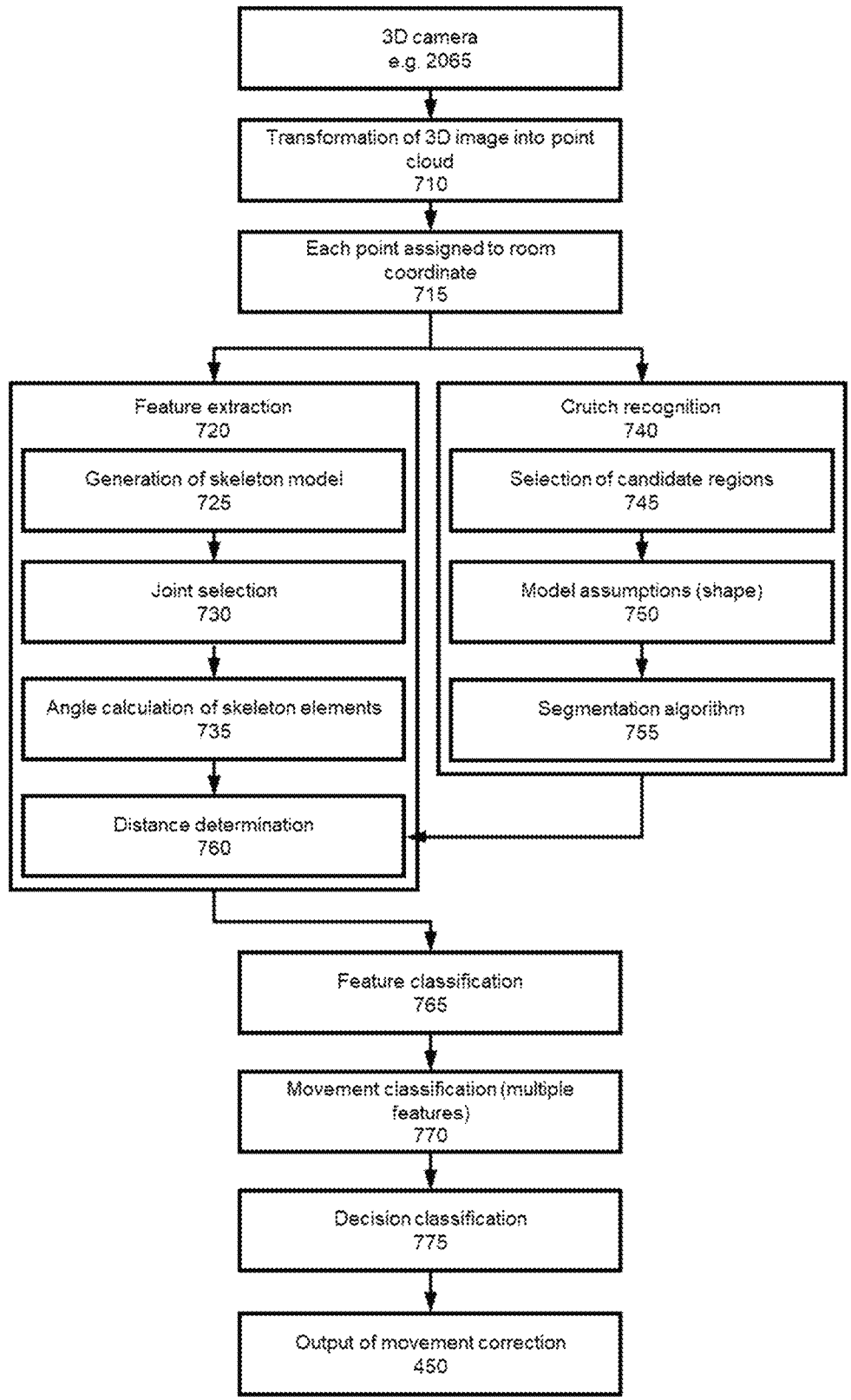
FIG. 8: 3D data acquisition and evaluation.

FIG. 8 illustrates an example of the process of capturing sensor data and evaluating the captured sensor data. In one aspect, movements of the patient are captured using the sensor, e.g. a Kinect 2 or an Astra Orbbec, in which case the camera used is an RGB-D camera 2085. The depth image generated by the 3D depth camera from the sensor data in step 710 is then transformed in step 715 into data used for the representation of a 3D point cloud in which each pixel of the 3D camera is assigned a spatial coordinate. This allows a 3D representation of the environment information.

Figure 20:
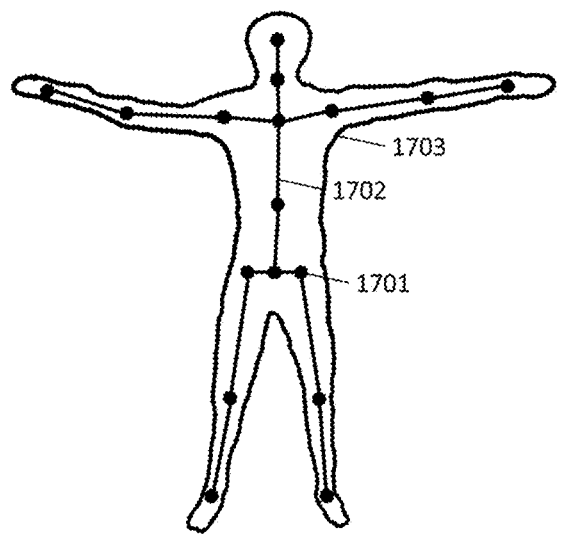
FIG. 20 Skeleton model.

This environment information is next evaluated in step 720 (feature extraction) to create a skeleton model of the patient (step 725, skeleton model creation). Third-party software programs, e.g. NUITrack or the KinectSDK, use the data of the 3D point cloud to derive signals for the acquired color, spatial depth, and skeleton information in step 725. Among other things, these signals contain information about skeleton points of the respective skeleton model, which in turn describe, for example, the knee joint or the hip joint of the patient. FIG. 20 illustrates an example of a skeleton model with the body 1703, the skeleton points 1701, and the connections between skeleton points 1702, which can be output as direction vectors, if specified with directions. If frameworks such as OpenPose are used, a 2D camera such as an ordinary RGB camera can be used instead of a 3D camera.

If there are multiple persons in the image (i.e. not only the patient, but also the therapist, for example), the software is used to represent each of these persons by means of their own skeleton model. The number of recognized skeleton points depends on the one hand on whether the complete person is visible in the image and, on the other hand, on the software used. Skeleton points can also be recognized if the person is not completely visible.

In one aspect, the sensor data of the 3D camera is evaluated in such a way that the distance to each detected object or area of an object as seen from the sensor is determined, with this evaluation depending on the resolution of the 3D camera and the distance of the objects. The angle of view to the 3D camera and the distance of the 3D camera may be used to assign spatial coordinates to the sensor data from the 3D camera. These spatial coordinates are then also in turn assigned to the skeleton points. This way, mathematical vector operations can be used both to define the direction and length of the direction vectors between skeleton points (which also corresponds to the distance) and to calculate the angles between them, etc.

Next, a skeleton point selection takes place in step 730, i.e. only the skeleton points necessary for the calculations to be subsequently performed continue to be processed. Then, in step 735, angle calculations are carried out, e.g. for the angle between the lower leg and thigh, or the angle by which the thigh deviates from the perpendicular, for which a skeleton point is defined in each case as a basis and the orientation of the limbs/trunk and/or e.g. the perpendicular are used as direction vectors as the basis for an angle calculation (see also explanations FIG. 19). Furthermore, distance determinations are made in step 760, e.g.

"time-distance parameters". This category includes, for example, step length, stance duration, step width, and the flexion and extension of the hip and knee joints (depending on the therapy to be performed) over time. These are usually determined over the course of a double step. Example 1 offers a model example of this. For example, the step length can be determined as the Euclidean distance between the foot skeleton points 1950 within the sagittal plane, e.g. in each case at the times of contact of the feet with the ground (to be recognized, for example, by the minimum points of the height of the foot skeleton points 1950 above the ground), which indicates the step length.

As a complement to this skeleton-based processing of the data, step 740 utilizes forearm crutch recognition, also simply referred to as crutch recognition (which in one aspect may also include underarm crutches and/or other types of walking sticks/walking aids). The crutch recognition thus allows the gait pattern to be evaluated in conjunction with gait aids at a later time. The 3D point cloud of the installed depth camera acquired in step 710 also serves as the starting point for this recognition. In step 755, the crutches are found in the point cloud by a real-time and fault-tolerant segmentation algorithm in a segmentation unit. Knowledge about the patient's skeleton is incorporated in order to pre-select suitable candidate regions 745, i.e. areas in the room where the crutches are highly likely to be located. For example, it can be assumed that these represent a downward extension of the arms, e.g. making this area a candidate region for the detection of the crutches. These candidate regions are then tested in step 750 for agreement with model assumptions about the shape of typical crutches (elongated, narrow) and selected if necessary. The crutch position, e.g. the end points 1970 in contact with the ground, are again evaluated as time-distance parameters within the feature extraction 720, e.g. within the distance determination 760.

This is followed by feature classification (or feature evaluation) in step 765, which can be performed according to various criteria. For example, a previously determined and, if applicable, patient-specific threshold value is considered that is either exceeded or not reached, with the extracted feature being evaluated primarily over time. If a patient height of 1.75 m and a step length of 65 cm is considered normal, for example, a step length of 30 cm can be determined by the service robot 17. According to the classification, the maximum permissible deviation of the registered step length is 20 cm. As a standard step length of 65 cm minus a step length of 30 cm measured by the service robot 17 results in a deviation value from the classification >20, the step length of 30 cm would be assessed as too short.

It is also possible, for example, to compare the symmetry of the measured values for the right and left sides of the body and to classify them on this basis. For this purpose, successive values of, for example, the right and left step lengths are stored. The difference between the two measured values is then determined and, if necessary, normalized with respect to a reference variable, e.g. on the basis of the measured value of the operated side as a reference variable. The resulting differences of the two sides of the body (and thus symmetry deviations) can be further evaluated by means of one or more threshold values. To remain with the example of the step length, step length deviations (expressed as absolute values) of 20 cm can serve as a threshold value or 20%, for example, relative to the physiological step length (i.e. that of the non-operated leg)—in contrast to the abnormal step length, which relates to the operated leg and deviates from the physiological step length as a result of the operation.

Once feature classification 765 has been performed, the classified features are evaluated contextually (referred to as movement classification in step 770), i.e. not with regard to individual features, such as step length or step width, but taking into account feature combinations, which are expressed in body poses, for example, and in one aspect taking walking aids into account. This allows statements to be made about the use of the prescribed type of movement (two-point gait, three-point gait). This is done in the same way as feature extraction 720 or feature classification 765 in the movement assessment module 2052. The aim is to output the movement correction (step 450), i.e. output instructions to the patient to prompt him or her to adjust his or her movements in his or her own movement pattern so that these correspond or at least approximate the physiological movement pattern. Feedback is given to the patient by the service robot 17 (indication of errors, request for correction, affirmation of behavior/praise). For this purpose, a rule set is assigned to the movement classification, which can be represented in one aspect as a decision matrix in which corresponding instructions for corrections of this movement pattern are stored for certain poses (e.g. comprising combinations of different feature classifications representing deviations/errors in the movement pattern). FIG. 9 shows this movement correction in step 775, decision classification.

For the correction of the error "Healthy leg is not placed in front of the operated leg" for the three-point gait, for example, the values of the recognition of the step length for the healthy leg must result in "too short" (i.e. must be below a certain threshold) and, at the same time, the distance of the crutches to the healthy leg will be evaluated as "placed too short forwards" (i.e. must be above a certain threshold). If these two and only these two feature classifications apply in this combination, the decision matrix will trigger the following correction as user feedback: "Place the healthy leg past the operated leg, forwards over the imaginary line connecting the crutches." FIG. 9 shows this in schematic form. For example, the training instruction/correction for the above example is only issued if errors 1 and 3 (e.g. defined as deviations from a threshold) have been recognized. Correction output 2 is triggered in turn, for example, when errors 1, 2, and 4 occur in combination, and so on. As patients initially make multiple deviations in the movement pattern and not all errors can be corrected simultaneously, therapists can define a prioritization of the movement correction (to be discussed in the next section). That is, not every error detection leads to the output of a training instruction/correction on the part of the service robot 17, since there is usually a minimum time and distance between two corrections. However, recognized errors, i.e. movement classifications 770 to which, for example, a correction has been assigned, can still be stored and provided to the therapist, which will be described in more detail in the following section.

The matrix in FIG. 9 need not be deterministic, i.e. a correction output does not necessarily have to be stored for each detected deviation of the movement pattern from the physiological movement pattern that is output when that deviation occurs. In one aspect, the output can also be dynamic. The correction outputs can also be prioritized, for example. For this purpose, different priority scores are assigned to specific deviations. The service robot can then issue a certain number of outputs per time interval, whereby only the outputs with the highest priority, i.e. those with the highest priority scores, are issued. In one aspect, defined delay periods can be stored for this purpose after a detected deviation, after which the output of a movement correction 450 occurs, e.g. within these delay periods of the correction output with the highest priority.

In one aspect, therapists can influence the rule set of the movement correction, such as the decision matrix for movement classification 770, by making settings in the patient administration module such that certain poses/instructions are prioritized and others are ignored, if applicable, which means the movement correction is adaptive. This information can be transmitted to the service robot 17 along with the training plan and is accordingly available in the movement training module 2011. Such settings, along with the training plan settings, can be learned and suggested to the therapist via the suggestion function in the learning module 190, and in a further aspect can also be carried out automatically by the service robot 17, as discussed in more detail below.

Model for the Improvement of the Suggestion Algorithms of the Patient Administration Module, Particularly with Respect to Training Plans, and the Implementation of Suggestions As described above, after viewing the evaluations of the movement training that the service robot 17 has performed with the patient, therapists can modify the training plan for the patient to improve the treatment results. In one aspect, the system illustrated in FIG. 3 is capable of suggesting training plan adjustments to the therapist based on past data. For example, the rules implemented here can suggest switching back from the two-point gait to the three-point gait if the patient makes too many errors in the two-point gait, is too slow, persists in putting too much weight on the operated leg, etc. Such suggestions can be accepted or rejected by the therapist. In an alternative and/or additional aspect, the service robot 17 even makes these past-based training plan adjustments automatically. The basis for this system capability is a self-learning system as shown accordingly in FIG. 10. This self-learning system iteratively increases the quality of the therapeutic success, which is achieved mainly in two ways:a) capturing situations that have not been described before because they may be rare and b) increasing the number of cases. Both of these allow more precise weight determinations of the node weight in the context of machine learning models and/or neural networks that improve the effectiveness of the therapies performed by the service robot 17.

The patient administration module 160 has the function of providing treatment suggestions to the therapist 1330. In the first stage, the patient administration module 160 receives patient data about the patient, either through input by the therapist and/or via the interface to an external system, such as a hospital information system (HIS)/patient data management system 170. Factors are recorded here that have an influence on the structure of the therapy, such as parameters relating to the patient's general mobility or agility (degree of independence, possible paralysis of the extremities, aids to be used) 1310, comorbidities (heart failure, myocardial infarction, dizziness, diabetes, diseases associated with an increased risk of falling, such as Parkinson's disease) 1315, and above all the reason for completing the training (such as a hip TEP on the right due to arthritis) 1320. Here, in one aspect, the operative type of surgery can also be recorded (direct anterior approach, lateral approach to the hip, etc.) 1325, which affect the musculature to varying degrees during surgery and therefore may also require different postoperative therapies. Typically, the therapist 1330 determines a training plan 1335 for each patient.

In the rule set memory 152, standardized training plans 1335 are indicated for this, which are transferred to the patient administration module 160 via an interface (not shown in FIG. 10 for purposes of simplification), which in one embodiment are suggested to the therapist 1330, and in another embodiment are selected automatically. Here, for example, agility 1305, the location of the operation 1320 (e.g. knee, hip) and/or the type of operation 1325 are taken into account accordingly, i.e. the training plans are differentiated according to these parameters, whereby the training plans, in one embodiment, may also be clinic-specific and, in that case, can be configured as such, for example, by means of the patient administration module 160. When transmitted to the GUI in FIG. 5, the therapist 1330 may already be shown a pre-selection of options, such as the three-point gait 1345 from the second postoperative day, the transition from three-point gait to two-point gait 1340 from postoperative day 4, the approval for climbing stairs three days after surgery 1350, and a maximum route distance of 300 m, with two exercises per day. The configuration of the training plan 1355 is therefore a function e.g. of the starting day, the duration of the exercises, the route, the frequency of the exercises, the intensity of the exercises, etc. The totality of parameters that are either defined by the therapist, already predefined, and/or automatically predetermined by the rule set 150 constitute the training plan 1335.

This training plan 1335, in one aspect also together with patient data, such as the body size and if applicable also comorbidities, the type of operation, etc., is transmitted to the service robot 17 via an interface 1360 and stored in a memory 1405. As shown in FIG. 7, the service robot 17 performs the gait training and, if necessary, makes automated adjustments to the training plan 1335. Subsequently, an evaluation of the exercises 2013 (gait training) takes place in the service robot 17 with respect to the variables shown, for example, in the GUI representation in FIG. 11, which can be implemented in the module for evaluating the exercises 2013. This data is transferred to the cloud via an interface 1360 and is incorporated into the learning module 190. Alternatively and/or additionally, the data captured by the service robot 17 is not yet processed with respect to the training plan evaluation as shown in FIG. 11, but only the raw data (such as the measured step length) is transmitted to the patient administration module 160 and/or the rule set 150, where the evaluation is then performed and the data is processed as shown in FIG. 11 (in case of data processing in the rule set 150, this data is subsequently transmitted to the patient administration module 160). There, for example, the abnormal step lengths measured would be set in proportion to the normal (physiological) step length. Depending on the aspect, the data processed in this way can then also be transmitted back to the service robot 17 via the interface 1360 in one or both cases.

In the context of the evaluation 1406, it is shown (FIG. 11) how long a training session lasted per day, what distance was covered by the patient, and what was the speed of the patient, including a determination of day-to-day progress. Furthermore, it is shown which specific deviations from the physiological movement pattern occur, in particular with regard to key parameters, including the crutch use sequence determined by the service robot 17, stance duration, free leg phase, trunk/gaze, step length and/or step width. The progress of therapy is also shown in each case, as well as, in one aspect, which corrective measures have been initiated in the course of the therapy. Furthermore, the therapist 1330 can, in one aspect, receive instructions for the individual therapy he or she is to implement in order to target individual deviations from the desired movement pattern or to specifically control the course of the therapy.

To be able to provide therapists 1330 with suggestions for adjusting the training plan, or to be able to perform automated training plan adjustment, data from the evaluation of gait training over time 1406 is transmitted to the learning module 190 in the cloud. As explained above, this transmitted data also includes outputs of movement corrections 450 issued by the service robot 17 or deviations of the movement pattern associated with these corrections. This data is stored in the learning module memory 192 of the learning module 190 and, if already present, supplements historical data 1505 originating from past training, although this historical data 1505 could and should originate from more than one patient and more than one therapist. Included in this dataset are training plans 1335 defined prior to the training, as well as plan adjustments, whether made by a therapist or by means of previously created training plan adjustment rules 1515.

Machine learning models and/or neural networks are then used to make weight determinations for node weights in the nodes of the neural networks and/or learning models for a training plan adjustment 1510. In the process, the evaluation of movement training over time 1406 at an initial time t performed by the service robot 17, possibly in conjunction with the rule set 150 and/or patient administration module 160, and patient data such as the patient's age, height, person weight, comorbidities, type of operation, etc. (1310-1325) are taken as input variables, and the training plan settings for training at later time t+1 or t is taken as an output variable. Once such node weights have been determined, they can be used to make predictions based on evaluations of the movement training determined by the service robot 17 (possibly in conjunction with the rule set 150 and/or patient administration module 160) as to which settings the therapist would or should make, for example. These settings may be training plan adjustments as well as leaving an already defined training plan at its default settings. Finally, default settings can also be defined in this way.

In a next step, the determined node weights are transferred to the rule set 150, where any node weights from previous determinations are updated. Based on the node weights, rules derived from the node weights can then be updated in the next step (e.g. the duration of training is extended if a certain speed prevails on a certain day and in consideration of other parameters).

These training plan adjustment rules 1530 are then transmitted to the patient administration module 160 in step 1535, where the rules 1530 are operationally applied, i.e. based on a standard training plan, which may be clinic or therapy-specific, based on training results determined by the service robot 17 and, if applicable, on the training progress, as well as parameters of the patient, such as the patient's age, height, person weight, comorbidities, type of operation, etc., suggestions for therapy and/or therapy adjustment are made to the therapist which the therapist may confirm, reject, or modify. Moreover, in one aspect, these rules 1530 may also be transmitted directly to the service robot 17 to allow the service robot 17 to make autonomous adjustments to the training plans.

Figure 10:
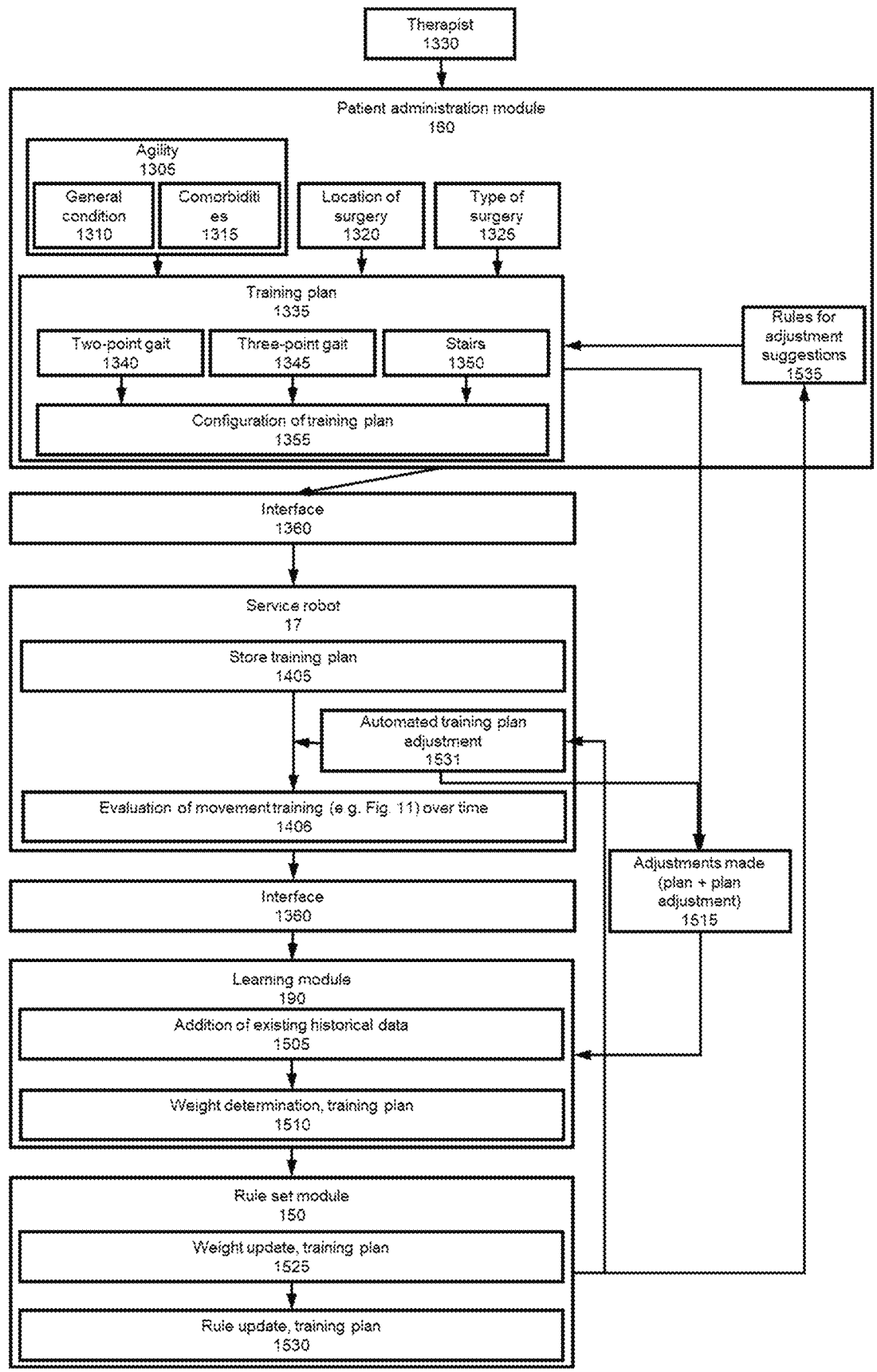
FIG. 10: Self-learning method for training plan adjustment.

The system outlined in FIG. 10 may either perform a recalculation of the node weights after completion of each exercise, or may perform this recalculation only at specified intervals, in which case the data relevant to the recalculation of the node weights is temporarily stored. If the node weights are not recalculated, the rules stored in the rule set 150 or the rules stored in corresponding modules of the service robot (e.g. 2012) are used. For example, the automated adjustment of the training plan 2012 can also be performed in the patient administration module, i.e. the suggestions for plan adjustment 1535 are not implemented in the form of suggestions, but instead an automated plan adjustment takes place directly, which does not require therapist intervention.

Improving Movement Assessment and Movement Correction

The movement assessment in the movement assessment module 2052 in a first stage and a movement correction in the movement correction module 2022 in a second stage (implemented in the service robot 17) essentially determine how well errors in the movement pattern are recognized and subsequently corrected. The movement assessment and the movement correction play a joint role in the success of the therapy. The algorithms implemented here can be continuously improved, as described in the following. An improvement mainly achieved in two ways: a) capturing situations that have not been described before because they may be rare and b) increasing the number of cases. The capturing of previously undescribed situations and the increase in the number of cases ultimately allow more precise evaluations, and in the case of an evaluation using machine learning and/or neural networks, for example, more precise weight determinations of the node weights can be made.

Figure 12:
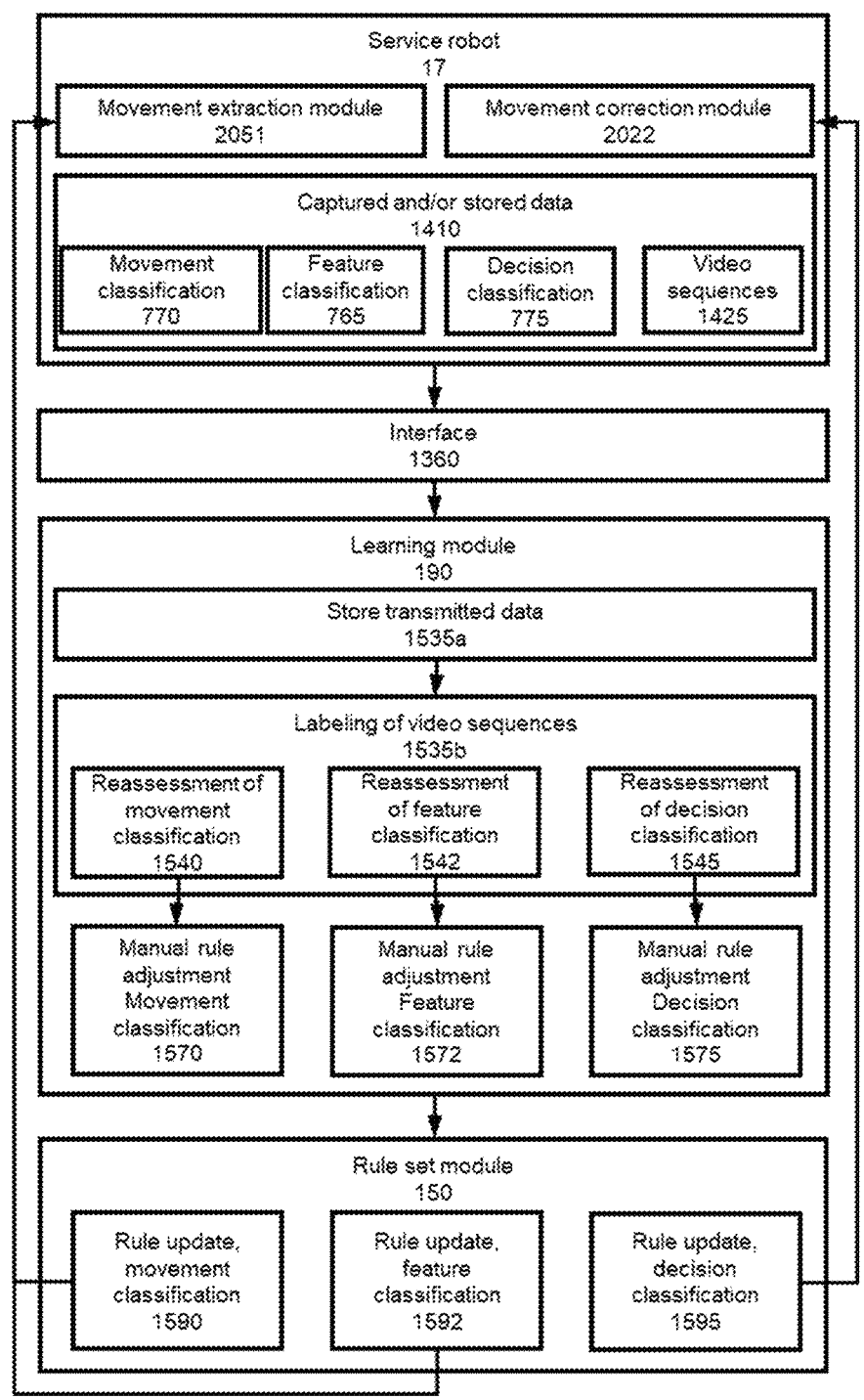
FIG. 12: Method for improving movement correction and movement assessment based on labeled video sequences.

FIG. 12 describes the underlying system and the procedure. In the first step, the service robot 17 performs the movement training with a patient. Feature extraction of the movement pattern takes place in the movement extraction module 2051, and output of the movement correction 450 takes place in the movement correction module 2022, which is characterized by the processes of feature extraction 720, feature classification 765, movement classification 770, movement correction, decision classification 775, and output of the movement correction 450.

To perform the method, the service robot 17 then acquires the data about the movement pattern of the person (i.e. the patient) and/or stores this captured data in a step 1535a. The captured data includes captured movement parameters such as the executed patient movements, executed movement classification 770, executed feature classification 765, and/or executed decision classification 775 and/or executed output of movement correction 450, and/or video sequences 1425 documenting the movements of the patient originating from an RGB 2D camera 2084 and/or RGB 3D camera 2085. In one embodiment, the movement parameters also include movement classifications 770 and feature classifications 765. This data is transmitted to the learning module 190 via the interface 1360, where it is stored 1535a.

The video data containing the video sequences are previously anonymized (not shown in FIG. 12) in such a way that facial features are pixelated, rendering the identity of the person indiscernible when viewing the videos. Such solutions are familiar in the state of the art and are used to automatically render image elements such as faces or license plates unrecognizable (through pixelation or blackening) and are available, for example, as product solutions from 3DIS GmbH or Guardian Project.

Therapists can access this data via a terminal and view and record the recorded video data and various aspects of the movement pattern. The therapist pays attention, for example, to personal parameters, such as the patient's step length, step width, and/or posture of the upper body, including the shoulder area. The therapist enters these personal parameters (step length, step width, posture, etc.) into the movement assessment module 2052 together with the associated video sequences and applies a "label" to this information 1535b, i.e. the therapist marks the recorded movement patterns and differentiates the movement pattern as "abnormal" or "physiological" for the movement assessment in the movement assessment module 2052. The therapist differentiates between normal=physiological step lengths, step widths, and postures on the one hand and disease-related=abnormal on the other. Here, labeling by the therapist represents a movement pattern and/or feature classification. The movement pattern and/or feature classification is continuously re-evaluated in step 1540 and 1542 after an initial capture and labeling, with an additional re-evaluation of the decision classification 1545 possibly resulting, which is practically equivalent to an adjustment of rules in the decision matrix in FIG. 9.

This adjustment may also entail a manual rule adjustment of the movement classification 1570, the feature classification 1572, and/or the decision classification 1575. This may mean, for example, that for a particular movement classification (i.e. for example, a combination of movements of the crutches and legs, trunk, etc.), the movement correction (output of instructions based on speech synthesis and/or indication on the display) must be redefined or specified and/or a threshold value in the feature classification (e.g. step length) must be adjusted. These rule adjustments are ultimately transmitted to the rule set 150, where the rules for or movement assessment 1590, feature classification 1592, and/or decision classification 1595 are updated. These updates to the rule set 150 are transmitted (via an interface, not shown) to the movement extraction module 2051 for feature extraction of the movement pattern and/or the movement correction module 2022 in the service robot 17, thereby updating the process chain feature classification 765, movement classification 770, and decision classification 775, and, if applicable, outputting the movement correction 450. A re-evaluation of the movement pattern may, in one aspect, also ultimately require that the feature extraction of the movement pattern in the movement extraction module 2051 likewise be adjusted.

Figure 13:
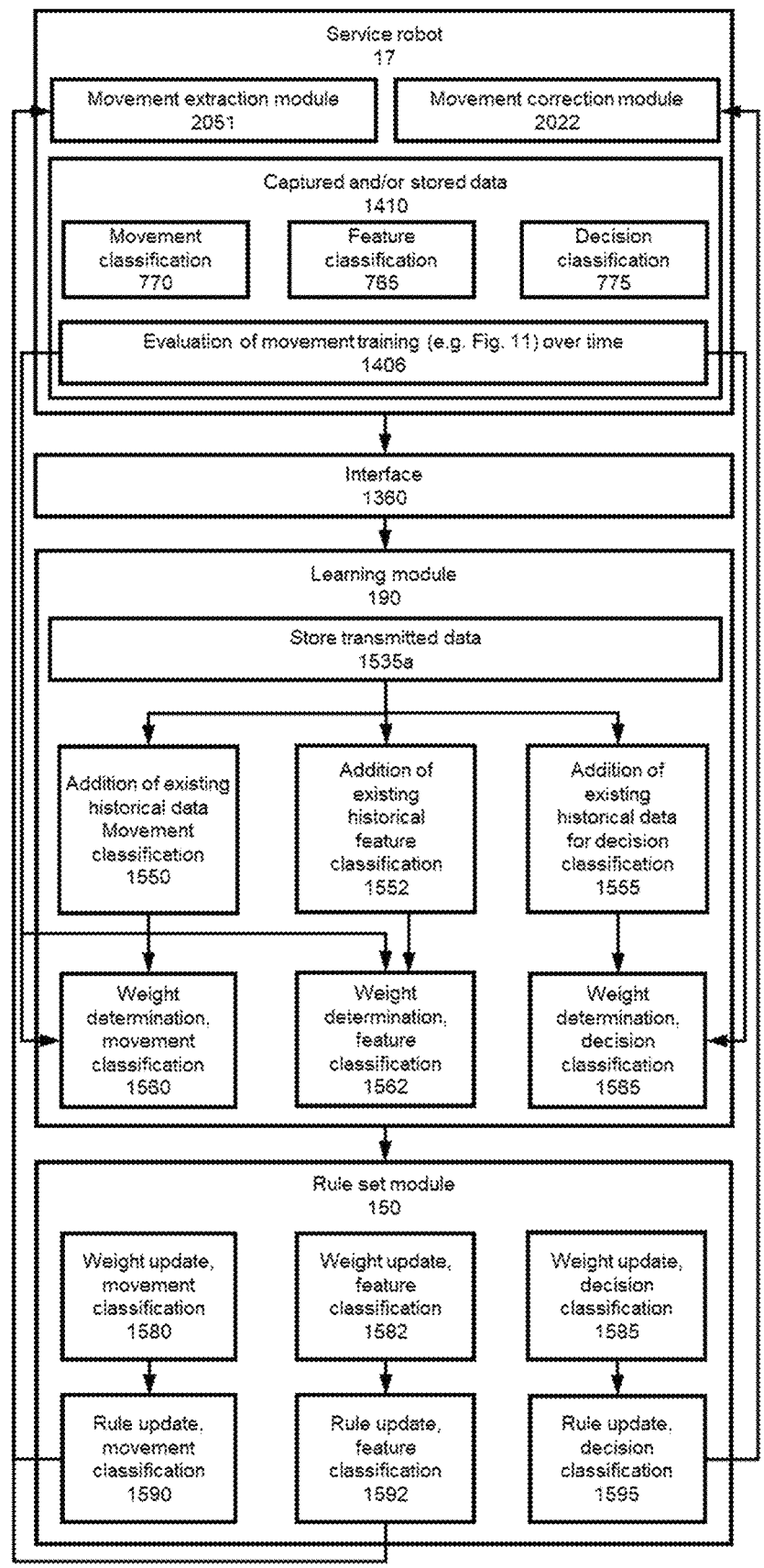
FIG. 13: Automated improvement of the correction and assessment of the movement pattern.

Alternatively and/or additionally, re-evaluation of the movement pattern 1540 and/or re-evaluation of the decision classification 1545 may be performed automatically. FIG. 13 illustrates this method, in which a model is trained and then used to evaluate the movement pattern and movement correction. The service robot 17 performs the movement training with a patient. A feature extraction of the movement pattern takes place in the movement extraction module 2051 and the training instruction/correction is carried out by the movement correction module 2022. In the process, the service robot 17 captures data and/or stores this captured data in step 1410. This includes the movement parameters, i.e. the movements performed by the patient, in one aspect the movement classifications 770, feature classifications 765, and/or decision classifications 775 performed by the patient. Furthermore, the evaluations of the movement training (as shown, for example, in FIG. 11) 1406 are also included. These evaluations of the movement training are transmitted to the learning module 190 via the interface 1360, where it is stored 1535a. In one aspect, storage occurs in a database, thereby supplementing existing historical data of the data collected by the service robot 17 with respect to the movement classification 1550 and feature extraction 1552 and/or historical data of the decision classification 1555, which are supplemented with the newly stored data.

Including the evaluation of the movement training over time 1406, as shown for example in FIG. 11, a weight determination of the node weights of the movement classification 1560, the feature classification 1562 and/or the decision classification 1565 can be performed in a learning model or a neural network. For this purpose, comparable to the determination of the node weights in the training plan adjustment, machine learning algorithms, e.g. clustering methods, support vector machines, as well as regression methods and/or neural networks, e.g. convolutional neural networks, may be used. Here, the evaluations of the movement training, e.g. distance covered, stance duration, free leg phase, etc., are used as direct values and/or as output variables calculated as an improvement over the previous period.

The determined features of the movement pattern, including in one aspect the movement classifications 770 and/or feature classifications 765 and/or decision classification 775 and/or output of the movement corrections 450 made, as well as the patient's personal parameters, such as the patient's age, height, person weight, comorbidities, type of operation, etc. (not shown in FIG. 13) are used as input variables. As a result of these methods, new node weights are generated and transmitted to the rule set 150, which result in a weight update of the node weights on the side of the movement classification 1580, feature classification 1582, and/or decision classification 1585. These node weight updates, in turn, result in rule updates for movement classification 1590, feature classification 1592, and/or decision classification 1595. These updates to the rule set 150 are transmitted (via an interface, not directly shown) to the movement extraction module 2051 for feature extraction of the movement pattern and/or the movement correction module 2022 in the service robot 17.

The two described methods of determining the node weights using machine learning and/or neural networks make it possible, for example, for only those movement corrections to be made that demonstrate actual success in terms of therapeutic progress. This can also result in fewer corrections being made by the service robot 17, which can lead to a savings in energy consumption and processing time on the part of the service robot 17. With regard to the features of the movement pattern—if there are fewer features to be recognized, for example—the recognition times can be reduced, on the one hand, and, on the other, the energy consumption required for the calculations can be reduced. Moreover, in contrast to video-based labeling by a therapist, lower bandwidths can be used in data transmission between the service robot and the cloud.

In one aspect, a re-evaluation of the movement pattern may also ultimately mean that a readjustment of the feature extraction 720 in the movement extraction module 2051 is necessary for feature extraction of the movement pattern.

In one aspect, the methods for manually improving the movement assessment and manually improving the movement correction and based on machine learning and/or neural network approaches may also be combined.

APPLICATION EXAMPLES

Example 1: Recognition and Evaluation of the Three-Point Gait

For the evaluation of the three-point gait by the service robot 17, in particular of the movement pattern, a number of definitions are initially relevant. The step length of a person is defined as the Euclidean distance between the ankles, i.e. the foot skeleton points 1950 recognized by the skeleton model, during a gait cycle. A gait cycle consists of a swing phase and a stance phase for each leg. The swing phase begins when the foot is lifted off the ground and continues as long as the foot is in the air and the leg is advanced forward. Once the foot, ideally the heel, touches the ground (initial contact), the stance phase begins. The stance phase of a leg is defined as the period in which the foot is on the ground, as is also evident from the skeleton model, which also identifies the plane corresponding to the floor. During a gait cycle, the right and left legs each have a step length that always refers to the leg that makes initial contact with the ground after completing its swing phase. In contrast to the step length, the step width is defined as the distance between the two heel centers and lies in the range of 5-13 cm, which can also be determined via the distance between the identified ankles in 1950 within the frontal plane.

As explained above, the positions of joints of the patient in the skeleton model in space are output as skeleton points in step 725. Although the Kinect 2 used in this example does not show poses of body parts in the skeleton model, these poses can be modeled by connecting adjacent skeleton points that the Kinect detects, which is implemented in the scope of feature extraction 720 in step 735.

Figure 19:
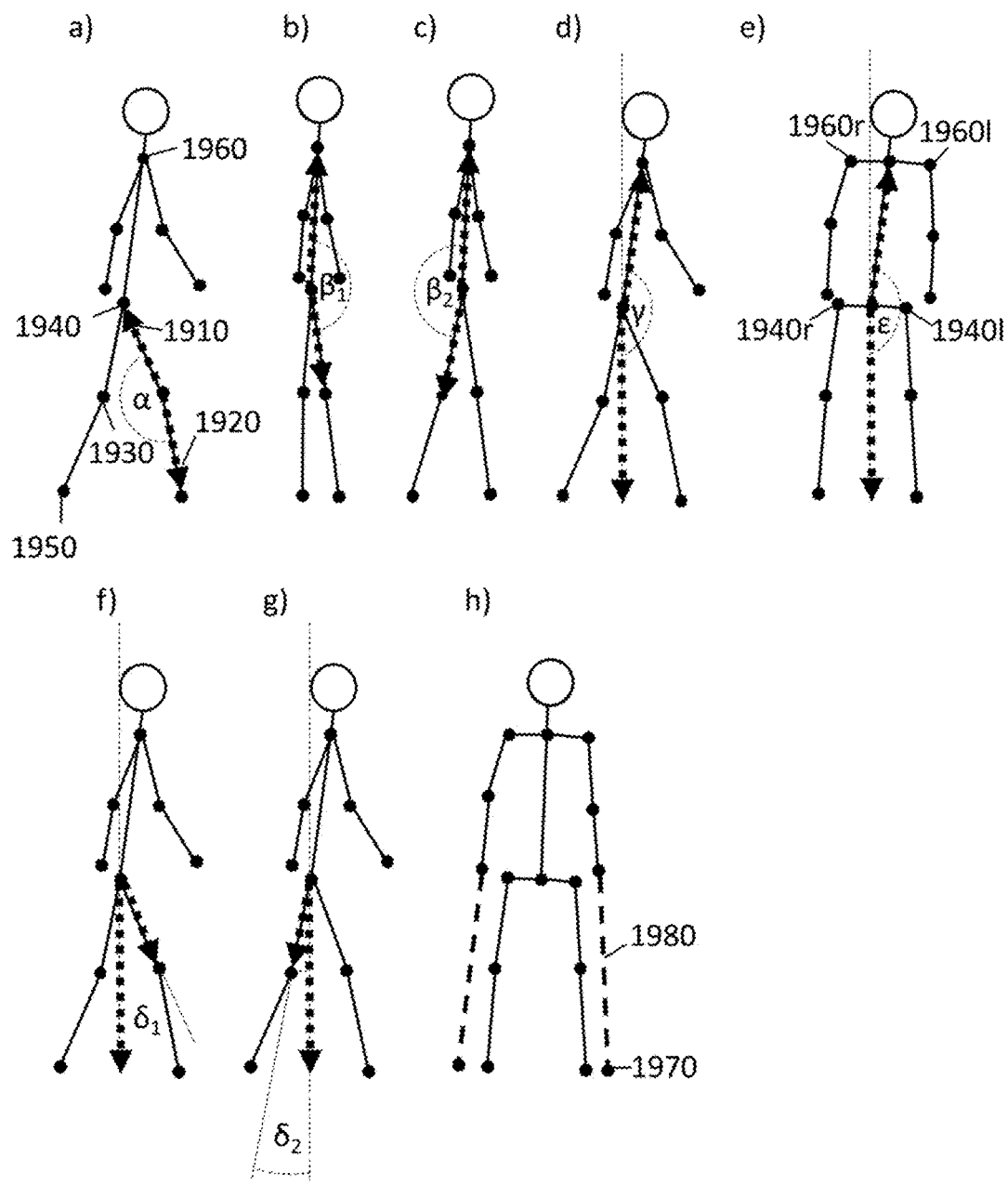
FIG. 19 Angle of limbs and trunk.

FIG. 19 illustrates this modeling. In this, some recognized skeleton points are also shown as filled circles as an example. Direction vectors between detected skeleton points are calculated by a mathematical operation, e.g. by creating a vector between the 3D coordinates of adjacent skeleton points. In FIG. 19, they are drawn in the form of dashed arrows between adjacent skeleton points. For example, as shown in FIG. 19 a), the angle α of the knee skeleton point 1930 can be defined by the two direction vectors 1910 and 1920, which correspond to the course of the thigh and lower leg. In this case, the first direction vector 1910 is calculated from the knee to the hip skeleton point and the second direction vector 1920 is calculated from the knee to the ankle skeleton point (or foot skeleton point) by determining a connecting line between a knee skeleton point 1930 and the hip skeleton point 1940 or between the hip skeleton point 1940 and the ankle skeleton point 1960. Analogous calculations are also possible for the arms, for example. In FIG. 19 a) the specified angle α indicates the knee flexion as an example. The determination can be made, for example, during the stance phase, i.e. in the phase from the first contact of the heel with the ground to the transition towards weight transfer by the other leg, which simultaneously initiates what is referred to as the free leg phase for the leg under consideration.

To obtain the values for flexion and extension of both hip joints, the corresponding shoulder and knee points are used. The angle is determined using two direction vectors, one extending from the hip skeleton point 1940 to the knee skeleton point 1930 and the other from the hip skeleton point 1940 to the shoulder skeleton point 1960 (in each case on the respective side, i.e. right hip skeleton point 1940*r* to right shoulder skeleton point 1960*r*, for example). Flexion, especially hip flexion, is said to occur when a leg is oriented forward from the perpendicular, i.e. the angle of flexion is generally defined by the direction vector 1910 (shown in reverse orientation) when the leg is beyond the perpendicular in the walking direction in front and the direction vector between the hip skeleton point 1940 and the shoulder skeleton point 1960 (see FIG. 19 b) with angle $\beta_1$). Extension, on the other hand, is defined as the backward orientation of the leg, i.e. the angle of extension is defined by the direction vector toward the shoulder skeleton point 1960 and the direction vector 1910 (shown in reverse orientation) between the hip skeleton point 1940 and the knee skeleton point 1930 when the leg is beyond perpendicular in the walking direction behind it (see FIG. 19 c) with angle $\beta_1$). In one aspect, the determination of the angles can be bilateral.

The flexion and extension angle of the hip, in turn, is influenced, for example, by the forward lean of the trunk, which has an effect on the movement pattern. This is why, for example, the angle of the forward lean is additionally captured, which results from the direction vector from the middle hip skeleton point 1940 to the middle shoulder skeleton point 1960 and the perpendicular running through the middle hip skeleton point 1940 (see FIG. 19 d) with the angle of inclination γ.

These calculations result in the sagittal plane, but are also performed in a similar form in the frontal plane, which is exemplified in FIG. 19 e) using the lateral lean of trunk. Here, a direction vector parallel to the perpendicular and a direction vector parallel to the spine are used, between which a lateral inclination angle E is spanned.

Alternatively, calculations are also possible which refer to complementary, supplementary, and/or secondary angles, and/or which include the perpendicular for determining the extension and/or flexion of the knee, hip or other limb, for example. FIG. 19 f) and g) show an example of this, with the hip joint extension with the hip extension angle $\delta_1$ visible in g) and the flexion with the hip flexion angle $\gamma_2$ visible in f). In addition to this, the angle can be used e.g. together with the angle of the lean of trunk γ to come to the angles β, etc.

FIG. 19 h) shows an example of a skeleton model in which the end points 1970 of crutches 1970 are shown, which are used elsewhere, for example, to determine the distance to the foot skeleton points 1950. The crutches are indicated by dashed lines 1980, because they are not part of a skeleton model in frameworks such as OpenPose etc.

Figure 14:
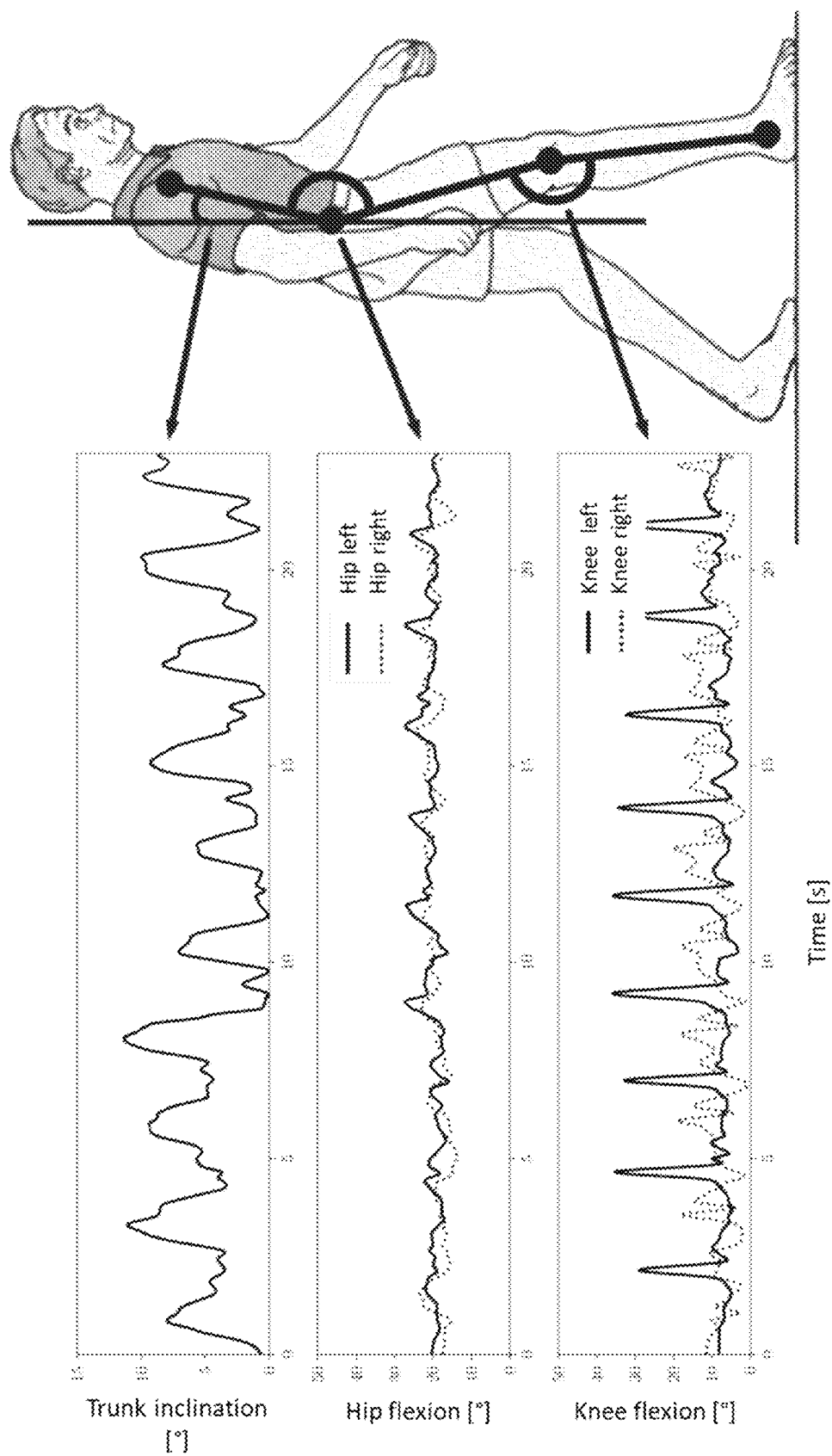
FIG. 14: Sequence of lean of trunk, hip flexion, and knee flexion of a patient with a prosthesis (TEP) in the right hip.

FIG. 14 illustrates the further evaluation over time on the right side of the patient. The plotted curves illustrate lean of trunk (top), hip flexion (middle), and knee flexion (bottom) over a duration of 23*s* for a patient with TEP (total endoprosthesis) in the right hip. For the left knee, the flexion is significantly more pronounced (i.e. there are stronger amplitude excursions here), which can be attributed to the asymmetric postoperative movement pattern, which is manifested, among other things, in a longer step length on the non-operated side.

Gait training, which is accompanied by the service robot 17, takes place shortly after the operation and, as described, patients must first complete the three-point gait and then the two-point gait. The three-point gait and the two-point gait involve the use of forearm crutches to reduce the load on the operated joint. Before a patient can begin robot-assisted gait training, the patient is instructed by a therapist in how to use the service robot 17. In addition, the therapist must explain to the patient how to use the crutches when sitting down and standing up, turning in place, and opening doors, as well as the process of crutch placement during three-point gait. The therapist then approves training with the service robot 17. As soon as the therapist receives feedback from the service robot 17 via the patient administration module that it is possible to switch to the two-point gait, the therapist shows the patient the correct procedure for crutch placement for the first time and, if applicable, reviews the suggestion of the service robot 17 before "approving" this gait.

For this reason, the crutches must also be detected. The service robot 17 uses depth data from the Kinect2 3D sensor for this purpose. The depth image is converted to a point cloud in the first step 710, using the point cloud library described in the "State of the art". This point cloud is segmented into smaller point clouds based on the patient's skeleton model in the next step 745. This takes advantage of the assumption that the crutches must be located close to the forearms and hands and roughly parallel to the legs, i.e. a selection is made according to candidate regions. This allows standard segmentation and fitting algorithms to be efficiently used to evaluate one of the smaller point clouds near the forearms/hands/legs in step 755. It is instrumental here that certain model assumptions can also be made in step 750 that take into account the shape of the crutches, i.e. the segmentation algorithm/the generation of the 3D data accounts for the fact that the crutches are quite thin relative to the patient's limbs. For example, the RANSAC framework can be used to segment the corresponding point clouds with high accuracy and robustness in real-time (30 fps). Alternatively and/or additionally, classification rules created by plotting crutches, e.g. from different perspectives, can be used to identify crutches on an image.

Based on the identified crutches, it is possible to further evaluate these identified crutches, in particular relative to the skeleton model, for which purpose the movement classification in step 770 is used. This essentially involves an evaluation of the position of the two feet relative to the identified crutch position. In a correct movement pattern in the three-point gait, the patient places the leg of the operated side forward at the same time as the two crutches, thereby achieving maximum relief for the operated joint. The crutches take weight off the operated leg during the entire stance phase and are only moved again during the transition to the swing phase. Since the movement of the crutches is largely simultaneous with that of the operated leg, a straight line is defined between the two crutch end points in 1970 and the distance of the foot points to this straight line is evaluated. In an alternative or additional aspect, the direction of movement of the patient is determined, i.e. the orientation of his or her sagittal plane, which can be achieved, for example, through the position and/or direction of movement of the arms, the legs, and/or the orientation of the pelvis, and/or the shoulders. Alternatively and/or additionally, the patient is tracked over a defined period of time and the orientation results from the patient's movement over time. In a next step, orthogonal to the direction of movement or the orientation of the patient, a line can then be determined that runs through the crutches and at which the distance of the foot points is evaluated. This allows typical errors in the three-point gait, such as premature or delayed placement of the crutches and relieving of the wrong leg, to be identified by means of a statistical evaluation of the distance curve. A deviation from the ordered gait, e.g. towards a disordered/incorrect gait pattern, can be detected by evaluating the crutch position relative to the patient's body. Based on the definition of three-point gait described above, both crutches are at approximately the same height in the sagittal plane of the patient when executing a correct gait. Deviations in this position that exceed a suitable threshold can then be detected as errors in the movement pattern.

FIG. 15 illustrates crutch use over time. The upper timing diagram shows the height of the crutches above the floor (left crutch: higher amplitudes on average, i.e. the solid line; right crutch: smaller amplitudes on average, i.e. the dashed line). This information, i.e. in particular ground contact, is used to evaluate the distance of the crutches to the ankles, as illustrated by the lower timing diagram. For this purpose, the forward placement of the operated leg to the height of the (invisible/imagined) "connecting line" between the crutches is mapped here over time. An ideal curve would have its minimum close to the at least the upper curve (i.e. at the vertical dashed lines). An undesirable pattern of crutch placement can therefore be concluded from the example shown in FIG. 15. This patient first places the crutches, then the operated leg, and finally the healthy leg. The output of the movement correction 450 then informs the patient that the patient should advance the crutches forward as simultaneously as possible with the operated leg. This makes the patient's movement pattern more fluid and less choppy. Further parameters can be derived from this timing curve. These are "crutch placed too short/far", which leads to unequal step lengths, and "crutch placed too late" (foot of the operated leg contacts the ground earlier than the crutches), which would lead to an undesirably high load on the operated leg.

In addition to feature extraction in step 760, the service robot must distinguish 17 abnormal movement features from physiological movement features. This classification must be performed in real-time while the patient is moving behind a service robot 17. Physiotherapists perform the classification of whether step length, stance duration, step width, leans of trunk or joint deflections/movements are within the physiologically typical ranges. For this purpose, movements of healthy persons and physically impaired persons are recorded by means of the Kinect device and a 2D camera 2084 and the movements of the persons, broken down to each individual movement, are labeled, which happens in each case by utilizing time stamps in the labels as well as in the recordings of the Kinect device. In the process, features are labeled that include movement errors as well as those that include a correct movement pattern. The time stamps are used to synchronize labeled data and the 3D recordings from the 3D camera.

Since the physiological deviations of movement features can have many different facets, an evaluation based on absolute value deviations from thresholds is not very efficient. It is more efficient to evaluate the similarities of the movements of the two legs over a gait cycle (i.e. double step). In this case, similarity is determined by the ratio of step lengths, stance duration, step angles between leg with and without prosthesis, etc. FIG. 16 shows the sequence of stance durations of a patient with a prosthesis in the right hip a few days after surgery over the course of four gait cycles. The width of the vertical lines indicates the stance duration of one leg, with the narrower intervals (stance duration on the right) referring to the operated side. The patient in FIG. 16 therefore put weight on his operated right leg for less time than the healthy leg in order to minimize the pain when putting weight on the operated leg. Furthermore, the different step lengths can be seen in the diagram. The curve shown is determined from the distance between the ankles (sagittal plane). The minima result at the moment when the ankles are at the same height. The maxima represent the maximum distance between the ankle of the leg placed forward and the ankle of the standing leg. It can be seen from the diagram that the left, non-operated leg takes a significantly shorter step compared to the right leg. Optimal for the gradual increase in load in the operated leg and for maintaining a fluid movement pattern would be to take steps of equal size. The relationship between step length and stance duration of both legs can be considered a suitable tool to characterize a patient's gait as physiological or abnormal, with a classification as "abnormal" resulting in the output of a movement correction 450.

To differentiate physiological and abnormal movement patterns, the F1 score is evaluated, which differentiates both classes (errors/deviations vs. correct movement execution), which can be calculated for different thresholds. The F1 score is generally defined as $$F=2*(\text{precision}*\text{recall})/(\text{precision}+\text{recall}).$$

Figure 17:
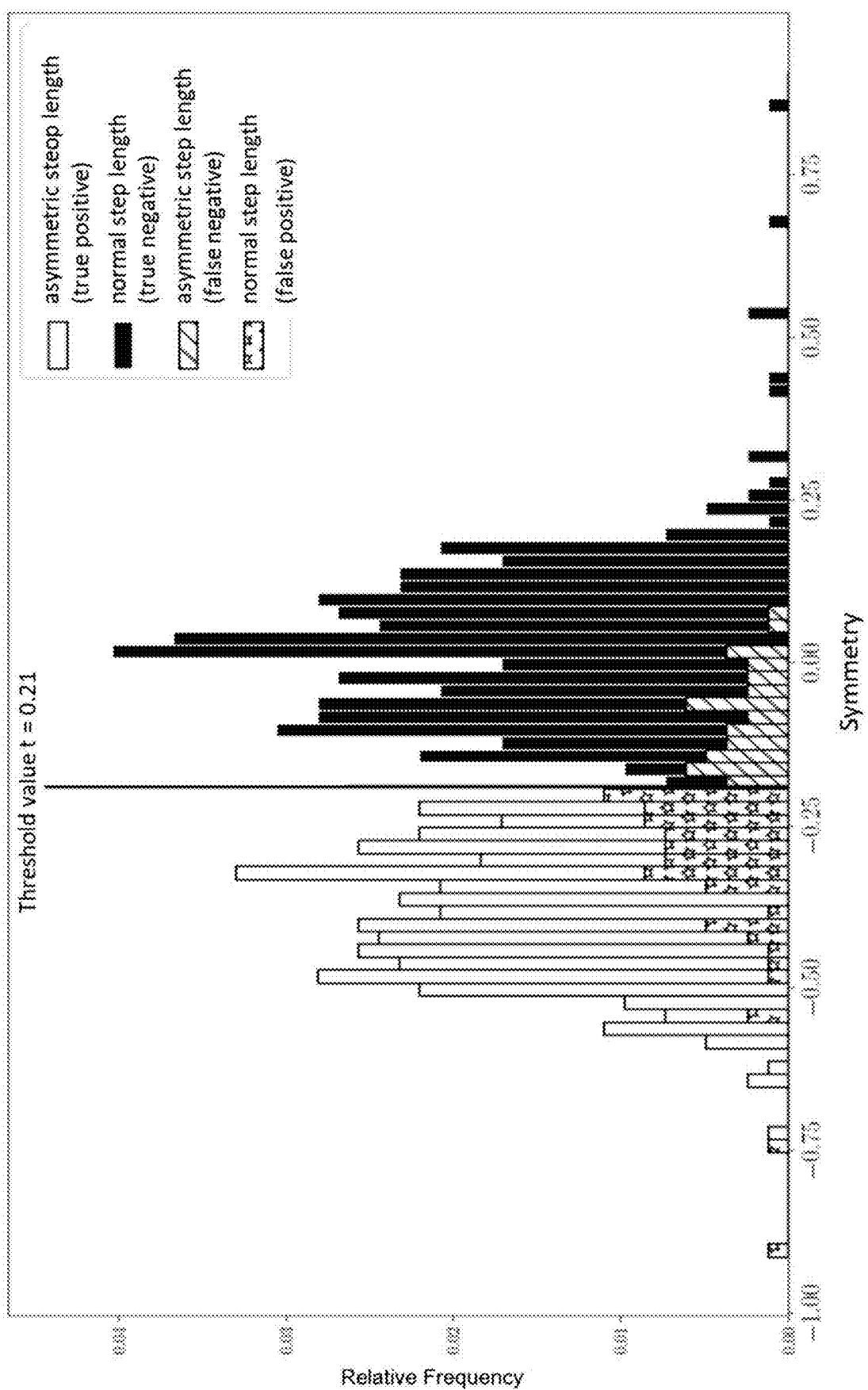
FIG. 17: Histogram of error classes: Symmetry of gait patterns.

The best threshold value corresponds to the highest F1 score. FIG. 17 shows the distribution of abnormal and physiological step length symmetries in the form of a histogram, where the former represent the error class, the latter the non-error class. A symmetry of 0.0 means perfect symmetry between the left and right legs, where symmetries of ±1.0 mean that one leg has more than twice the step length compared to the other. By evaluating the F1 score, a threshold is found that most appropriately separates the two classes. In this case, the best symmetry threshold is −0.17 (precision: 0.85, recall: 0.87), which means that step lengths smaller than −0.17 are classified as a deviation from the normal movement pattern and thus initiate a correction on the part of the service robot 17.

Figure 22:
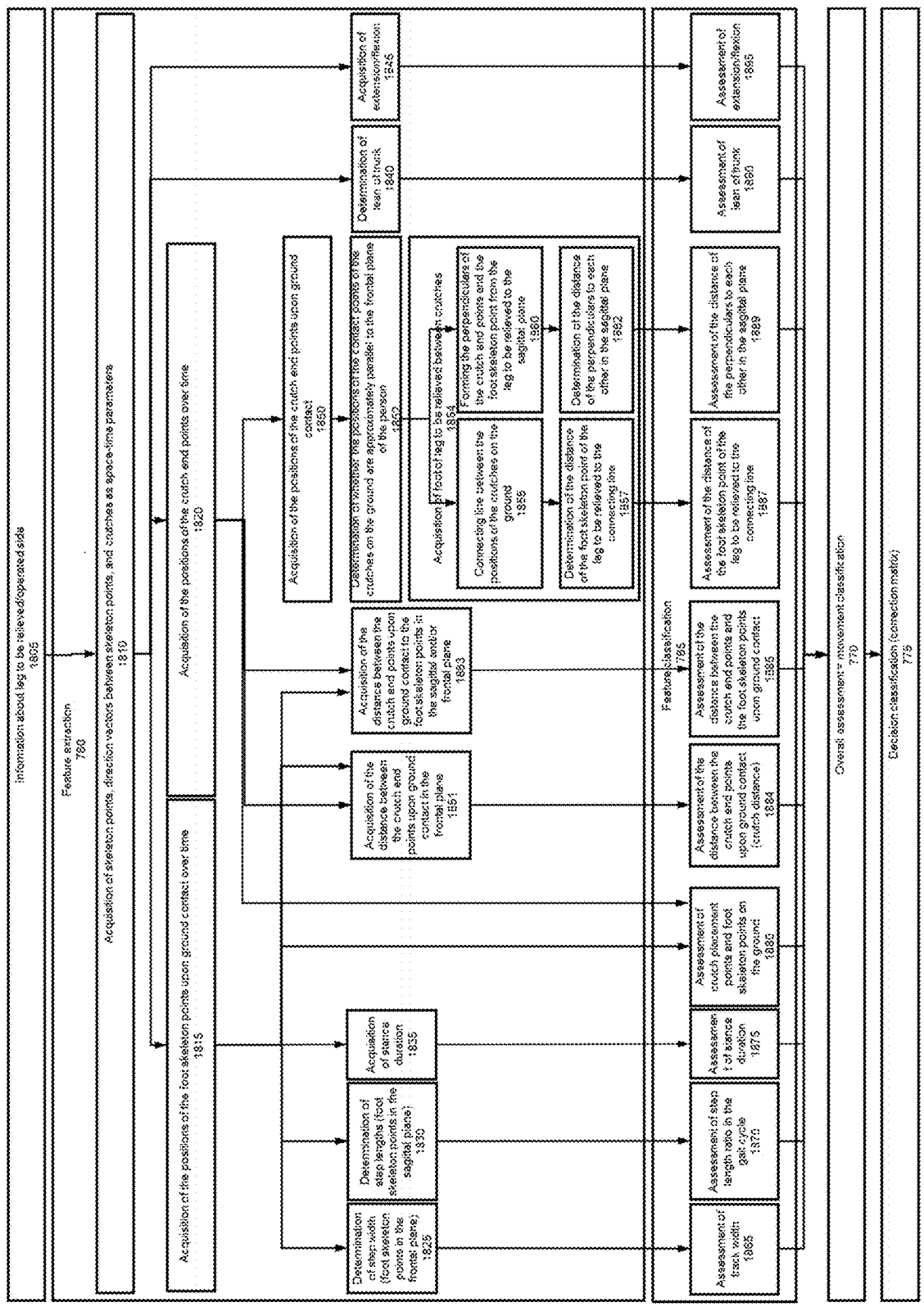
FIG. 22 Three-point gait.

In summary, the evaluation of the three-point gait is shown in FIG. 22. In step 1805, information about the leg to be relieved (on the operated side) is first used (e.g. obtained as in the explanation of FIG. 5). In feature extraction 720, the skeleton points, the direction vectors between skeleton points and/or the crutches are acquired as space-time parameters in step 1810. The position of the foot skeleton points 1950 upon ground contact over time is then captured in step 1815. Based on this, the step width is determined, e.g. by calculating the distance between the foot skeleton points 1950 in the frontal plane 1825. Within the scope of feature classification 765, an evaluation of the step width takes place, for example, in step 1865, i.e. the distance between the foot skeleton points is determined 1950.

Furthermore, as a consequence of the detection of the position of the foot skeleton points 1950 upon ground contact in the course of time in step 1815, for example, a determination of the step lengths (i.e. the measured distance of the foot skeleton points 1950 in the sagittal plane at the successive contact with the ground) takes place in step 1830, e.g. with an evaluation of the step length ratio in the gait cycle 1870 in the scope of feature classification 765. Furthermore, e.g. also as a consequence of step in step 1815, the stance duration in a step is acquired by means of a time measurement and evaluated in step 1875. In addition, the lean of the trunk can be determined in step 1840 with subsequent evaluation in step 1890 in the scope of feature classification 765. In addition, for example, the flexion and/or extension 1845, e.g. of hip and/or knee joints can be detected with subsequent evaluation 1895 in the scope of feature classification 765.

Moreover, a detection of the position of the crutch end points 1970 over time is performed in step 1820. Based on this, the distance between the crutch end points 1970 upon ground contact in the frontal plane may be measured in step 1851, with an evaluation of the distance between the crutch end points 1970 upon ground contact (which corresponds to the crutch distance) in step 1884 taking place within feature classification 765. In the process, it is determined whether the crutches are too far apart, to name an example. Alternatively and/or additionally, the distance between the crutch end points 1970 upon ground contact to the foot skeleton points 1950 in the sagittal and/or frontal plane 1863 can be determined, with subsequent evaluation of the distance between the crutch end points 1970 and foot skeleton points 1950 upon ground contact being performed in step 1885. In the process, it is determined whether the crutches are positioned too close or too far away from the body with respect to the foot skeleton points 1950 in the sagittal plane and/or the frontal plane. Threshold values can be taken into account in each case. For example, exceeding the threshold value in the frontal plane would indicate an excessively wide crutch placement, while falling below a threshold value would indicate an excessively narrow crutch placement. Exceeding a threshold value in the sagittal plane would indicate that the crutches are placed too far forward. In addition, steps 1815 and 1820 can be used as a basis for evaluating the placement times of the crutches and foot skeleton points 1950 on the ground in step 1880 (e.g. to evaluate the correct timing of the placement of the operated leg, which should be placed as far as possible after the crutches have made contact with the ground).

These aspects thereby assess the movement pattern of a person, e.g. when walking on crutches. For the detection of the three-point gait, the position of the crutch end points 1970 upon ground contact is detected in step 1850 and a determination is made as to whether the position of the contact points of the crutches on the ground are approximately parallel to the frontal plane of the person 1852. Furthermore, it is determined in step 1854 whether the leg to be relieved or the foot of this leg is located between the crutches. This can be implemented in at least two alternative and/or additional ways. First, a connecting line between the positions of the crutches on the ground can be determined in step 1855, and subsequently the distance of the foot skeleton point 1950 of the leg to be relieved to the connecting line in step 1857. In the scope of feature classification 765, this distance can be evaluated in step 1887. Secondly, a perpendicular to the sagittal plane and a perpendicular to the foot skeleton point 1950 of the leg to be relieved can be formed for each of the crutch end points 1970 in the sagittal plane (step 1860), and then the distance of these perpendiculars to each other in the sagittal plane can be determined in step 1862, which is followed by an evaluation of these distances in step 1889.

Finally, a movement classification 770 is performed, in which the individual feature classifications are evaluated in connection. In the event of deviations from the rules stored in the movement classification, which are based, for example, on defined errors (e.g. placing the crutches far forward while at the same time leaning the trunk too far forward is assigned to the error "Crutches placed too far forward"), and a movement correction 450 is output (e.g. the instruction not to place the crutches so far forward) on the basis of a decision matrix (FIG. 9).

Example 2: Classification Based on Machine Learning/Neural Networks

Feature classification 765 and the movement classification 770 are deterministically defined in the described procedure, i.e. defined based on expert judgments. In alternative aspects, machine learning and/or neural network methods may also be used for this purpose. In the case of support-vector machines, the mentioned direction vectors from the feature extraction would form classes defined from vector spaces (i.e. certain vectors with a certain similarity would fall into the classes, dissimilar vectors accordingly not). Thus, a feature with a certain characteristic represents, for example, a space spanned by the vectors. The same is true for movement classification. Other methods such as k-NN, K-Means, general clustering or neural networks function in a similar way. In one aspect, the movement pattern is the gait pattern.

Example 3: Anomaly Detection in Movement Behavior and Implications

In one aspect of the service robot 17, rules for anomaly detection are stored in the movement assessment module 2052 for assessing the movement pattern and/or in the movement correction module 2022 for correcting the movement pattern. An anomaly is understood to be a abnormality in movement behavior that deviates from the "usual" (i.e. physiological) gait behavior. This can mean, for example, that the healthy leg has a step length of 65 cm, while the operated leg has a step length of only 30 cm. A deviation from this "usual abnormal gait behavior" may in turn be present, for example, if the service robot 17 measures only 10 cm instead of the 30 cm step length. Alternatively and/or additionally, the anomalies can also be detected from curves of individual skeleton points of the skeleton model over time, where amplitude height and the positions of minima, maxima, and/or of inflection points over time can characterize an anomaly. This type of detection is applied in the movement assessment module 2052 in order to evaluate the movement pattern; specifically, feature classification 765 and movement classification 770 are used for this purpose.

If one or more of these anomalies are detected, rules stored in the modules mentioned above trigger events. An event may be a notification of a therapist, for example by first transmitting information from the service robot 17 via the wireless interface to the patient administration module 160, which in turn can inform a patient, for example by way of a notification sent via a wireless network such as GSM, LTE, or WLAN, which can be received by means of a mobile device used by the therapist. This information may include, for example, a video sequence that renders the anomaly in recorded form. In one aspect, this video sequence may also be stored in the patient administration module 160 such that, based on the notification to the therapist, the therapist can access the video sequence stored in the patient administration module 160 via the therapist's mobile device.

In an alternative and/or additional aspect, the anomaly is time-stamped and information corresponding to the time stamp is stored in the memory of the learning module 190 indicating that the video sequence transmitted to the learning module 190 contains the anomaly. In a GUI, which the therapist can use to label the video sequences transmitted to the learning module 190, sequences with anomalies are given higher priority, this prioritization being performed e.g. within a database. This enables efficient labeling to further improve the algorithms for movement evaluation and movement correction. In one aspect, the captured, classified, evaluated, and/or corrected movements constitute the gait pattern.

Example 4: Person Identification, Visual Person Tracking, and Person Re-Identification Person identification in the person identification module 2041 can be performed using skeleton model recognition as provided by evaluation frameworks of 2D and 3D cameras and/or frameworks such as OpenPose, OpenCV, etc. A synchronization of the recordings of the sensors implementing skeleton model recognition and an RGB recording allow the allocation of body regions of the tracked person, colors and/or color patterns, and/or textures of clothing, e.g. originating from the person's clothing. Persons can be tracked and also re-identified over time on the basis of the parameters color and/or color pattern per body region and/or the measurement parameters of the patient (body height, arm length, leg length). Alternatively and/or additionally, movement patterns such as gait patterns can be used. Tools such as OpenPTrack can be used for this purpose.

Facial recognition can also be used as an addition and/or alternative.

In a further aspect, markers can be used for person identification, tracking, and re-identification. They can be positioned on the patient or on the walking aids for recognition of the patient. Such markers can be color-based patterns or light sources with a specific frequency. For example, in one aspect, the patient may wear a vest with barcodes printed on its surface which is visible to the service robot 17. The RGB 2D camera 2084 can use these barcodes to identify the patient. In a further optional aspect, information about the barcode can be appropriately assigned to the patient, i.e. stored in the patient administration system 160 or in the storage medium or transponder.

Example 5: Training Plan Adjustment Based on Multinomial Logistic Regression A multinomial logistic regression is shown as an example of the machine learning approach. Such an estimation model allows the estimation of probability for different output variables that are not necessarily directly connected based on a set of input variables. For example, the selection options of the training plan that arise via the GUI in FIG. 5, such as the three-point gait, a duration of e.g. 10 min, and a distance of e.g. 100 m, can be estimated as output variables simultaneously. Possible input variables are, for example, the selection options of the training plan previously determined by the service robot 17, but also comorbidities of the patient, such as a general limitation of movement, possible impairments of mental abilities, height, the type of surgery performed (which can affect different muscle groups and therefore indicates impairments of varying severity in the postoperative phase), etc.

In the scope of multinomial logistic regression, a linear predictor function is used to determine a score by means of a set of linearly combined node weights which are multiplied by the input variables as a scalar product: score($X_i$,k)= $\beta_k \cdot X_i$, where $X_i$ is a vector of input variables for observation i, $\beta_k$ is a weight vector or regression coefficient with respect to the respective output variable k. The score, in turn, can be directly converted into a probability value that observation i of the input variables results in the respective output variable k. The input variables are also referred to as independent variables, the output variables dependent variables.

The independent variables may be the type of operation, the physical condition, the time elapsed since the operation, the distance moved, the type of gait, etc., each of which can have various characteristics. The dependent variables are the settings or combinations of settings that the therapist can make in the training plan, which can also have various characteristics. Specifically, for example, a patient in normal physical condition with a left hip TEP performed as a surgical procedure with a lateral approach to the hip, can, as determined by the service robot 17, cover a distance of 250 m within 5 min using the three-point gait three days after surgery the previous day (these would be the expressions of the input variables), and a therapist would adjust the training plan at this point in such a way that the patient would also be allowed to walk for 10 min during the next training while maintaining the three-point gait (these would be expressions of the output variables). A multinomial logistic model can be estimated based on the expressions of the individual variables. The regression coefficients determined on the basis of this model-building phase (weights for the individual input variables such as physical condition, access to the hip, time elapsed after surgery, walking distance, duration of training, three-point gait) can be used when further exercises are recorded (primarily from further patients) to suggest to the therapist which training plan configuration should be implemented. For example, if the adjustment described above is made several times by therapists when the above characteristics of the input variables are present, this indicates that making these adjustments is useful, and this is expressed, in other words, in significant values for the node weights. This way, the exact measures can be suggested to a therapist which have already been described above, i.e. a normal physical condition, a left hip TEP carried out as a surgical procedure with a lateral approach to the hip, three days after the operation on the previous day, a covered distance of 250 m within 5 min using the three-point gait, and then, as an adjustment to be made by the therapist, 10 min walking duration using the three-point gait. This suggestion is indicated in the GUI in FIG. 5, e.g. by highlighting in color (not shown). Since this is a statistical model, i.e. the score only indicates the probability that a therapist will adjust the training plan after input variables exhibit certain characteristics, threshold values are stored in the rule set 150 which, for example, suggest to the therapist that this combination of measures consisting of three-point gait and 10 min walking duration should be implemented if there is a probability of 80% or more.

Alternative or additional methods to determine the node weights include naive Bayes, decision trees, and neural networks like long short-term memory recurrent neural networks.

Example 6: Signaling a Training Request

A mobile terminal may be used by the patient to transmit this signal to the patient administration module 160 and/or the service robot 17, which in turn may send instructions related to this to the service robot 17 wirelessly. Alternatively, in one aspect, a house call system may be used, as is standard in hospitals, or a permanently installed terminal may be used that is in communication with the patient administration module 160 and/or the service robot 17. Such a training request may also be initially entered into a database that has mechanisms to schedule the sequence of exercises. Rules can be stored related to this that give priority to certain patients, for example.

Example 7: Mapping

If the service robot 17 is operating in an area such as a hospital building for the first time, the service robot 17 maps its environment using the 2D/3D recognition submodule and the mapping module 2061. For this purpose, all premises are traversed and the environment is captured by means of 2D and/or 3D sensors. Sensors that may be considered for this are at least LIDAR 2083, at least the RGB-D 3-D camera 2085, at least the RGB-2-D camera 2084 and/or ultrasonic and/or radar sensors. Combinations of these sensors may also be used. The (2D) RGB camera 2084 is used here in part only as an aid, for example to evaluate colors. In the mapping module 2061, rules can be stored as to the areas the service robot 17 is allowed to move and, if applicable, for what purpose. These include, for example, areas in which the service robot 17 is not allowed to move, areas in which it is allowed to pass, and areas in which it is allowed to complete training, e.g. movement training.

In one aspect, the 2D/3D detection and mapping module 2061 has an interface to the movement training module 2011 for exchanging localization data. For example, a room number may be stored in the movement training module 2011, while information associated with that number is located in the mapping module 2061. This allows the service robot 17 to recognize the location where the service robot 17 may encounter the patient.

Example 8: Map Enrichment Using CAD Data

In one aspect, the maps that the service robot 17 records of the building in which the service robot 17 is located may be enriched by CAD data of the building that is integrated into the 2D/3D capture and mapping module 2061 via an interface. Alternatively, this data can be integrated into a separate module that is connected to the mapping module 2061 via an interface. The CAD data refers here, on the one hand, to layout plans in 2D or 3D that originate from software programs such as those used for building design. However, image data (e.g. PNG, JPEG, PDF) can also be used, which the system uses to derive corresponding information regarding structural arrangement. Taking these layout plans into account assists the service robot 17, for example, in recognizing passages and door openings, which can be noted accordingly by translating the drawing symbols in the mapping module 2061. Furthermore, the layout plans can be used to detect temporary or quasi-stationary obstacles in the building, i.e. objects that are not part of the building and accordingly may change their position over time or disappear completely.

Example 9: Mapping and Self-Localization Using Electromagnetic Waves

In one aspect, the service robot 17 may also register electromagnetic waves, such as light and/or radio signals, e.g. from WLAN access points, for improved navigation within the building. For this purpose, the light intensity (e.g. solar radiation at daytime) and/or the angle of incidence of the light may be detected by photodetectors on the service robot 17 both during the mapping process and during general navigation within the building. When comparing the recorded light radiation with the mapped light radiation, the time of day and season as well as the geographical latitude and longitude can be taken into account, if applicable, in order to consider natural fluctuations of the angle of incidence of the sun as well as its intensity. Alternatively and/or additionally, artificial light in the building can also be mapped, both in terms of intensity and light spectrum.

Alternatively and/or additionally, WLAN signals from multiple routers whose location in the building is known and noted in the map of the service robot 17 can be detected by the WLAN module 2088. Triangulation can thereby be used to improve position determination within the building. During the detection of the incidence of light, the speed, the distance covered, the orientation of the service robot 17 in the room, etc. are recorded and stored and compared with stored values. The methods described in this example can be combined with other methods described in this document.

Example 10: Measuring the Distance Covered by the Patient Using Odometry and Patient Tracking In one aspect, the distance covered by the patient is determined using the odometry module 2081 together with an optical sensor such as LIDAR 2083 and/or the 3D camera. In this aspect, at least one optical sensor captures the position of the patient relative to the service robot 17 during movement training, whose path is in turn determined by the odometry module 2081. Depending on the aspects, this can have magnetic sensors which determine the rotation of the wheels 6 and account for the distance covered based on the radius. The inaccuracies caused by slipping, for example, can be corrected by combining them with suitable inertial sensors, such as acceleration sensors. The basis for the position of the patient identified by the service robot 17 in the person identification module 2041 and tracked using the person tracking module 2043 or the module for 3D person tracking 2046 may be the midpoint between the detected legs (in case they are detected by LIDAR 2083) and/or the midpoint between the sensed hip joints, spine, ankles 1950, etc. in case the patient is detected by a sensor whose data is evaluated in the form of a skeleton model. An approach analogous to LIDAR can again be used for the ankles 1950. The distance the patient has covered is determined relative to the patient's distance to be covered.

Figure 21A:
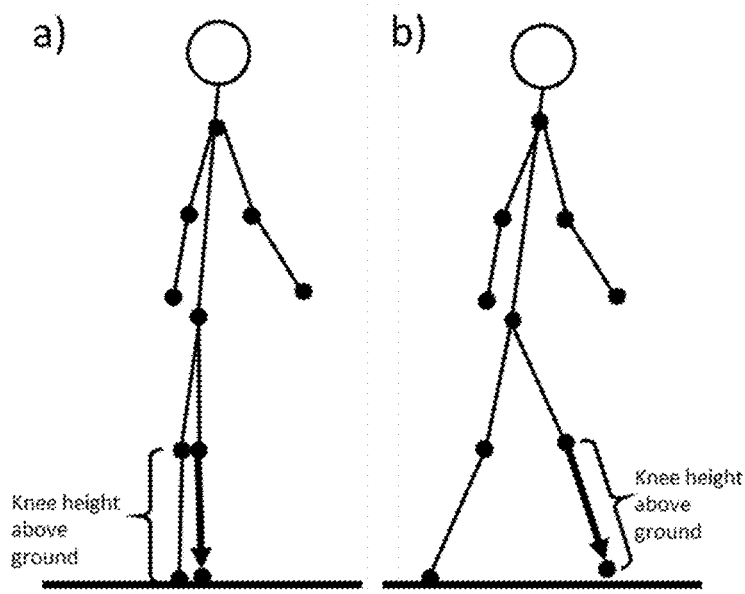
FIG. 21 Supplementary determination of the foot skeleton points.

In one aspect, the position of the foot skeleton point 1950 can be only inadequately extracted from the skeleton model, i.e. the position is detected with, for example, increased uncertainty compared to other skeleton points. In order to increase the detection accuracy in spite of this, the foot skeleton point 1950 is, as shown in FIG. 21, alternatively and/or additionally determined via the position of the knee skeleton point 1930, a direction vector oriented from the knee skeleton point parallel to the lower leg, and the height of the knee skeleton point 1930 above the ground in the case of the direction vector passing through the perpendicular (FIG. 21 *a*), where the height of the knee skeleton point 1930 above the ground in the case of the direction vector passing through the perpendicular indicates the distance at which the ankle joint 1950 is located as seen from the knee skeleton point 1930 (see FIG. 21 *b*). In one aspect, in order to determine the direction vector parallel to the lower leg, the segmentation methods used for crutch recognition may be additionally or complementarily used, e.g. to detect a captured point cloud associated with the skeleton model as the lower leg.

Example 11: Measuring the Distance Covered by the Patient by Adding Up the Captured Step Length In one aspect, the distance covered by the patient is determined by adding up the step length captured during the movement training. This can be based on the distance of the ankle joints, which can be detected by 3D cameras such as a Microsoft Kinect or an Astra Orbbec and the associated evaluation frameworks. Alternatively and/or additionally, the position of the feet can also be determined by means of LIDAR.

Example 12: Measuring the Distance Covered by the Patient Using a Coordinate System In one aspect, the distance covered by the patient is determined by adding up the Euclidean distances between coordinate points that the patient passes. The service robot 17 creates a coordinate system of its environment beforehand in the scope of the mapping module 2061. Self-localization 2062 allows the service robot 17 to determine its position in space, and the position is in turn assigned corresponding coordinates. An optical sensor such as LIDAR 2083 and/or the 2D camera 2084 or the 3D camera detect the patient during training and determine its position relative to the service robot 17. This position is also assigned a spatial coordinate. Tracking the patient over time thereby allows a chain of spatial coordinates to be determined. The Euclidean distance can be determined between each coordinate point, with the distances being successively added up. The basis for the midpoint of the patient may be the center point between the detected legs (in the case of capture by means of LIDAR 2083) and/or the midpoint between the detected hip joints, spine, etc. in the case of patient capture with a sensor whose data is evaluated in the form of a skeleton model. The position of the patient in space can also be determined using the patient coordinates without necessarily taking the position of the service robot into account.

Example 13: Determination and Output of Distance Still to be Covered

The service robot 17 can compare the distance covered by the patient with the distance planned according to the training plan and give the patient information via loudspeaker 2092 and speech synthesis 2073 as to the length of the remaining distance to be covered according to the training plan. Alternatively and/or additionally, the output can also be provided on the display 2087.

Example 14: Determining the Speed of the Patient

The service robot 17 records the time of the exercises and, in parallel, the distance covered. In this way, the service robot 17 can determine the speed of the patient and store it in the movement evaluation module 2050. The patient's speed can be compared to a previously stored speed, after which a difference calculation is performed and the service robot 17 can provide information as to the extent to which the patient is deviating from the historical value during training via the display and/or via the speaker 2092 and speech synthesis 2073.

Example 15: Guiding the Patient

The service robot 17 navigates in front of or follows the patient during actual training. In both cases, this uses the movement planning module 2065, in one aspect using evolutionary algorithms, to estimate the path of the patient. In both cases, the service robot 17 navigates the patient through the training area. If the service robot 17 has fetched the patient in his or her room in advance, the patient is usually first navigated through an area in which the patient has not yet completed any exercises, before the training area is reached, which is characterized primarily by a few obstacles (including other people moving there). For this purpose, the service robot 17 guides the patient by means of acoustic and or visual/optical cues provided via the loudspeakers 2092 or the display 2087, and in one aspect also via indicator lights on the service robot 17. An acoustic method is primarily selected when the service robot 17 is behind the patient. The patient is tracked and the position of the patient within the building is compared. In the event of deviations from the planned route, the service robot 17 signals a direction correction, e.g. advising the patient to turn into a certain corridor or, if necessary, to turn back if the patient made a certain turn.

Example 16: Movement Planner

In order to efficiently calculate the paths to be covered by the service robot 17, various objectives are optimized simultaneously in the movement planning module 2065. First, the service robot 17 calculates the optimal path in the path planning module 2064. In the event of a change in its environment, in particular on the previously calculated path, the service robot 17 does not recalculate the distance to the destination completely, but only for the section on the path that has changed dynamically. Second, the dynamic movement planning also accounts for the orientation of the service robot 17, e.g. shortly before the destination, if the service robot 17 is moving directly towards it. Third, it is taken into account that the service robot 17 can only travel more slowly in a backward direction than in a forward direction, for example. Fourth, this optimization also takes the maintenance of safety distances to static and dynamic obstacles into account. And fifth, the service robot 17 also takes into account that the service robot 17 must maintain a certain distance to a tracked person, in this case the patient. These target variables are considered together as a cost function and the individual target variables are represented as a weighted sum in order to perform a global optimization of the route. Here, the approach is based on the Dynamic Window Approach familiar in the state of the art (Fox et al 1997). In one aspect, evolutionary algorithms can be used for the selection of individual path segments, which optimize the acceleration of individual path segments.

Taking into account the path of the service robot 17 and the estimated direction of movement of the patient, for example, this movement planning allows the camera to be adjusted in such a way that the patient can, for example, be centrally captured by the camera. For this purpose, a PID controller may be used that utilizes "integrator clamping" familiar in the state of the art (i.e. imposing an upper and lower limit on the results) and adjusts the horizontal camera angle. Alternatively and/or additionally, the angle determined by the PID controller can also be used to correct horizontal angles in the skeleton model that occur due to the rotation of the service robot 17 caused by the direction of movement compared to the orthogonal camera perspective.

Example 17: Training Areas

During the exercises, a certain distance is usually covered in the corridors of a clinic or in another area that has been stored as such in the room plan module 2060r. In particular, areas should be selected that have few obstacles to be avoided by the patient and/or service robot 17. In one aspect, these areas have a width that is at least three times the width of the service robot 17. Obstacles are also understood to include persons who, apart from patients and service robot 17, also move within this area, including other patients at the clinic, medical staff, and beds, carts, seats, and other everyday clinic items. Having fewer such obstacles not only allows the patient to move more fluidly and, depending on his or her state of health, with less difficulty, but also allows the service robot 17 to better capture the patient. Fewer turns are made, thereby reducing the distance covered and conserving the storage capacity of the battery carried. Furthermore, there are fewer incidents in which persons move between the patient and the service robot 17. This case potentially causes not only tracking problems, but also the critical situation of the service robot 17 mistakenly recognizing another person as a patient. Avoiding this situation thereby reduces the instances of person re-identification that would then need to be performed using the re-identification module 2044.

In one aspect, the service robot 17 is also capable of independently identifying subareas suitable for exercises by navigating in predefined areas (e.g. of a clinic). For this purpose, it records the number and type of obstacles, their dimensions (absolute and/or relative to the corridor width), and the density of these obstacles over the entire area as a function of time, for example over the course of a day and a week. These values are stored in the memory of the service robot 17, for example within the room plan module 2060r. This data captured over time can be collected during "empty runs" on the part of the service robot 17 (i.e. runs without parallel movement training with a patient) as well as during exercises with a patient. The captured data about obstacles can be processed within the service robot 17 or within a cloud to which the data is transmitted.

If an exercise with a patient is pending, the service robot can determine and/or predict which areas exhibited the lowest density of obstacles in the past during training time (e.g. Friday 13:00-13:15) by accessing the historical data. The density determination may include clustering methods. In one aspect, the service robot 17 also considers the distance to be covered for this purpose, thus making route selection decisions based on density. In one aspect, the service robot 17 may select a 50 m corridor to be traversed back and forth for an intended route length of, for example, 100 m, or the service robot 17 may detect based on historical data that a portion of the corridor with a length of 25 m had a density of obstacles at the time in the past (either a minimum density, e.g. calculated as the lowest 90%, or a density below a certain relative or absolute threshold). In such a case, the service robot 17 independently selects, for example, the area with a length of 25 m that the patient is to traverse 4×.

Example 18: Arrangement of Cameras and Distances to the Patient

In order to capture a patient in the best possible way, the 2D camera 2084 and/or the 3D camera is mounted in such a way that the 2D camera 2084 and/or the 3D camera can capture the patient as centrally as possible. Taking an average patient height of 175-180 cm into account, the camera is therefore mounted at a height of 80-90 cm.

Depending on the technology used for the 3D camera (ToF for a Kinect, speckle sensor for an Astra Orbbec), there are different implications for the optimal distance to the patient. On the one hand, this distance is determined by the angle of the 3D camera and the resulting possibility of capturing the patient's entire body in the best possible case. A Kinect, for example, has a range of up to 4 m, which means that a patient can be detected without any problems, i.e. their body parts are also recognized at this distance. The situation is different if, for example, the crutches are to be tracked and a 3D camera with speckle technology is used. Guidi et al. 2016 report, for example, that a Kinect2 has a significantly higher measurement accuracy than a series of speckle cameras. If one uses a commercial Astra Orbbec 3D camera, this 3D camera has a horizontal exit aperture of 60° and a vertical one of 50° at a resolution of 640×480. At a distance of 2 m from the 3D camera, an image with a horizontal width of approx. 231 cm is therefore recorded. If the 3D camera is mounted at a height of 92 cm, the maximum height of the captured image is approx. 184 cm. Taller persons cannot be captured this way. Therefore, in one aspect, tracking is performed at a greater distance to the patient, which may be at the expense of crutch recognition, depending on the camera model used. Therefore, in one aspect, crutch identification and crutch tracking are performed using LIDAR 2083 and/or an ultrasound or radar sensor to detect the crutches, for which the signals from at least one camera system and, if applicable, LIDAR devices 2083, ultrasound or radar sensor are time-synchronized and fused appropriately. In one aspect, the camera and LIDAR 2083, ultrasound or radar may be used together to detect and/or track the crutches.

Example 19: Training Interruption

Figure 18:
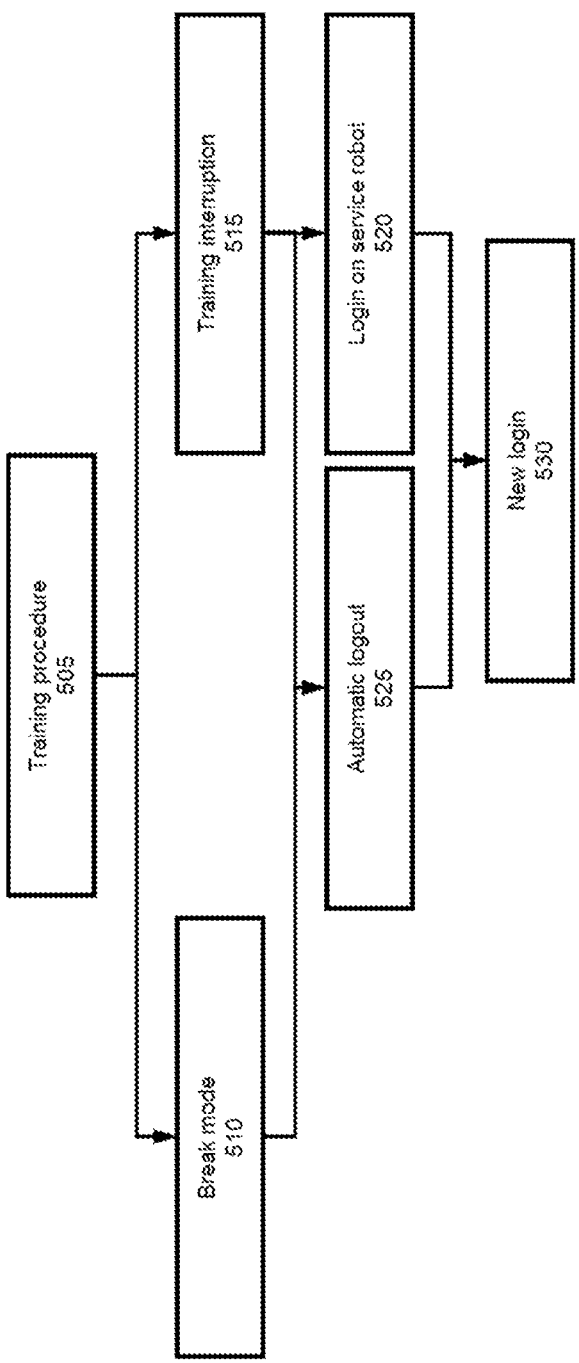
FIG. 18: Training interruption.

As shown in FIG. 18, the patient may interrupt the training plan at any time by taking an optional break in step 510. Alternatively, the patient can also interrupt the exercise in step 515. For this purpose, the patient must log out on the service robot 17 in step 520. If the patient forgets to log out or is inactive for a defined period of time due to the break, an automatic logout of the system takes place in step 525. To continue the exercises or to restart them, it is necessary to log on to the system again in step 530.

Example 20: Documentation of Therapy

The system with the patient administration module 160 and the service robot 17 documents the therapy. The documentation itself can be transmitted via an interface to external systems, such as a hospital information system or a patient data management system 170. On the one hand, the documentation comprises personal data such as name, age, gender, etc., medical history (e.g. advanced osteoarthritis of the hip), the treatments performed (total hip replacement), and the side operated on. Such information is primarily stored in the patient data management system memory 172. In the patient administration module 160 itself, the training plans according to FIGS. 4 and 5 are recorded as well as the results of the completed exercises, which can be seen in FIG. 11, for example. This also includes any interventions in the training plan, whether initiated by the therapist or by the service robot 17 based on defined and/or learned rules.

Example 21: Therapist Notification

In one aspect, data is transmitted via a server connected via an interface to the patient administration module 160 to a mobile device that is available to the therapist, for example. Triggers for these notifications may in turn be deviations from threshold values in the assessment of the movement pattern, for example a step length that deviates from the "typical" abnormal step length, or a combination of movements of different limbs that do not correspond to the physiological movement pattern and that also do not correspond to the "typical" abnormal movement pattern. In the former case, for example, a step length that is only 10% of the physiological step length could trigger a trigger event. In the second case, a step length of 20 cm with a lean of trunk of more than 30° from the perpendicular could trigger a trigger. Moreover, a trigger may also be triggered in the event of a deviation in the training plan that falls below or exceeds a certain threshold value, for example a two-point gait instead of a three-point gait, without the therapist having approved this or without it occurring with a frequency that is above a defined threshold value on the basis of the patient data and the training results previously registered by the service robot 17, which have been collected in a database with historical values, in this phase of the training cycle, with the threshold value resulting, in one aspect, from the evaluation of the historical data. Here, the training cycle includes the typical sequence of components of the training plan, counting from the first exercise that the patient completes to the last.

Example 22: Cloud-Based Speech Recognition

In one aspect, speech recognition 2074 may be implemented via cloud-based third-party services that are accessed wirelessly by the service robot 17 using an API. In the first step, for example, a speech-to-text API such as Google Speech or Amazon Transcribe may be considered. In a second step, the text data generated with this can then be evaluated using APIs such as Amazon Comprehend and the results converted into responses or commands for the service robot 17 using commands such as those that can also be implemented alternatively in the form of screen-based menu input. Combinations of these services are also possible using a single API.

Example 23: Anonymization of Data Transfer Between Cloud and Service Robot

The therapist can assign a mobile memory unit, such as a transponder, to the patient, i.e. the therapist hands the patient a transponder and assigns this transponder to the patient in the patient administration module 160. The transponder contains the patient ID and/or another token ID assigned to the patient or his or her patient ID. The patient can use this transponder or the serial number and/or patient ID to identify him- or herself to the service robot 17. The service robot 17 then downloads the training plan stored by the therapist—but without the therapist's personal data—from the cloud 18 via an interface. The assignment is made via the patient ID. After completing the exercises, the service robot 17 downloads the data recorded by the service robot 17 during training in encrypted form to the patient administration module 160. The assignment is made via the patient ID. The data is only decrypted in the patient administration module 160. This way, no data is transmitted that could be used to identify the patient's name or address.

In another aspect, the therapist transfers the training plan to a storage medium (e.g. transponder in the form of an RFID tag, USB stick), which the patient receives in order to identify him- or herself to the service robot 17. In the process, the data is transferred from the storage medium to the service robot 17, including the patient ID that was specified by the patient administration module 160. After completing training, the service robot 17 transfers the recorded data of the exercises back to the storage medium so that the therapist can transfer the data to the patient administration module 160 when reading out the storage medium.

Combinations of the approach described above and data exchange via storage medium (e.g. transponder) are also possible.

In another aspect, the patient can identify him- or herself via a login and/or password. These serve as a patient ID or are associated with a patient ID, so that the service robot 17 can use this information to download further data from the cloud, such as training plans. In another aspect, biometric features such as a fingerprint scan, facial scan, or iris scan can be used for patient identification.

Example 24: Detecting Leg Loading Using 2D/3D Sensor Technology

In some cases, patients may only apply limited loads on a leg. Although exact load detection is difficult to implement by optical means, some skeleton parameters can be used to derive information that allow the detection of leg load. For this purpose, the following parameters are used: a) angle between the lower and upper arm when walking, and/or b) angle of the lower leg to the thigh and/or extension and flexion angle, and/or c) posture of the upper body. Unloading is present above all if i) the angle between the lower and upper arm is less than 170°, or less than 160°, ii) the angle of the leg allowing limited loading is less than 172°, iii) the upper body is inclined forward by more than 5°, and/or iv) the upper body is inclined away from the affected side by more than 5°. The more pronounced features i-iv) are, the greater the unloading of the leg. An extended arm is defined here as an arm with an angle of 180°. The person is performing a three-point gait, which is explained in more detail in FIG. 22. In addition to the evaluation named there, the arms are captured and evaluated, while the other aspects are evaluated in the scope of feature classification 765 and movement classification 770.

The determined poses are therefore classified and are stored in the rule set 150, both in the rule set 150 and locally in the service robot 17 in the scope of the assessment of the movement pattern in the movement assessment module 2052. In the case of a loading limitation, which is stored in the patient administration module 160 and which is also ultimately incorporated into the training plan, the load on the patient's leg is continuously monitored by the processor of the service robot 17—simultaneously with the evaluation of the other poses—and the patient receives instructions by visual and/or acoustic means if the load on the leg exceeds or falls below a certain threshold value.

Example 25: Detection of Leg Loading Using External Sensors

The extent to which a person applying a load on his or her leg can also be determined using external sensors, e.g. those that are wirelessly coupled to the service robot 17. In orthopedics, a number of products for measuring the pressure on the sole of the foot can be found for this purpose. For example, insoles are known which are placed in the patient's shoes and measure the pressure acting on the sole of the shoe in different spatial resolutions. The actual pressure sensor technology may include capacitive, resistive (e.g. based on strain gauges), inductive, or even piezoelectric pressure sensors. The sensor signals are amplified via a bridge circuit and processed by means of an analog-to-digital converter in a way that enables transmission via commercially available radio standards such as Bluetooth, WLAN, etc.

The service robot 17 also has a software unit that adds up the measurement results provided by the different sensors over the course of time to determine the total load on the leg. These course values are continuously compared (by means of a comparison unit) with the load parameters stored in the training plan. If a load deviation is determined that is above or below a defined threshold value, the patient receives instructions by visual and/or audible means to reduce or increase the load.

Example 26: Radiolocation of Patients

The service robot 17 features at least one radio interface, such as Bluetooth, that enables wireless communication with IoT devices in the environment. In addition, the crutches have at least one sensor that is wirelessly connected to the service robot 17 via this interface. Here, the only sensing effect that can occur is the detection of their position. This can be achieved through active or passive localization and an associated triangulation of the position. Passive localization refers to the backscattering of radio signals primarily emitted by the service robot 17, with the sensor not possessing its own power source. Such methods are sufficiently described in the state of the art of RFID technology. Active localization entails the use of a transmitter with its own power supply. The service robot 17 captures the signals emitted by the transmitter and determines its position by triangulation. Such an implementation is also superior to visual identification of persons when the patient and service robot 17 are moving in an environment where many people are present. As a result, the direct line of sight between the service robot and the patient is interrupted more frequently, requiring re-identification to be performed more frequently as a result.

Example 27: Indicator Button on Walking Aids

In another aspect of the walking aid, e.g. crutches, these have a button that, when pressed, wirelessly transmits a signal to the service robot 17. The button is positioned in such a way that it can be reached by the patient without difficulty while completing the exercises, in particular without having to change the loading of the legs. If the walking aid is a set of crutches, for example, the button can be located on the distal end of the T-shaped angled handle enclosed by the patient's hands in the process of walking. The sensing device on the walking aids is configured such that a different number of presses of the button, or a different frequency of presses, can trigger different commands to the service robot 17. Pressing once can indicate to the service robot 17 that the patient wants to sit down. At this point, training is interrupted. Pressing twice may indicate that the patient has recognized that the service robot 17 is following another person instead of the patient (indicated, for example, by a person having moved between the patient and the service robot 17) and/or a re-identification (in the re-identification module 2044) was unsuccessful. After sending such a signal, the service robot 17 interrupts training and continues this training only once the patient personally logs in again. This prevents the personalized training from being taken over by other persons and also prevents unauthorized access to data of the person already logged in.

Example 28: External Sensors on the Patient

Furthermore, sensors (especially acceleration sensors) can also be attached to the patient, in particular to the limbs, trunk, and/or head, but also to the crutches, which are connected to the service robot 17 via at least one interface. These sensors allow the capture and evaluation of the movements of patients. For this purpose, it is expedient to attach sensors to at least as many elements of the limbs as are captured and further processed, for example, by means of 3D skeleton recognition, in particular in the scope of feature extraction 720. This would mean attaching an acceleration sensor to each thigh, to the trunk, etc., for example. The data captured in this way can be used alternatively and/or in addition to 3D acquisition employing optical sensors (LIDAR 2083, 2D camera 2084, and/or 3D camera). The analysis of this data may in turn provide angle information, as also provided by the 3D point clouds, allowing to build on the 3D sensing algorithms.

Example 29: Fall Recognition Using Optical Sensors

To ensure the safety of the patient, the service robot 17 has a fall recognition system. On the one hand, this can be achieved by means of the integrated optical sensors, i.e. based on a skeleton model. In this case, the system primarily uses the angle of the trunk, the position or angle of the head, the shoulders, and also the position of the legs relative to the perpendicular to recognize that the patient is in a falling posture, is lying on the floor or has dropped to his or her knees. As an alternative and/or additional evaluation, the distance of skeleton points identified in the skeleton model to the ground can be used, i.e. a fall is detected as soon as these fall below a threshold value (e.g. at a distance of 25 cm in the case of the knee).

Example 30: Fall Recognition Using Inertial Sensors

Alternatively, an acceleration sensor/inertial sensor, possibly with a magnetometer, can be used that is worn by the patient or integrated into the patient's walking aids. Inertial sensor-based detection of falls or generally the "falling to the ground"/falling objects is described, for example, in U.S. Pat. Nos. 7,450,024 and 8,279,060. The sensor technology used here can transmit the determined acceleration to the service robot 17 by means of wireless transmission technology such as RFID or Bluetooth, after which the service robot 17 then determines whether the determined acceleration has exceeded a threshold value. Alternatively and/or additionally, the threshold value is determined directly in the sensor system, which merely transmits information as to whether a threshold value has been exceeded. The threshold value of the acceleration can refer to the maximum of the acceleration, to the angle of the acceleration and/or to a combination of these values.

Example 31: Automated Movement Classification

The example here illustrates how a movement classification 770 can be performed based on the data of an exercise captured and evaluated by the service robot. This data includes, for example, time-variant data such as distance covered, speed, stance duration, free leg phase, and the exercises to be completed according to the training plan, as well as time-invariant data, i.e. patient data such as age, height, if applicable person weight, type of operation, date of the operation, etc. (shown in FIG. 11). This data is all captured and fed into the learning module memory 192 of the learning module 190, where it accumulates over time, forms a historical data set, and is occasionally evaluated. The evaluation is based on the assumption that, over the period of a patient's stay in the hospital (from the time of surgery until discharge), the movement pattern, which initially has many disturbances, should continue to adapt to the physiological movement pattern, i.e. training should ideally result in an improvement that is reflected in normalizing evaluation parameters. In specific terms, the values for distance covered, speed, and exercise duration should increase significantly towards patient discharge and the frequency of corrections should decrease. The stance duration and free leg phase values must adapt themselves and normalize over time depending on the affected/operated side. This in turn depends on the exercises the patient completes according to the training plan, but also on patient data such as age, comorbidities, etc.

The human movement pattern ( ) varies widely from person to person. However, there are many standard values described in the literature, such as torques, angles and acceleration rates, as well as loads and essential features. These form the basis for a standardization of gait training in the form described, for example. Walking on crutches or other walking aids is in itself already a disturbance or deviation from the "normal movement pattern", but the crutch placement pattern should be taken into account as already described in detail above, especially in the orthopedic/surgical field. This movement pattern, but also the movement pattern when using other walking aids, lends itself to standardization and is defined by the interaction of different movement parameters or features over time, e.g. the placement of the crutches or walking aids relative to the feet, the respective sequence of steps, step length, etc. For each gait cycle, these and other features are recorded that aptly characterize the movement pattern or the process of walking on crutches/walking aids, and, in one aspect, the average value is generated per exercise over the gait cycles; whereby it is known whether it is the patient's first exercise, the second, the third, etc. Therefore, these constellations of movement features are those that are classified and act as the dependent variables, while the training results (e.g. FIG. 11) following the acquired movement features, the patient data, and the training plans act as the influencing variables (independent variables) that determine the classification.

Such an approach requires multi-target or multi-output regressions (for a review of different approaches, see Borchani et al, WIREs Data Mining Knowl Discov 2015, DOI: 10.1002/widm.1157). Since the constellations of movement features are metric, this approach is also referred to as multidimensional classification. There are two basic methods for this: a) transform the problem by estimating the dependent variables independently, and b) adapt the algorithms such that simultaneous estimation is required. The latter approach accounts for the interdependencies of the dependent variables, which better represents the reality of the movement pattern. In the latter method, decision trees or GLM (general linear model) estimates can be used, which are implemented, for example, in software packages such as glmnet for R. An alternative approach is to use multivariate regression trees (known by its acronym MRT) implemented in the statistics software R in the mvpart package. Alternatively or additionally, the CLUS software package can also be used, which employs decision trees as part of predictive clustering. The resulting classes in the scope of these methods yield the updated movement classification.

Example 32: Recognition and Evaluation of the Two-Point Gait

In many steps, the detection of the two-point gait is analogous to that of the three-point gait. There are some differences in feature extraction 720, feature classification 765, movement classification 770, movement correction, e.g. decision classification 775, and output of movement correction 450. The two-point gait is implemented either immediately after the operation (depending on the surgeon's instructions) or following the three-point gait when the patient reaches a more advanced stage of recovery. The two-point gait ideally results in a symmetrical walking pattern on the part of the two legs with the aid of the crutches. Specifically, one leg and the corresponding contralateral crutch are placed simultaneously forward at approximately the same height in alternation with the other respective leg and crutch.

Figure 23:
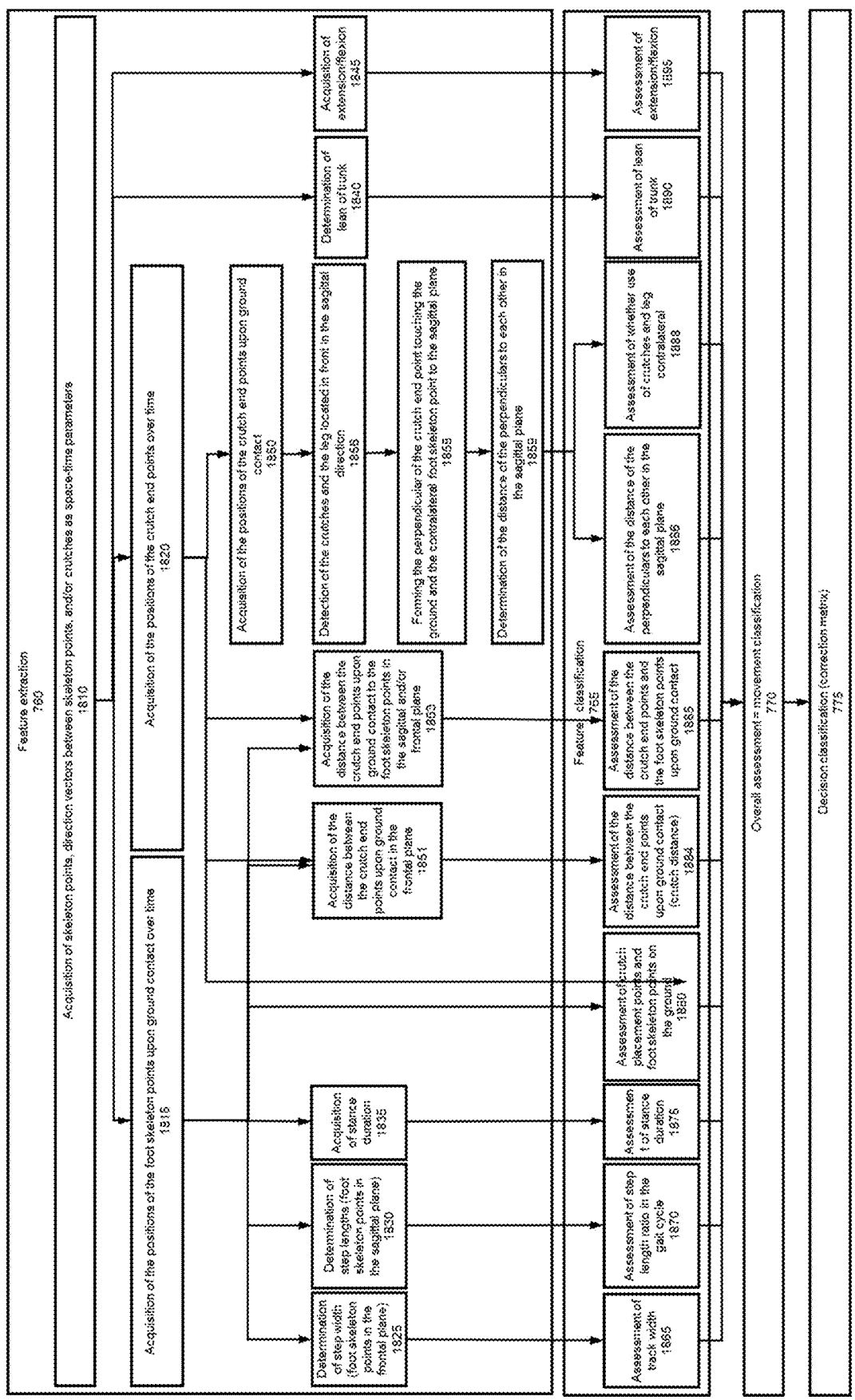
FIG. 23 Two-point gait.

FIG. 23 illustrates the two-point gait. For the most part, the evaluations are analogous to those of the three-point gait. Differences are mainly characterized by the fact that information about the leg to be relieved 1805 is not necessarily required. As a consequence of the detection of the position of the crutch end points 1970 upon ground contact 1850, it is first detected in step 1856 whether the crutches and a contralateral leg are in the frontal sagittal plane. A perpendicular is formed of the crutch end point 1970 contacting the ground and of the contralateral foot skeleton point 1950 to the sagittal plane 1858, and, for example, the distance of the perpendiculars to each other in the sagittal plane is determined 1859. Alternatively or additionally, the minimum distance between the crutches and the contralateral foot point can be evaluated. This distance is evaluated in the scope of feature classification in step 1886, i.e. how far the deviation is or whether the two-point gait is being performed correctly (step 1888). Threshold values for the determined distances can be evaluated for this purpose, for example. Subsequently, this data is integrated into the movement classification 770 and instructions are assigned to detected deviations of the movements, e.g. in the decision classification 775. In some cases, different threshold values and combinations of classified features are used as a basis, as with the three-point gait, e.g. to trigger the appropriate output of the movement correction 450, e.g. stored in the correction matrix (see FIG. 9).

Example 33: Projection of Instructions by the Service Robot

In one aspect, the service robot 17 is provided with a projection unit by means of which the service robot 17 can project instructions towards the patient, for example onto the floor. The instructions may include instructions on speed, posture, route (making a turn, turning around, etc.) and may be in text form and/or based on pictograms, including, for example, traffic signs (such as a stop sign, arrow signs, etc.). For this purpose, the service robot has a projection unit, e.g. a standard projector. This projector has a defined projection surface, i.e. the projected surface is located, for example, within fixed areas on the ground, e.g. at a distance between 2 and 3 m from the service robot and with a width of 1.2 m. If the distance of the service robot to an obstacle, e.g. a wall, is less than the distance over which the projection is made from the service robot to the ground, at least part of the projection would fall on the obstacle. However, this may impair the readability of the projected content. As a result, the service robot performs a comparison with its sensor technology for obstacle detection. In one aspect, this may be based on at least one map that the robot dynamically generates of its environment and which includes fixed and possibly moving obstacles. Alternatively and/or additionally, the sensor data can also be evaluated directly in such a way that no obstacles may be detected for the projection area. The sensors used here may be a LIDAR device, a camera, or ultrasonic, infrared, and/or radar sensors. The service robot is also configured to adapt the type of output based on the type of obstacles detected. Therefore, if an output is necessary but the projection surface is at least partially obscured by an obstacle, the service robot may instead select, for example, the display and/or speech output. Such a projection may replace or complement many of the outputs via the display and/or speech output mentioned elsewhere in this document.

Example 34: Two and Three-Point Gait Recognition

This example comprises a computer-implemented method for detecting a movement pattern of a person comprising non-contact detection of a person over time, the generation of a skeleton model of the person, and the evaluation of skeleton points and/or limb direction vectors extracted from the skeleton model to classify the movement pattern of the person. Alternatively and/or additionally, the movement pattern is classified as a two-point gait or three-point gait. In one aspect, instructions are provided to the person for an output of a movement correction 450, e.g. in the form of a speech output, projection, and/or display. In one aspect, the output of the movement correction 450 is performed depending on a combination of detected deviations of the movement pattern, with these deviations being defined, for example, by rules stored in a memory. In one aspect, these deviations are determined as deviations in the symmetry of the movement pattern. Between individual outputs of the instruction about the movement correction, there is a minimum time period that is stored in a memory and which, in one aspect, depends on the number of previous corrections during training. In the scope of the computer-implemented method, in one aspect, underarm crutches are identified and evaluated temporally and spatially, in particular the end points of the crutches 1970 that contact the ground. In one aspect, at least one crutch end point 1970 is evaluated relative to at least one foot skeleton point 1950 in the sagittal plane. For example, the distance between the foot skeleton point 1950 and the crutch end point 1970 is evaluated and compared to a threshold value stored in a memory. In an alternative and/or additional aspect, it is detected whether the crutches are set approximately parallel to the frontal plane of the detected person. In this regard, a line between the crutches and the distance of this line from a foot skeleton point 1950 can be determined, with the foot skeleton point 1950 being, for example, the leg skeleton point of a leg that is to be relieved.

In an alternative and/or additional aspect, the position of a foot skeleton point 1950 relative to the end point 1970 of a crutch placed on the opposite side in the sagittal plane is evaluated. This is done, for example, for the leg and crutch that are located forward in the walking direction of the subject. This evaluation between the foot skeleton point 1950 and the crutch is performed, for example, when the foot in question and the crutch touch the ground.

In an optional additional aspect, the method determines personal parameters, e.g. step length, stance duration, step width, distance between the crutches in the frontal plane, lean of trunk, head inclination, and/or joint flexions and/or joint extensions, and, in one aspect, classifies them. In one aspect, the method captures these personal parameters within at least one gait cycle of the detected person. In one aspect, deviations from the symmetry of the movement pattern are determined and evaluated within the gait cycle. The method differentiates between physiological and abnormal movement patterns. In one aspect, this can be achieved using the F1 score defined above. In one aspect, feature extraction of parameters from a skeleton model, feature classification 765, movement classification 770, and, for example, decision classification 775 are performed with a resulting matching output of the movement correction 450, if applicable.

The method may further include the determination of the duration of an exercise, the speed of the person being captured, and/or the type of crutch/walking aid used by the person being captured.

Example 35: Method for Detecting a Forearm Crutch

This example comprises a computer-implemented method for evaluating the position of a forearm crutch viewed relative to the position of at least one foot skeleton point 1950 of a person. In one aspect, the person is tracked over time, e.g. using a non-contact method. A skeleton model of the person is generated 725. Sensor data in the spatial proximity of at least one hand skeleton point is analyzed for the presence of crutches. For this purpose, a candidate region is selected 745, for example. This may, for example, extend basically downwards from the hand skeleton points. Point clouds in the vicinity of the hand skeleton points, for example, are then recorded and compared with data stored in a memory. In one aspect, the orientation of the forearms can be used, which are roughly parallel to the orientation of the crutches, for example. Model assumptions may also be taken into account, e.g. with regard to shape 750. A fault-tolerant segmentation algorithm 755 can be used to detect the crutches. The data for the point clouds is captured by at least one sensor that can capture the person without contact, for example a 2D camera 2084, a 3D camera, a LIDAR device 2083, a radar sensor, and/or an ultrasonic sensor. Where more than one sensor is used, the data is synchronized in time and merged. In one aspect, the crutch position is evaluated at the point where the crutches touches the ground in terms of the end point. This location is then evaluated, for example, relative to the position of a foot skeleton point 1950, e.g. at the time when the foot touches the ground. The evaluation takes place e.g. in the sagittal plane, with the distance between the foot skeleton point 1950 and the end point of the crutches 1970 being determined in one aspect. In one aspect, the two-point gait or the three-point gait of the person is subsequently evaluated.

Example 36: Robot System

This example comprises a service robot comprising at least one computer, at least one memory 10, at least one camera, at least one device for detecting obstacles at close range, an odometry unit 2081 and a display, e.g. a touch display 2087, a module for 2D and/or 3D acquisition of the environment 2061, a map module 2061b, a self-localization module 2062, a module for controlling and/or initiating the automatic charging of an energy storage device, and a movement planning module 2065. This service robot may alternatively and/or additionally include a mapping module 2061a, a metric path planning module 2064, a self-blockage detection module 2068, a user communication module 2066, a module for determining an optimal distance to a user 2067, a room plan module 2060r, a module for determining a waiting position 2069, a laser-based person tracking module 2043, a person re-identification module 2044, a movement evaluation module 2050, a movement extraction module 2051, a movement assessment module 2052, a movement correction module 2022, a module for storing patient parameters 2014, a training plan storage module 2012, and/or an training evaluation module 2013 detected by the sensors of the service robot. In one aspect, the service robot may have an RFID interface for data exchange 2089. In one aspect, the movement planning module 2065 uses metric path planning information 2064, e.g. to determine an optimal path for the robot given various destination or cost functions. In doing so, the movement planning module 2065 may, for example, determine the distance expected to be covered by the patient. Re-identification of a person 2044 may be performed, for example, using color patterns, measurement parameters of a person, and/or classification of the gait pattern of the person. In one aspect, the captured, evaluated, and corrected movements may constitute the gait patterns.

Example 37: Anomaly Detection in Gait Behavior

This example comprises a computer-implemented method for anomaly detection in a person's gait, and has a feature extraction 720, a feature classification 765, and a movement classification 770, with the feature extraction 720 being based on a skeleton model of a person. The feature classification 765 is based on the evaluation of space-time parameters for skeleton points of the person and/or direction vectors between skeleton points. Anomalies are characterized, for example, by amplitude level, positions of minima and/or maxima, and/or inflection points determined on the basis of the observation of the skeleton points over time. In one aspect, anomalies are detected by evaluating a gait cycle. For example, step length, stance duration, step width, lean of trunk, head inclination, and/or joint flexions are recorded and evaluated. In one aspect, the position of the foot skeleton points 1950 relative to detected walking aids, e.g. forearm crutches, is additionally evaluated. In this regard, the evaluation can be performed, for example, by determining the distance in the sagittal plane. The movement classification 770 comprises the evaluation of at least two parameters, e.g. step length, stance duration, step width, lean of trunk, head inclination, joint reflections, and/or the ratio of the positions of foot skeleton points 1950 to those of the walking aids. An anomaly is detected through the deviation of determined parameters from classification parameters, e.g. defined threshold values. The threshold values may, for example, be values generated through the evaluation of previously recorded movement patterns. In one aspect, classification processes may be implemented using machine learning methods. In an optional, additional aspect, a notification is sent to the terminal if the classified parameters deviate from threshold values.

In one aspect, the data from which the skeleton model is generated is recorded, e.g. in the form of a video sequence. The sequences are time-stamped, e.g. upon detection of an anomaly. The video sequence may, for example, be transmitted to a memory. This memory may be located in a learning module 190. Prioritization of video sequences may be carried out in this memory. In one aspect, this prioritization of video sequences depends on the type and/or number of detected anomalies.

In one aspect, an anomaly may be a deviation of the detected completed exercises from a training plan, such as the time duration of an exercise, the speed of movement, or the type of use of crutches/walking aids, etc.

Example 38: Automated Training Plan Adjustment for Determining the Transition from the Three-Point Gait to the Two-Point Gait This example comprises a system for the automated determination of the transition from the three-point gait to the two-point gait, comprising a processor and a memory, with the processor and the memory being connected via an interface, e.g. a data transmission interface, to a sensor for the non-contact detection of a person. In an alternative and/or additional aspect, the method is a computer-implemented method for adjusting training plans based on processed data from a sensor for the non-contact detection of a person, in one aspect of which the training plan adjustment represents a determination of the transition from the three-point gait to the two-point gait. In one aspect, the determination of the transition from the three-point gait to the two-point gait is followed by an automated intervention, e.g. an automated adjustment of a training plan and/or transmission of a message via an interface. The system or computer-implemented method compares, for example, detected values obtained through the further processing of data (obtained by the sensor for the non-contact detection of the person) with corresponding reference values. The values may be personal parameters, such as the speed, stance duration, free leg phase, step length, etc. of a person, which have been acquired, for example, by means of a non-contact sensor. In one aspect, the personal parameters are a combination of speed, stance duration, free leg phase, and/or step length. The system or computer-implemented method can, for example, determine the symmetry between the gait movements of the left and right legs of a detected person, e.g. using the gait cycle, and use deviations from symmetry to determine the transition from the three-point to the two-point gait. In one aspect, the detected deviations from the physiological movement pattern are acquired and evaluated in terms of their type and frequency. In one aspect, correction instructions stored in the memory are also taken into account, which are output while the person's training is being captured (e.g. by the system or a system connected via an interface with at least one sensor for the non-contact detection of a person), e.g. the type and frequency of these correction instructions.

In one aspect, the values were registered over time, e.g. over the course of several exercises. In one aspect, the system or computer-implemented method may, for example, perform a difference analysis over the course of multiple exercises to determine the training progress of the person. In one aspect, the determined training progress is compared to previously the determined training progress of other persons and/or reference data stored in a memory.

Example 39: Method for the Independent Selection of a Training Plan Configuration in Consideration of Historical Data This example comprises a computer-implemented method allowing the independent selection of training plan configurations on the part of a person. In the process, the training plan configuration desired by the person is compared with approvals within a training plan and can only be selected if approval has been granted. In an additional aspect, the approval may be based on an automated training plan adjustment. In one aspect, this involves comparing data previously made by the person and collected and evaluated by a non-contact sensor with historical data. For example, an approval for a training plan configuration can be given if there is a high level of agreement between the acquired data and the historical data. The training plan may relate to gait training, for example. Furthermore, for example, the type and/or number of outputs of movement corrections 450, e.g. gait corrections or the movement deviations on which these are based, can be used to determine an automated approval. In one aspect, the computer-implemented method is implemented in a service robot, e.g. one for capturing and evaluating gait training.

Example 40: System and/or Computer-Implemented Method for the Automated Adjustment of a Training Plan This example includes a system for the automated adjustment of a training plan using a wireless interface, at least one processor, and at least one memory that contains at least one database in which a training plan is stored. In addition, the system can receive data via the wireless interface from a second system, which is equipped with a sensor for the non-contact detection of a person, e.g. a camera, record and evaluate exercises stored in the training plan, and make these recorded exercises available to the first system. Furthermore, the system can receive information from a third system in which training plan adjustments are made. As an alternative and/or in addition to these systems, a computer-implemented method for a training plan may receive records of exercises performed by a person completing the training plan. The training plan may include information about the person, including the person's agility, type of surgery performed, location of surgery performed, body size, and/or person weight. The training plan adjustment may include the distance to be covered, type of use of crutches/walking aids, etc. The recorded data represents personal parameters and can be stored in the system over time, for example. The personal parameters may include, among others, stance duration, step width, free leg phase, upper body, gaze direction, and/or the step length of a person, e.g. also symmetry values of the step length. Alternatively and/or additionally, the recorded data may include the timing and/or location of the use of walking aids, e.g. crutches. This recorded data with the personal parameters may supplement previously obtained historical data within a database. This recorded data as well as, for example, the data transmitted by the second system (using the camera to record a person) and by the third system (for training plan adjustment) can be evaluated using machine learning and/or neural network methods. As an input variable of these evaluations, personal data such as the patient's age, height, person weight, comorbidities, type of surgery, etc. can be used, as well as the data collected during the recording of the exercises. For example, the settings of the training plan for an exercise at time t or at a later time t+1 can be determined as the output variable. The node weights determined during these calculations can be transmitted to the second system (using the camera to record a person) and/or the third system (for training plan adjustment). These node weights can be used, for example, for the automated adjustment of the training plan. In one aspect, the second system is a service robot that conducts gait training, for example.

Example 41: System for Automated Training Plan Adjustment

This example includes a first system for automated training plan adjustment that includes a patient administration module 160, a wireless interface to a second system including at least one camera, a processor, a memory unit, and an interface to a learning module 190. A second system may be, for example, a service robot 17. Additionally, the first system may be connected to a rule set 150 via an interface. The patient administration module 190 includes a training plan that can be configured via a terminal 12. The training plan may take into account, for example, a person's agility, the type of surgery performed, and/or the location of the surgery (such as region and side, e.g. left knee). "Agility" includes a person's general condition and/or comorbidities. The training plan may include, for example, exercises based on two-point gait, three-point gait, and/or stair climbing. As a result of the exercises included in the training plan, the second system records the duration of the exercises, the distance covered, the frequency of the exercises and/or their intensity, etc. The training plan may be transmitted to and stored in the second system via an interface. The second system may, for example, trigger an exercise with a person such as, in one aspect, gait training and/or output a movement correction 450 in the process, e.g. a gait correction. The recorded data is stored and evaluated over time. The data can be transmitted to a learning module 190, e.g. via an interface. The learning module 190 disposes of historical data in a learning module memory. This data is supplemented by the evaluated data transmitted via the interface. For example, the historical data is supplemented by adjustments made to the training plan. The settings made may include, for example, the training plan and/or training plan adjustments which were made on the basis of the recorded data. A machine learning method and/or neural networks can be used, for example, to determine the node weight for the training plan. The input variables used for the determination of the node weight are the evaluation of the exercise and, optionally, the components of the training plan, with configurations of the training plan and/or training plan changes being used as output parameters. In one aspect, the node weights determined here are transmitted to a rule set. There they can replace, for example, already stored node weights for the training plan adjustment. Moreover, they can be used to carry out a rule update for the training plan. Based on the rule set 150, suggestions may be made for a training plan adjustment, e.g. based on an evaluation of historical data. In one aspect, these suggestions may be provided via a terminal. In an alternative and/or additional aspect, the suggestions are made based on data collected by the system comprising at least a camera, a processor, as well as a memory, and/or the configuration of a training plan. The training plan in turn may include exercises for gait training.

Example 42: Computer-Implemented Method for Movement Assessment

The example comprises a computer-implemented method for movement assessment of a person, the method comprising the recording the movements of a person, feature extraction 720 of the recorded movements, e.g. the movement pattern, classification of the recorded movements, e.g. a movement classification 770, feature classification 765 of the recorded movements, assignment of instructions for detected deviations of the movements, e.g. a decision classification 775, and an output of movement correction 450 for the movements, e.g. an output of a gait correction. The feature classification 765 comprises, for example, the evaluation of personal parameters such as step length, free leg phase, stance duration, etc. of the detected person. The movement classification 770 comprises, for example, a combined observation of different limbs and/or the use of forearm crutches. The output of the movement correction (e.g. an output of a gait correction) comprises the output of instructions to the person, e.g. via a speaker, a projection, and/or a display. The movements recorded may be exercises in the scope of gait training. The outputs of the movement correction 450 may also be prioritized; in one aspect, different deviations with different priority scores are compared within a time interval, and only one output at a time is provided for those deviations having the highest priority score.

In one aspect, the data of the movement classification 770, the feature classification 765 and/or the movement correction (in the example: a decision classification 775), as well as the evaluations of the recorded movements, concerning e.g. the gait training, can be stored with respective corresponding historical data.

In an alternative and/or additional aspect, the acquired and evaluated data, i.e. e.g. the results of the movement classification 770, the movement correction, e.g. the decision classification 775, and/or the raw data of the recordings may be transmitted to a learning module 190. The method further includes accessing the data in the learning module, e.g. via a terminal, and re-evaluating the movement classification, e.g. a gait sequence classification, re-evaluating the feature classification, and/or re-evaluating the movement correction, e.g. the decision classification, e.g. with respect to outputting a movement correction 450. This re-evaluation may be performed manually, for example. In an alternative and/or additional aspect, at least one manual rule adjustment is transmitted to a rule set 150. In the rule set 150, an update of the movement classification, e.g. the gait classification, the feature classification and/or movement correction, e.g. the decision classification, e.g. a movement correction, may be updated, for example. The updated rules of the movement classification, e.g. the gait classification, the feature classification, and/or movement correction, e.g. decision classification, are transmitted to the system that performs the recording of the person's movements. In case the raw data of the movement recordings are video recordings, these movement recordings can be anonymized in an optional step, e.g. by pixelating the faces. In the learning module 190, for example, the video sequences can be tagged, in particular with respect to a deviating and/or physiological course of a movement pattern. For example, time stamps can be assigned.

In addition, for example, an automated re-evaluation of the movement pattern and/or an automated re-evaluation of the movement correction, e.g. the decision classification, can be performed. This automated re-evaluation is performed e.g. by means of machine learning methods and/or neural networks. The evaluations of the recorded movements, e.g. of an exercise such as gait training, can be used as input variables and the movement classification, e.g. a gait classification, feature classification, and/or the movement correction, e.g. the decision classification, can be used as output variables. The node weights for the feature classification, the movement classification, e.g. a gait classification, and/or the movement correction, e.g. a decision classification, determined during the automated re-evaluation can be transmitted to the rule set 150, for example. This way, the node weights of the movement classifications stored in the rule set 150, e.g. a gait classification, feature classifications, and/or movement corrections, e.g. the decision classification, can be updated, as well as, for example, the corresponding rules of the movement classification, e.g. the gait classification, the feature classification, and/or the movement correction, e.g. the decision classification. In a further step, the updated node weights and/or rules may be transmitted to the system that detects the person, for example.

Example 43: Service Robot with the Capability of Independently Selecting a Training Area This example shows a service robot 17 with at least one optical sensor unit, a radar sensor and/or an ultrasonic sensor, and at least one memory containing a map of the environment of the service robot, with the service robot 17 detecting and evaluating the number and/or type of obstacles in its environment in order to identify the subareas within the map that have a low density of obstacles. For example, the map is used to store areas in which the service robot 17 primarily moves. The obstacles are detected over time, e.g. over the course of a day, a week, and/or a month. The obstacles may be, for example, dynamic and/or static obstacles. The dimensions of the obstacles can also be detected, for example. A dimension can be determined, for example, absolutely and/or relative to the width of a corridor in which the service robot is moving. The obstacles are recorded during training while the service robot 17 is moving in the subareas. In one aspect, the service robot, or in an alternative aspect an external system to which the data has been transmitted, determines the obstacle density over time. The data from the external system is then transmitted back to the service robot 17. Analysis of the data includes, for example, clustering. The collected data can be used, for example, to define time intervals in which certain subareas exhibit low obstacle density. In this way, for example, forecasts can be generated about future obstacle density. As a result, the service robot 17 can, for example, perform tasks to be completed primarily in those subareas that exhibit low obstacle density. In this regard, the tasks to be performed may depend on density threshold values. The service robot 17 may, for example, make route selection decisions based on the determined density.

Example 44: Computer-Implemented Method for Detecting the Load on a Leg

This example comprises a computer-implemented method for detecting load on a leg of a person and includes the non-contact acquisition of the person's movements. In one aspect, the non-contact acquisition may be performed using a camera. In one aspect, a skeleton model is created and skeleton points and/or direction vectors between skeleton points are evaluated temporally and spatially. This may include, for example, a feature extraction 720, a feature classification 765, and/or a movement classification 770. In one aspect, walking aids are also acquired and the progression of the walking aids relative to the foot skeleton points 1950 of the person is evaluated. In one aspect, a leg to be loaded is placed in the sagittal plane near at least one forearm crutch. In one aspect, the leg to be unloaded is located near the line connecting the crutches. In an alternative and/or additional aspect, the gait pattern of the person to relieve the load from the leg is a three-point gait. The registered movements are compared with stored rules, for example. This is followed, for example, by decision classification 775 performed to evaluate which of the detected deviations should result in a correction output and an output of a movement correction 450, e.g. in the form of instructions to the person via speech output.

The angle between the lower and upper arm, extension and/or flexion angle of the hip and knee, and/or the lean of trunk (in the frontal and sagittal plane) are evaluated to detect the load on the leg. Unloading of a leg is determined if the angle between the lower and upper arm is smaller than 170°, e.g. smaller than 160°, the knee angle of the leg allowing only limited loading being smaller than 172°, for example, and/or the trunk leaning forward by more than 5°.

Example 45: Walking Aid with Communication Device

A walking aid is described below that is equipped with an energy source, a control unit, wireless interface, and a button that transmits a signal via the wireless interface when pressed. The receiver of the transmitted signal may be, for example, a service robot. In one aspect, the walking aid is a forearm crutch. The button is located at the distal end of the T-shaped handle, which is enclosed by the hands of the patient. The control unit is configured in such a way that various signals can be transmitted by pressing the button. For example, the frequency of pressing and/or the number of pressing events may represent different signals. In one aspect, pressing the button triggers a re-identification of the patient by the service robot.

Example 46: Method for Evaluating a Three-Point Gait

The example comprises a computer-implemented method for evaluating a three-point gait comprising the following steps: capturing skeleton points, directional vectors between skeleton points, and/or forearm crutches as space-time parameters, capturing the position of the crutch end points 1970 over time, and capturing the position of the crutch end points 1970 upon a ground contact. In addition, a determination is made, for example, of whether the positions of the contact points of the crutches on the ground are approximately parallel to the frontal plane of the person. The frontal plane can be determined, for example, by the direction of movement of the detected person. This is followed, for example, by detecting whether the foot of the leg to be relieved is positioned between the crutches.

In one aspect, a connecting line is determined between the positions of the crutches on the ground, the distance of the foot skeleton point 1950 of the leg to be relieved to the connecting line is determined, and the distance of the foot skeleton point 1950 of the leg to be relieved to the connecting line is assessed. Alternatively and/or additionally, the positions of the crutch end points 1970 and the foot skeleton point 1950 from the leg to be relieved in the sagittal plane relative to each other are evaluated and the distances between these points are assessed.

In addition, at least one of the following aspects can be determined first and then assessed, whereby in the case of more than one aspect, the aspects can be considered individually and/or in combination: the lean of the upper body, the extension and/or flexion, e.g. of the knee and/or hip joint; the step width, e.g. by means of determining the distance of the foot skeleton points 1950 in the frontal plane, the step lengths, e.g. by means of determining the distance of the foot skeleton points 1950 in the sagittal plane, e.g. assessed in the following with regard to the length of the individual steps in the gait cycle, the stance duration, the placement times of the crutches and/or the feet or the foot skeleton points 1950, the distance between crutch end points 1970 upon ground contact in frontal plane, the distance between the crutch end points 1970 at ground contact to the foot skeleton points 1950 in the sagittal and/or frontal plane, whereby the last two aspects are used to assess the use of the crutches relative to the body position, e.g. to assess whether the crutches are placed too close or too far away from the body (laterally or forward).

In addition, a movement classification 770 can be performed, for example, in which at least two features are assessed in combination and compared with stored rules. If deviations in the movement pattern are detected, the decision matrix for the detected deviation is used to evaluate whether instructions are issued to the person.

Example 47: Evaluation of a Two-Point Gait

The example manifests a computer-implemented method for evaluating a three-point gait, comprising detecting skeleton points, directional vectors between skeleton points, and/or forearm crutches as space-time parameters, detecting the position of the crutch end points 1970 over time, and detecting the positions of the crutch end points 1970 when contacting the ground. In addition, the method detects the crutches and the leg located in front in the sagittal direction, followed, for example, by the formation of the perpendicular of the crutch end point 1970 in contact with the ground and the perpendicular of the contralateral foot skeleton point 1950 to the sagittal plane, followed by the determination of the distance between the two perpendiculars or, for example, the detection of the crutch end point 1970 in contact with the ground and the foot skeleton point 1950 in the sagittal plane and a determination of the distance between the crutch end point 1970 and the foot skeleton point 1950 in the sagittal plane. This can be followed, in one aspect, by an assessment of the distance of the perpendiculars to each other in the sagittal plane or the distance between the two points in the sagittal plane and/or by an assessment as to whether there is a contralateral use of the crutches and the leg. This is assessed, for example, by comparing threshold values. In addition, the further aspects from the previous example (last two paragraphs) can be used as further steps for the evaluation of the two-point gait.

SOURCES

Jaeschke, B., Vorndran, A., Trinh, T. Q., Scheidig, A., Gross, H.-M., Sander, K., Layher, F. Making Gait Training Mobile—A Feasibility Analysis. in: IEEE Int. Conf. on Biomedical Robotics and Biomechatronics (Biorob), Enschede, The Netherlands, pp . . . , IEEE 2018

Trinh, T. Q., Wengefeld, T., Mueller, St., Vorndran, A., Volkhardt, M., Scheidig, A., Gross, H.-M. "Take a seat, please": Approaching and Recognition of Seated Persons by a Mobile Robot. in: Int. Symposium on Robotics (ISR), Munich, Germany, pp. 240-247, VDE Verlag 2018.

Vorndran, A., Trinh, T. Q., Mueller, St., M., Scheidig, A., Gross, H.-M. How to Always Keep an Eye on the User with a Mobile Robot? in: Int. Symposium on Robotics (ISR), Munich, Germany, pp. 219-225, VDE Verlag 2018

Zhe Cao, Tomas Simon, Shih-En Wei, Yaser Sheikh. Open-Pose: Realtime Multi-Person 2D Pose Estimation using Part Affinity Fields; The IEEE Conference on Computer Vision and Pattern Recognition (CVPR), 2017, pp. 7291-7299

G. Guidi, S. Gonizzi, L. Mico, 3D CAPTURING PERFORMANCES OF LOW-COST RANGE SENSORS FOR MASS-MARKET APPLICATIONS, The International Archives of the Photogrammetry, Remote Sensing and Spatial Information Sciences, Volume XLI-B5, 2016 XXIII ISPRS Congress, 12-19 Jul. 2016, Prague, Czech Republic.

D. Fox, W. Burgard and S. Thrun, "The dynamic window approach to collision avoidance," in IEEE Robotics & Automation Magazine, vol. 4, no. 1, pp. 23-33, March 1997

Müller S., Trinh T. Q., Gross HM. (2017) Local Real-Time Motion Planning Using Evolutionary Optimization. In: Gao Y., Fallah S., Jin Y., Lekakou C. (eds) Towards Autonomous Robotic Systems. TAROS 2017. Lecture Notes in Computer Science, vol 10454. Springer, Cham.

R. Philippsen and R. Siegwart, "An Interpolated Dynamic Navigation Function," Proceedings of the 2005 IEEE International Conference on Robotics and Automation, Barcelona, Spain, 2005, pp. 3782-3789.

Borchani, H., Varando, G., Bielza, C. and Larraflap, P. (2015), A survey on multi-output regression. WIREs Data Mining and Knowledge Discovery, 5: 216-233. DOI: 10.1002/widm.1157

REFERENCE NUMERALS

3 Sensor
5 Support wheel mounted to rotate around the vertical axis
6 Drive wheel
8 Energy source
9 Processing unit
10 Memory
12 Terminal for system administration
13 Terminal
17 Service robot
18 Cloud
150 Rule set
151 Rule set processing unit
152 Rule set memory
160 Patient administration module
161 Patient administration module processing unit
162 Patient administration module memory
170 Patient data management system
171 Patient data management system processing unit
172 Patient data management system memory
180 Navigation system
181 Navigation system processing unit
182 Navigation system memory
190 Learning module
191 Learning module processing unit
192 Learning module memory
1305 Agility
1310 General condition
1315 Comorbidities
1320 Location of operation
1325 Type of operation
1330 Therapist
1335 Training plan
1340 Two-point gait
1345 Three-point gait
1350 Stairs
1355 Configuration of training plan
1360 Interface
1505 Historical data
1701 Skeleton point
1702 Connection between skeleton points
1703 Body of a person
1910 Direction vector between knee skeleton point and hip skeleton point
1920 Direction vector between knee skeleton and foot skeleton point
1930 Knee skeleton point
1940 Hip skeleton point
1940r Right hip skeleton point
19401 Left foot skeleton point
1950 Foot skeleton point
1960 Shoulder skeleton point
1960r Right shoulder skeleton point
19601 Left shoulder skeleton point
1970 Crutch end point
1980 Stylized crutch
2010 Application level
2011 Movement training module
2012 Training plan
2013 Exercise evaluation module
2020 Behavioral level
2022 Movement correction module
2024 Destination guidance module
2030 Service robot skills
2040 Person recognition module
2041 Person identification module
2042 First person tracking module
2043 Second person tracking module
2044 Re-identification module
2045 Seat recognition module
2046 3D person tracking
2050 Movement evaluation module
2051 Movement extraction module
2052 Movement assessment module
2060 Navigation module
2061 Mapping module
2060r Room plan module
2064 Path planning module
2065 Movement planning module
2071 Graphic user interface (GUI)
2073 Speech synthesis module
2074 Speech recognition module
2081 Odometry module
2082 Pressure-sensitive bumper
2083 LIDAR
2084 2D camera
2085 RGB 3D camera
2086 Camera zoom and tilt function
2087 Touch display
2088 WLAN module
2089 RFID reader/writer
2090 Differential drive
2091 Charging port and electronics
2092 Loudspeaker
2093 Microphone
2094 Head with eyes

The invention claimed is:
1. A computer-implemented method for capturing a movement pattern of a person, the movement pattern comprising movements of body elements of the person, the method comprising the following:
capturing a plurality of images of the person when executing a movement pattern by means of a non-contact sensor, the plurality of images representing the movements of the body elements of the person;

generating at least one skeleton model having limb positions for at least some of the plurality of images;

calculating the movement pattern from the movements of the body elements of the person by comparing the changes in the limb positions in the at least one generated skeleton model;

comparing the calculated movement pattern to a predetermined movement pattern stored in a memory; and a notification of when the movements in the captured movement pattern deviate from the movements in the predetermined movement pattern, wherein the number of output messages depends on the number and type of detected deviations of the movements.

2. The method of claim 1, wherein the movement pattern is a gait pattern.

3. The method of claim 1, wherein calculating the movement pattern comprises evaluating movements of the body elements over at least one complete gait cycle.

4. A method according to claim 1, further comprising detecting at least one walking aid in the plurality of images by means of comparison to walking aid models.

5. The method of claim 3, further comprising coherently evaluating the at least one walking aid and at least one foot skeleton point obtained from the skeleton model.

6. The method of claim 4, wherein the evaluation comprises determining a difference between the at least one foot skeleton point and a ground-level end point of the at least one walking aid.

7. The method of claim 6, wherein the difference is determined in the sagittal plane.

8. The method of claim 5, wherein the evaluation is performed at a time of placement on the ground.

9. Apparatus for carrying out the method according to claim 1.

10. A system for capturing a movement pattern of a person, the movement pattern comprising movements of body elements of the person, the system comprising the following:

at least one sensor for the non-contact capture of a large quantity of images of the person executing a movement pattern, with the quantity of images representing the movements of the body elements of the person;

a memory;

a processor, the processor executing a software-based evaluation module for calculating movements of the body elements of the person by comparing the generated skeleton models; and an output unit for outputting messages upon detecting deviations between the movements of body elements and the predetermined movement pattern, wherein the output unit comprises at least one of a speaker, a display, and a projector, and wherein the number of the output messages depends on the number and type of detected deviations of the movements.

11. The system of claim 10, wherein the movement pattern is a gait pattern.

12. The system of claim 10, wherein the software-based evaluation module running on the processor, when operated, evaluates the positions of the body elements with the aid of walking aids over at least one gait cycle.

13. A system according to claim 10, wherein the software-based evaluation module running on the processor evaluates a symmetry of the movement of the body elements during operation.

14. System according to claim 10 wherein the processor is further configured to process a segmentation algorithm for recognizing objects in the plurality of images.

15. The system of claim 10, wherein the sensor is at least a 2D camera, a depth camera, an ultrasonic sensor, a radar sensor, or a LIDAR sensor.

* * * * *